United States Patent
Hasegawa et al.

(10) Patent No.: US 11,060,156 B2
(45) Date of Patent: Jul. 13, 2021

(54) METHOD OF MANUFACTURING WELDED STRUCTURE OF FERRITIC HEAT-RESISTANT STEEL AND WELDED STRUCTURE OF FERRITIC HEAT-RESISTANT STEEL

(71) Applicant: Nippon Steel & Sumitomo Metal Corporation, Tokyo (JP)

(72) Inventors: Yasushi Hasegawa, Tokyo (JP); Hirokazu Okada, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 135 days.

(21) Appl. No.: 16/325,587

(22) PCT Filed: Sep. 29, 2017

(86) PCT No.: PCT/JP2017/035684
§ 371 (c)(1),
(2) Date: Feb. 14, 2019

(87) PCT Pub. No.: WO2018/062545
PCT Pub. Date: Apr. 5, 2018

(65) Prior Publication Data
US 2019/0211411 A1    Jul. 11, 2019

(30) Foreign Application Priority Data
Sep. 30, 2016    (JP) .............................. JP2016-195114

(51) Int. Cl.
*C21D 6/00* (2006.01)
*C22C 38/32* (2006.01)
(Continued)

(52) U.S. Cl.
CPC ................ *C21D 6/008* (2013.01); *B23K 9/23* (2013.01); *B23K 9/235* (2013.01); *C21D 6/002* (2013.01);
(Continued)

(58) Field of Classification Search
CPC .... B23K 9/23; B23K 9/235; C21D 2211/004; C21D 2211/005; C21D 2221/02;
(Continued)

(56) References Cited

U.S. PATENT DOCUMENTS 5,766,376 A  *  6/1998  Hasegawa ............. C22C 38/001
148/328
2004/0089701 A1    5/2004  Tezuka

FOREIGN PATENT DOCUMENTS

EP    2783790 A1    10/2014
JP    H04350118 A    12/1992
(Continued)

OTHER PUBLICATIONS

English Abstract & Family List of JP2008214753A.
(Continued)

*Primary Examiner* — Jenny R Wu
(74) *Attorney, Agent, or Firm* — Banner & Witcoff, Ltd.

(57) ABSTRACT

A method of manufacturing a welded structure of a ferritic heat-resistant steel is provided that prevents Type IV damage and that has good on-site operability without adding a high B concentration. The method includes: the step of preparing a base material including 1.0 to 7.0% Cr, less than 0.005% B and other elements; the step of forming an edge on the base material; a pre-weld heat treatment step in which a region located between a surface of the edge and a position distant from the surface of the edge by a pre-weld heat treatment depth of 10 to 50 mm is heated to a temperature of 950 to 1050° C. and is held at this temperature for 10 to 30 minutes; a welding step in which the edge is welded to form the weld metal; and a post-weld heat treatment step in which a region located between the surface of the edge and a position distant therefrom by a distance not smaller than the pre-weld heat treatment depth and not greater than 100 mm is heated to a temperature of 680 to 750° C. and is held (Continued)

at this temperature for a time period not shorter than 30 minutes and satisfying the following formula, (1):

$$(\text{Log}(t)+10)\cdot(T+273)<10539 \qquad (1).$$

6 Claims, 10 Drawing Sheets

(51) Int. Cl.
    *C22C 38/28*     (2006.01)
    *C22C 38/26*     (2006.01)
    *C22C 38/24*     (2006.01)
    *C22C 38/22*     (2006.01)
    *C22C 38/06*     (2006.01)
    *C22C 38/04*     (2006.01)
    *C22C 38/02*     (2006.01)
    *C22C 38/00*     (2006.01)
    *B23K 9/23*     (2006.01)
    *C21D 9/50*     (2006.01)
    *B23K 9/235*     (2006.01)
    *C21D 9/08*     (2006.01)

(52) U.S. Cl.
    CPC ............... *C21D 6/005* (2013.01); *C21D 9/50* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C21D 9/08* (2013.01); *C21D 2211/004* (2013.01); *C21D 2211/005* (2013.01); *C21D 2221/02* (2013.01)

(58) Field of Classification Search
    CPC ........ C21D 6/002; C21D 6/005; C21D 6/008; C21D 9/08; C21D 9/50; C22C 38/00; C22C 38/001; C22C 38/002; C22C 38/005; C22C 38/02; C22C 38/04; C22C 38/06; C22C 38/22; C22C 38/24; C22C 38/26; C22C 38/28; C22C 38/32
    See application file for complete search history.

(56) References Cited

FOREIGN PATENT DOCUMENTS

| | | | |
|---|---|---|---|
| JP | 2001003120 A | | 1/2001 |
| JP | 2008214753 A | | 9/2008 |
| JP | 2008248385 A | | 10/2008 |
| JP | 2008266785 A | | 11/2008 |
| JP | 2008266786 A | | 11/2008 |
| JP | 2008291363 A | * | 12/2008 |
| JP | 2008291363 A | | 12/2008 |
| JP | 2009293063 A | | 12/2009 |
| JP | 2010007094 A | | 1/2010 |
| JP | 2016014178 A | * | 1/2016 |
| JP | 2016014178 A | | 1/2016 |
| JP | 2016130339 A | | 7/2016 |

OTHER PUBLICATIONS

English Abstract & Family List of JP2008248385A.
English Abstract & Family List of JP2008266785A.
English Abstract & Family List of JP2008266786A.
English Abstract & Family List of JP2008291363A.
English Abstract & Family List of JP2009293063A.
English Abstract & Family List of JP2010007094A.
English Abstract & Family List of JP2001003120A.
English Abstract & Family List of JP2016014178A.
English Abstract & Family List of JP2016130339A.
English Abstract & Family List of JPH04350118A.

* cited by examiner

1 μm

1 μm

METHOD OF MANUFACTURING WELDED STRUCTURE OF FERRITIC HEAT-RESISTANT STEEL AND WELDED STRUCTURE OF FERRITIC HEAT-RESISTANT STEEL

RELATED APPLICATION DATA

This application is a National Stage Application under 35 U.S.C. 371 of co-pending PCT application number PCT/JP2017/035684 designating the United States and filed Sep. 29, 2017; which claims the benefit of JP application number 2016-195114 and filed Sep. 30, 2016 each of which are hereby incorporated by reference in their entireties.

TECHNICAL FIELD

The present invention relates to a method of manufacturing a welded structure of a ferritic heat-resistant steel and a welded structure of a ferritic heat-resistant steel. More particularly, the present invention relates to a welded structure of a ferritic heat-resistant steel having portions joined together by welding and to which stresses are applied for a prolonged period of time at high temperatures, such as those used in power plants or chemical plants, and a method of manufacturing such a structure.

BACKGROUND ART

As demand for energy resources continues to grow, various techniques need to be developed to generate electric power or refine fuel, which both represent indispensable energy in all industries. Especially in Japan, where resources are scarce, an early completion of development of such techniques is strongly desired. However, it is difficult to supply renewable energy on a commercial basis in a massive and stable manner, and spreading the supply of such energy presupposes techniques for reducing costs or techniques for storing energy. As such, significant reliance remains on existing energy conversion techniques, especially power plants that convert fossil fuel or nuclear fuel into electric energy, such as coal-fired thermal power plants, natural-gas direct-fired thermal power plants, and nuclear power plants. On the other hand, problems with these conventional power-generation techniques include resource life and large environmental impact; particularly, $CO_2$ emissions need to be reduced at the same time, which is an urgent problem. Further, toxic substances contained in fossil fuel, which is a major power source of vehicles, especially sulfur oxides such as $SO_x$, are likely to be subjected to ever stricter regulations, and it is desired that oil refining reactors, which are intended to solve this problem, operate at higher temperatures and under higher pressures than conventional levels.

Recently, the efficiency of thermal power generation, for example, has stagnated at about 40 to 50%, and higher efficiencies are currently desired to prevent emissions of carbon dioxide from increasing. In not only power plants but also other power generators, the thermal efficiency for energy conversion substantially depends on temperature and pressure; in power plants, the higher the temperature of steam that drives the turbine of the generator, the higher the energy conversion efficiency becomes.

Presently, steam temperatures in coal-fired thermal power plants are 620° C. at most, where a temperature increase of 100° C. is expected to increase efficiency by about 5%, and an increase of 200° C. is expected to increase efficiency by about 10%. This means that improving the efficiency of power plants for converting energy at high temperature and under high pressure may effectively provide useful techniques that can solve the above-mentioned environmental and resource problems at the same time. However, increasing the temperature of steam for driving the turbine of the generator requires improving the performance of not only parts of the turbine, but also that of the heat-resistant steel used in the heat exchanger or piping.

Furthermore, in oil refining reactors, problems presented in connection with future base materials include improving high-temperature corrosion resistance, for which demand is likely to be higher, and obtaining high-temperature strength, which is required by the nature as a pressure container. Under these circumstances, interest has been particularly increasing in increasing the performance of heat-resistant steel used at high temperatures.

Particularly important characteristics required of heat-resistant steel are creep properties; it is necessary that no creep rupture occurs for a prolonged period of time to enable the plant to operate for decades. Heretofore, assuming that the upper limit of use temperature is 600° C., research and development of 9% Cr ferritic heat-resistant steel has been conducted, where high-temperature ferritic heat-resistant steels such as KA-STBA 28 or KA-STBA 29 in accordance with the technical interpretations for thermal power generation equipment defined by the Nuclear and Industrial Safety Agency have been developed and commercialized. These ferritic heat-resistant steels have low coefficients of thermal expansion and are resistant to creep fatigue fracture or deformation, when used in piping members, caused by thermal stresses. Furthermore, they have the same weldability and operability as typical steel materials. Moreover, they contain less alloy of expensive metals such as Ni than austenitic heat-resistant steels, which are used at higher temperatures, a property that makes them more economical and thus attractive from industrial viewpoints. However, the atomic structure of iron is BCC (body-centered cubic lattice) and thus has a higher lattice constant, which causes substances to diffuse quickly at high temperatures. Thus, to provide durability for a prolonged period of time, it is physically and chemically unavoidable that ferritic heat-resistant steels are inferior to austenitic heat-resistant steels. Thus, demand for an increased strength of ferritic heat-resistant steels, which have high creep-rupture strength, has always been high and ferritic heat-resistant steels that can replace austenitic heat-resistant steels have been developed.

Even in a boiler or reactor that achieves such an extreme high-temperature high-pressure environment, not the entire structure is exposed to high temperatures. In a boiler, water is gradually heated and changed to water vapor, and then to supercritical water and then to ultra-supercritical water; thus, high-strength low-alloy ferritic heat-resistant steels are used in positions with relatively low temperatures rather than high temperatures. These steels contain 1 to 7% Cr, and are used in a temperature range of about 450 to 580° C. In a reactor, one reaction container includes portions at high temperatures and portions at low temperatures, and the temperature of refined oil before desulfurization at the inlet of the reactor is not very high; thus, again, low-alloy ferritic heat-resistant steels are used in these positions.

The differences between high-Cr ferritic heat-resistant steel and low-alloy ferritic heat-resistant steel are the difference in high-temperature corrosion resistance derived from the Cr contents and the γ-to-α transformation involving Cr. The former is mainly composed of martensite, where some portions are formed by bainite but the starting microstructure of most portions is martensite. That is, the minimum constituent dislocation microstructure is a lath structure, and block structures surround it. Some low-alloy ferritic heat-resistant steels are mainly composed of ferrite, and others are mainly composed of bainite; in bainite with shear-type transformation, the transformation point is not as low as that for martensite such that the mobility of interior dislocations is high and almost no lath structures are formed. That is, in low-alloy ferritic heat-resistant steel, almost no lath structures are present and the minimum constituent unit is a block structure or a ferrite particle itself. This significantly affects the high-temperature strength of high-Cr ferritic heat-resistant steel and low-alloy ferritic heat-resistant steel and, consequently their creep strength.

A problem with the use of ferritic heat-resistant steel for a prolonged period of time at high temperatures is that its creep strength is lower than that of austenitic heat-resistant steel and, in addition, it is very difficult to prevent production of portions with lower creep strengths, which are locally found in the weld heat-affected zone of a welded joint.

If the starting microstructure is BCC microstructure (ferrite, bainite or martensite), a ferritic heat-resistant steel has a so-called transformation point, which is the temperature at which phase transformation occurs between a phase, which is stable at room temperature, and γ phase, which is stable at high temperature. When hot ferrite steel is cooled, this transformation point contributes to production of low-temperature transformation microstructure with high strength containing dislocations in high density. On the other hand, the transformation point itself causes a large change to the microstructure of the steel (i.e. rearrangement of atoms forming the crystal lattice), and thus the microstructure of a heat-resistant steel that has been subjected to a heat history straddling the transformation point is significantly different from the initial refined microstructure that was originally introduced to provide high creep strength.

This phenomenon most strongly affects the microstructure of the heat-affected zone of a welded joint (hereinafter referred to as "HAZ"). The fusion zone between the HAZ and weld metal is at a high temperature not lower than 1500° C.; when the heat from this zone affects the base material, this produces a series of microstructure sections with different maximum temperatures reached (i.e. maximum heating temperatures) for different portions depending on the distance from the weld metal. That is, a HAZ has a microstructure with a series of metal microstructure sections that were produced as the maximum heating temperature changed from room temperature to 1500° C., depending on the distance from the weld metal. However, since the holding time for the maximum heating temperature is a short period of time of several seconds, this microstructure is peculiar and is generally divided into "coarse-grain HAZ", "fine-grain HAZ" and "dual-phase HAZ", starting from the section closest to the weld metal.

FIG. 1 shows various portions of a welded joint including its HAZ, and the microstructure configuration divided as mentioned above. As shown in FIG. 1, a HAZ 6 is formed between the weld metal 1 and the base material 5, where the HAZ 6 is composed of, starting from the section closest to the weld metal 1: a coarse-grain HAZ 2, a fine-grain HAZ 3, and a dual-phase HAZ 4.

A creep damage occurring in the fine-grain HAZ with a resulting fracture originating from the welded joint is referred to as "Type IV damage". Such a Type IV damage in a welded structure made of ferritic heat-resistant steel has not been resolved, and attempts have recently been made to resolve this problem. Type IV damage is a fracture specific to a welded joint, where, even though the base material is under time and temperature conditions that allow good use in a creep environment, only the welded joint suffers creep deformation, leading to a fracture.

Until about 50 years ago, this phenomenon, which was identified in low-alloy ferritic heat-resistant steel, was thought to be caused by impurity elements or explained by referring to a phenomenon called grain-boundary sliding, which is caused by particles becoming finer, for example. However, recent research and development has suggested that, in portions that are heated for a short period of time to a temperature not lower than the transformation point, particularly in portions heated to a temperature directly above the transformation point, carbides are incompletely dissolved and/or re-precipitated, with a heat history that causes coarsening of carbides, which is now thought to be the major cause of that phenomenon. Since whether a microstructure is made of fine grains hardly affects the creep strength of ferritic heat-resistant steel, different portions are categorized depending on the type of microstructure, but the decrease in strength occurs not because of the configuration of the microstructure itself, but because precipitates that strengthen the microstructure for a prolonged period of time coarsen early and lose their effects.

Typically, the joint after welding is subjected to a post-weld heat treatment (also referred to as stress-relieving annealing or SR treatment). If the heat-treatment temperature is high and different from the tempering temperature by only several dozens of degrees, the carbides that have remained undissolved, discussed above, together with the carbon that has dissolved, represent new precipitation nuclei for carbide-forming elements. The carbides that have remained undissolved are coarsened by the thermal cycle as a result and, at the same time, reduce the opportunity for precipitation of fine carbides. That is, as a result of research, the present inventors found out that, if the coarse carbides that had precipitated before welding remain undissolved, the so-called "precipitation strengthening property" originating from carbides will be lost.

This phenomenon is not dependent on the Cr amount; however, this phenomenon occurs in a certain temperature range, with a certain shape of coarsened precipitates and with a certain strengthening mechanism. These distinctions affect what technique to use to prevent Type IV damage, and the present invention focuses on this point to effectively prevent Type IV damage in low-alloy ferritic heat-resistant steel.

This demonstrates that Type IV damage is unavoidable in a heat-resistant steel that has a transformation point as discussed above and in which carbon is contained and carbides are precipitated to increase creep rupture strength. That is, Type IV damage may occur in any steel type that is a heat-resistant steel in which carbides are used to increase creep strength, and is particularly significant in a high-Cr steel that is designed presupposing a prolonged use at high temperatures. Further, this phenomenon may also occur in a low-alloy heat-resistant steel containing 1 to 7% Cr that is mainly intended to be used at low temperatures. Of course, Type IV damage remains as an unavoidable problem in thermal power plants or petroleum desulfurization reactors in which such a steel is used at a high temperature of 500° C. or higher. Since there is practically no ferritic heat-resistant steel that does not use the precipitation strengthening property derived from carbides to increase creep strength and exactly the same phenomenon occurs even when carbon is replaced by nitride, it is very difficult to prevent Type IV damage in a ferritic heat-resistant steel.

To prevent production of such a fine-grain HAZ in a conventional ferritic heat-resistant steel, JP 2008-214753 A, JP 2008-248385, JP 2008-266785 A, JP 2008-266786 A and JP 2008-291363 A disclose techniques to perform heat treatment before welding (normalizing for a short period of time) on an entire steel pipe containing 50 ppm or less B to enable prevention of Type IV damage. These documents describe that, as a result of this heat treatment, the average grain size of austenite crystal grains before low-temperature transformation will be 100 µm or larger, thereby preventing grains of the low-temperature transformation microstructure from becoming finer.

The present technique uses a short-time normalizing process before welding to cause the retained γ, which is a microstructure that is usually to be caused to disappear, to remain in martensite laths or on bainite grain boundaries, thereby facilitating growth and coalescence thereof during reheating in welding to reproduce prior γ grains that had been produced at high temperature in the base material before welding, known as "microstructure memory effect".

This technique requires a furnace for performing heat treatment at high temperature on an entire member including an edge before welding (a steel pipe with a length of 10 m or longer in most cases), which makes on-site operation difficult. Further, heating the entire steel pipe may cause deformation of the product, i.e. steel pipe, and reheating requires a long time and a large process load; for these reasons, this technique does not provide a realistic solution from a viewpoint of on-site operation.

Meanwhile, JP 2009-293063 A and JP 2010-007094 A propose steel pipes that use steel-material components that do not require growth and coalescence of retained γ in techniques using the same microstructure memory effect (hereinafter simply referred to as "memory effect").

These techniques add B in high concentrations of 100 ppm or higher, and the resulting shear-type memory effect with α-to-γ transformation is used. They are the same as the techniques of JP 2008-214753 A and other above-listed documents in that prior γ grains in the base material are reproduced at high temperature and do not produce a fine-grain region, and are thus thought to produce no Type IV damage.

The high-B containing steels described in JP 2009-293063 A and JP 2010-007094 A achieve prevention of production of a fine-grain region; however, in the portions corresponding to a fine-grain region, a short-time re-solution of carbides may cause partial solution and re-precipitation, during which coarsening of carbides occurs, a problem that these techniques cannot sufficiently solve. The techniques of JP 2009-293063 A and JP 2010-007094 A provide crystal microstructures that are substantially the same as the base material, where the memory effect ensures that the positions of precipitation of carbides remain on large-angle grain boundaries. Thus, compared with conventional ferritic heat-resistant steels in which complete recrystallization occurs to produce a fine-grain region and the positions of precipitation of coarsened carbides are unrelated with the crystal-grain boundaries that are newly produced, Type IV damage is mitigated (delayed). That is, even though the coarsening of precipitates is not completely prevented, a certain degree of microstructure stabilization is achieved by precipitates on grain boundaries. Thus, in the case of high-B-containing steel, the occurrence of Type IV damage is delayed and, in terms of strength reduction, these techniques are effective for a limited long-time use, such as 100,000 hours, which means that Type IV damage itself is mitigated. However, for a longer time in creep environments, a reduction in the creep strength of the HAZ is unavoidable since coarsening of carbides has preceded. This has been shown by the results of creep tests for a prolonged period of time, particularly creep tests for 30,000 hours or longer.

The stabilization of microstructure achieved by precipitates on grain boundaries is a new hypothesis about strengthening proposed in recent years, and was thought to be ineffective for strengthening in the past, based on the assumption that even coarse precipitates on large-angle grain boundaries can help strengthening particularly during a very-long-time creep deformation longer than 100,000 hours because, in a creep deformation where large-angle grain boundaries may migrate after a long period of time, a series of coarse carbide particles that are left after grain-boundary migration can serve as barriers that prevent dislocation motion. Since these coarse precipitate particles are arranged in a series, this makes the distance between the particles smaller to produce a strengthening effect, which is, however, completely eliminated by Type IV damage. This is one assumption that can explain the reason why the reduction of strength due to Type IV damage is more significant for a longer period of time.

Other than these methods, JP 2001-003120 A describes a technique in which a welded steel pipe is subjected to a reheating process for the entire welded structure (normalizing and tempering) to produce a microstructure that is substantially the same as that of the base material. The purpose of this method is to eliminate the non-uniformity of strength of the joint by performing heat treatment on the entire structure including the weld metal. However, this requires an even larger furnace than the heat treatment furnace described in JP 2008-214753 A, for example, which means low on-site operability. Further, in a weld metal, the alloy composition is originally decided such that the creep strength is at its maximum when the cast microstructure that is welded is, without an interruption, subjected to a post-weld heat treatment at a lower temperature than the tempering temperature; thus, a typical weld metal is not designed to provide strength after a refining process including normalizing and tempering, similar to the process for the base material. That is, applying a heat treatment that is applied again to the base material to the weld metal again is not preferred in terms of the creep properties of the weld joint. As a result, the joint develops a rupture beginning at the weld metal due to a reduction in the creep strength of the weld metal, a factor different from Type IV damage, such that creep strength of the weld joint is not achieved. That is, techniques such as that of JP 2001-003120 A is incomplete to address Type IV damage.

JP 2016-14178 A and JP 2016-130339 A disclose techniques that use steels containing 100 ppm and 80 ppm, respectively, or more B and prevent Type IV damage by local heat treatment. These techniques use a microstructure memory effect using retained γ that is present on lath boundaries, which are significant in B-containing steel; however, retained γ, however in a small amount, may remain in the base material or portions that have been subjected to a pre-weld heat treatment, and thus toughness tends to be low.

Thus, a structure of a ferritic heat-resistant steel with a low-temperature transformation microstructure that has good on-site operability and develops no Type IV damage at all has not been developed. Further, a technique for preventing Type IV damage taking account of economy and on-site operability has not been proposed for ferritic heat-resistant steel containing only 50 ppm or less B, particularly low-alloy ferritic heat-resistant steel containing 1 to 7% Cr.

DISCLOSURE OF THE INVENTION

An object of the present invention is to provide a method of manufacturing a welded structure of a ferritic heat-resistant steel that can prevent Type IV damage without adding B in large concentrations and that has good on-site operability, and to provide a welded structure of a ferritic heat-resistant steel without Type IV damage.

A method of manufacturing a welded structure of a ferritic heat-resistant steel according to an embodiment of the present invention is a method of manufacturing a welded structure of a ferritic heat-resistant steel including a base material, a weld heat-affected zone and a weld metal, including: the step of preparing the base material, the base material having a chemical composition including, in mass %: 0.08 to 0.15% C; 0.02 to 0.45% Si; 0.40 to 0.80% Mn; 1.0 to 7.0% Cr; 0.003 to 0.020% N; 0.20 to 1.10% Mo; 0.005 to 0.08% Nb; 0.005 to 0.40% V; not less than 0% and less than 1.5% W; 0 to 0.12% Ti; 0 to 0.0050% Ca; 0 to 0.0050% Mg; 0 to 0.0500% Y; 0 to 0.0500% Ce; and 0 to 0.0500% La, B being limited to below 0.005%, Al below 0.025%, P below 0.020%, S below 0.010%, and O below 0.010%, the balance being Fe and impurities; the step of forming an edge on the base material; a pre-weld heat treatment step in which a region located between a surface of the edge and a position distant from the surface of the edge by a pre-weld heat treatment depth of 10 to 50 mm is heated to a temperature of 950 to 1050° C. and is held at this temperature for 10 to 30 minutes; a welding step in which, after the pre-weld heat treatment step, the edge is welded to form the weld metal; and a post-weld heat treatment step in which, after the welding step, a region located between the surface of the edge and a position distant from the surface of the edge by a distance not smaller than the pre-weld heat treatment depth and not greater than 100 mm is heated to a temperature of 680 to 750° C. and is held at this temperature for a time period not shorter than 30 minutes and satisfying the following formula, (1):

$$(\text{Log}(t)+10)\cdot(T+273)<10539 \quad (1).$$

Here, t is the holding time and T is the temperature. The unit of t is hour and the unit of T is °C. Log is the common logarithm.

A welded structure of a ferritic heat-resistant steel according to an embodiment of the present invention is a welded structure of a ferritic heat-resistant steel including a base material, a weld heat-affected zone and a weld metal, the base material having a chemical composition including, in mass %: 0.08 to 0.15% C; 0.02 to 0.45% Si; 0.40 to 0.80% Mn; 1.0 to 7.0% Cr; 0.003 to 0.020% N; 0.20 to 1.10% Mo; 0.005 to 0.08% Nb; 0.005 to 0.40% V; not less than 0% and less than 1.5% W; 0 to 0.12% Ti; 0 to 0.0050% Ca; 0 to 0.0050% Mg; 0 to 0.0500% Y; 0 to 0.0500% Ce; and 0 to 0.0500% La, B being limited to below 0.005%, Al below 0.025%, P below 0.020%, S below 0.010%, and O below 0.010%, the balance being Fe and impurities, wherein an average grain size of $M_{23}C_6$-type carbides precipitated on large-angle grain boundaries of the weld heat-affected zone is not more than 200 nm, an average inter-particle-surface distance of the $M_{23}C_6$-type carbides on the large-angle grain boundaries is not more than 150 nm, and a coverage of the large-angle grain boundaries with the $M_{23}C_6$-type carbides is not less than 50%. M of the $M_{23}C_6$-type carbides is one or more of Cr, Fe, Mo and W in not less than 70 atom % in total.

The present invention provides a method of manufacturing a welded structure of a ferritic heat-resistant steel that can prevent Type IV damage without adding B in large concentrations and that has good on-site operability, and a welded structure of a ferritic heat-resistant steel without Type IV damage.

EMBODIMENTS FOR CARRYING OUT THE INVENTION

Figure 1:
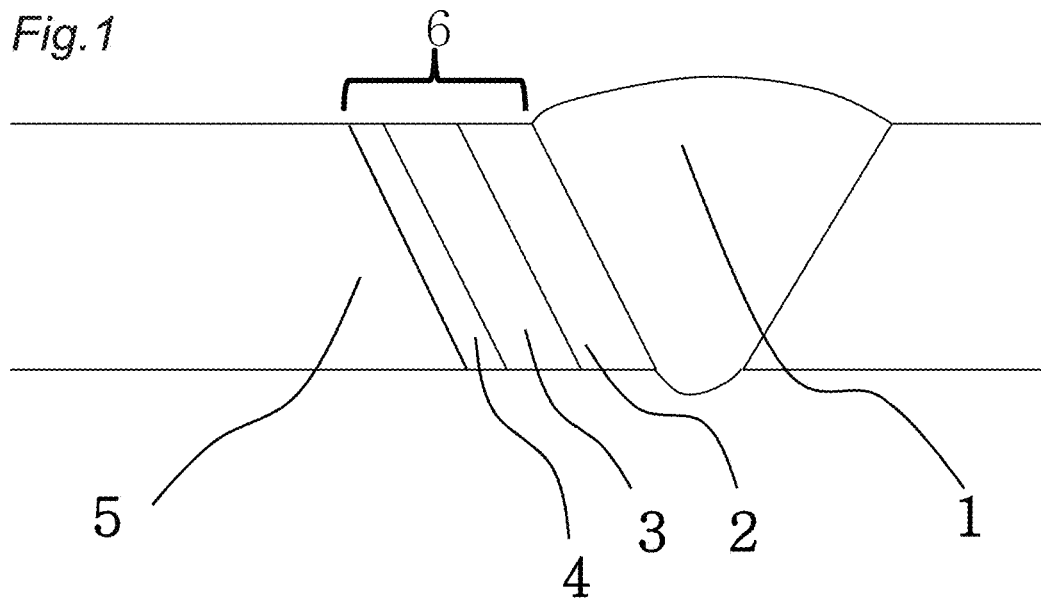
FIG. 1 is a schematic cross-sectional view of a joint illustrating various portions including the heat-affected zone of a welded joint and various microstructure sections.

As discussed above, the problem to be solved by the present invention is to provide a weld structure in which no Type IV damage occurs in the HAZ of a welded joint of a steel satisfying a predetermined main chemical components and limit values and there is no significant difference between the creep strength of the welded joint and that of the base material. The Cr content of the associated steel is 1.0 to 7.0%. To provide corrosion resistance, the creep rupture strength for a use temperature range of 450° C. or larger and after 100,000 hours is considered as a factor of temperature and the target for the rupture strength for 550° C., used as a representative value, should be 100 MPa or larger. At the same time, to provide the machinability of the edge and the operability of the welding, the target for the Charpy impact toughness value for 0° C. should be 27 J or higher to provide a toughness that sufficiently prevents weld cracking.

An object of the present invention is to completely prevent coarsening of carbides due to an HAZ thermal cycle through partial solid solution thereof, which is the fundamental reason for Type IV damage. To do this, the present invention optimizes component design to provide a chemical composition that prevents Type IV damage in the structure itself and, at the same time, performs a heat treatment before welding on a portion near the edge of the welded joint under limited conditions of this process.

The welded structure of a ferritic heat-resistant steel of the present invention is composed of a base material, an HAZ and a weld metal, and is not limited to a specific shape and may be shaped as a pipe or a plate. Further, if the structure is shaped as a pipe, the invention is suitable for a structure with a length of 100 mm or more, and if the structure is shaped as a plate, the invention is suitable for a structure with a length or a width of 100 mm or more. Further, since objects to which the present invention is suitably applied include high-temperature pressure vessels, its plate thickness (or wall thickness for a steel pipe) is preferably 4 mm or more.

The techniques that provide basis for the present invention will now be described together with the results of experiments.

The experiment results shown below were obtained using the test specimens fabricated as described below and various experiments.

In a laboratory, a steel with the chemical composition (mass %) shown in Table 1 was melted and cast in a high-frequency induction-heating vacuum-melting furnace having a steel capacity of 300 kg to produce a steel ingot with a weight of 300 kg. Thereafter, this steel ingot was reheated in an electric furnace with an atmosphere to 1150° C. and was then held in the furnace for 30 minutes, before being hot rolled in hot-rolling experiment equipment to produce a steel-plate test specimen with a thickness of 30 mm. The hot rolling was completed at a temperature of 900° C. or higher, and was then left to cool. The hot-rolled test specimen is heated and held in an electric-resistance heating furnace at 980° C. for 90 minutes or longer, and then is left to cool to room temperature before being tempered at 740° C. for two hours. At this stage, optical microscopy, transmission electron microscopy (TEM), scanning electron microscopy (SEM) and electrolytic-extraction residue quantitative analysis were used to verify that a bainite structure was present in the microstructure and that carbides mainly composed of $M_{23}C_6$-type carbides and Mo had mainly precipitated. The types of the precipitates were checked using energy-dispersion X-ray analysis (EDX) appended to the TEM equipment and the energy values of reflection peaks from X-ray diffraction for electrolytic-extraction residues (qualitative analysis).

TABLE 1

| Chemical components (in mass %, balance Fe and impurities) | | | | | | | | | | |
|---|---|---|---|---|---|---|---|---|---|---|
| C | Si | Mn | Cr | Mo | Nb | V | N | Al | B | O |
| 0.12 | 0.3 | 0.48 | 2.5 | 1.02 | 0.06 | 0.3 | 0.0125 | 0.012 | 0.0015 | 0.0031 |

Here, M in "$M_{23}C_6$-type carbides" means Cr, Fe, Mo and/or W in 70 atom % or more in total. The precipitates mainly composed of Mo were $Mo_2C$-type carbides. It was observed that the former had precipitated in the form of lumps on large-angle grain boundaries (very small particles were cubic in shape), and the latter had precipitated in the form of needles within grains.

The coverage of grain boundaries with $M_{23}C_6$-type carbides was determined by the length occupancy of precipitates on large-angle grain boundaries based on a SEM observation image with a magnifying power of 10,000 and a TEM observation image of thin film. The nature of grain boundaries (difference in angle between the direction of adjacent crystals and the normal direction) was measured by an electron-beam backscatter analysis device (EBSD) and a grain boundary with an angle relative to an adjacent crystal grain of 15° or larger was determined to be a "large-angle grain boundary". Large-angle grain boundary as used herein means "prior γ grain boundary", "packet grain boundary" or "a major portion of a block grain boundary", which are crystallographic names of martensite or bainite, and is a crystal grain boundary that is effective as precipitation nuclei for precipitates. For the occupancy of precipitates on such large-angle grain boundaries, measured values were used assuming that the result of a two-dimensional observation is generally equal to the area occupancy on the three-dimensional surface of a grain boundary (border). These values may be converted to three-dimensional values using a simple equation determined by calculation analysis; however, the inventors decided that it would not be necessary to calculate scientifically precise values, and pursued convenience by using observation results as they were obtained.

Figure 2:
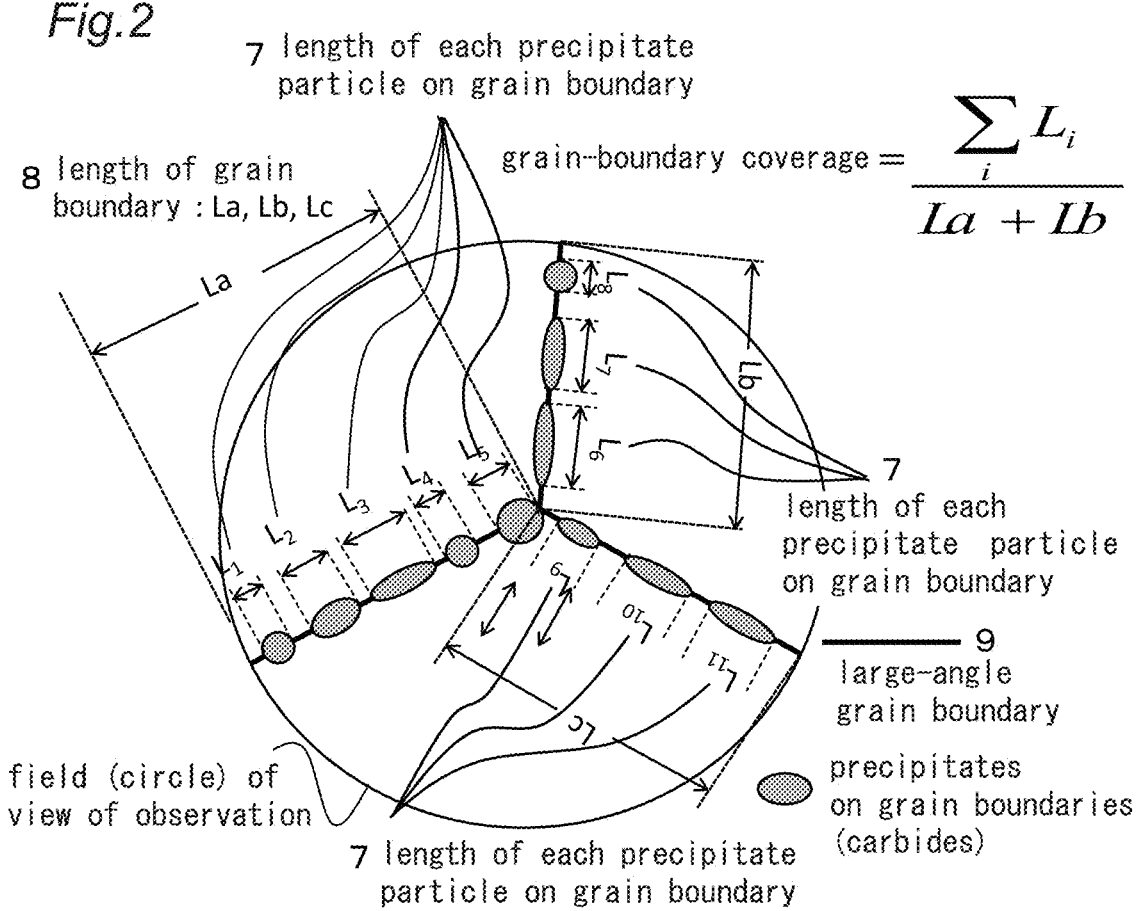
FIG. 2 is a schematic view of the large-angle grain boundaries being covered, illustrating a microstructure model of the weld heat-affected zone and the concept of the coverage of grain boundaries with precipitates, as well as a measurement method.

FIG. 2 is a conceptual view of the coverage of grain boundaries with carbides of a microstructure, including large-angle grain boundaries 9 (three are shown in the figure, indicated by the thickest lines), for illustrating a microstructure model of an HAZ and a method of measuring the coverage of grain boundaries with precipitates. $L_1$ to $L_{11}$ in FIG. 2 each indicate the grain-boundary occupancy length 7 of an $M_{23}C_6$-type carbide particle for the large-angle grain boundaries in the view, while La, Lb and Lc each indicate a large-angle grain-boundary length 8.

As shown in FIG. 2, "grain-boundary coverage" is the total precipitate length along the large-angle grain boundaries 9 (total of $L_1$ to $L_{11}$ in FIG. 2) divided by the total length of the large-angle grain boundaries (La+Lb+Lc), and is 100% for complete coverage and 0% for no coverage. Here, the length along which carbides cover grain boundaries is the occupancy length, and is not necessarily the size of precipitates or the length of elliptical precipitates on grain boundaries.

To determine "grain-boundary coverage", first, an observation is conducted using electron microscopy with a magnifying power of 10,000, and particles that have precipitated on large-angle grain boundaries are identified as $M_{23}C_6$-type carbides by transmission electron-beam diffraction pattern analysis by EDX or TEM analysis with, again, a magnifying power of 10,000. Measurement using a backscattered electron image from EDX is also effective to increase speed. Subsequently, the length along which large-angle grain boundaries are covered with such particles is measured in a field of view of electron microscopy. Such measurements are conducted by obtaining at least 5 fields of view for one sample and 5 or more test specimens for one steel, and directly observing a total of 25 or more fields of view or analyzing pictures from electron microscopy for calculation. Actual calculation is conducted by (total length of large-angle grain boundaries occupied by particles)/(total large-angle grain-boundary length).

The average inter-particle-surface distance of precipitates on the large-angle grain boundaries may be calculated in a manner similar to that shown in FIG. 2, that is, by subtracting the coverage of precipitates obtained by the above-mentioned observation by microscopy from 1 and multiplying the result by the large-angle grain boundary length, and dividing the result by the number of the precipitate particles.

However, this distance is not an exact value, and is an approximation using the formula below, (2), supposing that the precipitates are in a square-shaped distribution on grain-boundary surfaces. This corrects the difference between the actual average particle size and the measurement depending on which position in the right ellipsoid is cut to produce a surface to be observed by electron microscopy (the difference is particularly significant for low precipitate densities) and is an approximation equation using calculation analysis, and has several types based on different distribution assumptions. The present invention used a model that assumed "square-shaped distribution on grain-boundary surfaces", which enabled the clearest recognition of the correspondence to creep strength. This is a unique experiment formula of the present invention, with corrections for experimental adjustments.

$$\lambda ave = 1.5[ls]ave - 1.1[ds]ave \quad (2).$$

Here, [ls]ave is the average inter-particle-center distance (nm) and [ds]ave is the average diameter (nm) of particles (imaginary average diameter of deemed particles with sizes of portions occupying grain boundaries). λave is the average inter-particle-surface distance (nm). The average inter-particle-center distance can be calculated by measuring the number of precipitate particles on grain boundaries and dividing it by the grain-boundary length. Formula (2) may also change depending on the type of steel and heat treatment conditions, and thus cannot be applied to high-Cr ferritic heat-resistant steel or austenitic heat-resistant steel, for example.

To fabricate a welded joint, the steel-plate test specimen with a thickness of 30 mm that has been prepared, with a width of 200 mm, was machined to provide a weld edge on one of the sides of the steel-plate test specimen arranged in the width direction, the angle of one edge being 22.5° and a pair of edges forming a V-edge with 45°, to fabricate a test specimen. Two such test specimens were made to butt each other and were welded. The root for butting was 1 mm and the amount of heat input was about 1 kJ/mm, and the welded joint was formed at a weld speed of about 10 cm/minute with a heap-up of 30 to 35 passes. A plurality of welded joints each with a total length of 400 mm were prepared and their joint characteristics were evaluated, and the microstructure of the HAZ was observed and analyzed. Creep tests evaluated creep test specimens each with a parallel-portion diameter of 6 mm, a parallel-portion length of 30 mm and a total length of 70 to 86 mm. Each test specimen was extracted from a welded-joint test material by working in a direction perpendicular to the weld line and perpendicular to the plate-thickness direction such that the HAZ was located approximately in the middle of the inter-evaluation-point distance. The weld metal used was the Alloy 625 Ni-based alloy described in Table 2, which is a commercial Ni-based alloy, and an overmatch joint was used so as to prevent rupture from the weld metal, and other measures were taken to ensure that the property evaluation of the HAZ was properly performed.

TABLE 2

| Chemical components (in mass %, balance Fe and impurities) | | | | | | | | | | | |
|---|---|---|---|---|---|---|---|---|---|---|---|
| C | Si | Mn | Cr | Mo | Nb | V | N | Al | B | O | Ni |
| 0.11 | 0.05 | 0.009 | 21.52 | 8.14 | 2.95 | — | 0.0045 | 0.25 | 0.0011 | 0.0025 | 61.7 |

— indicates that the element is not added.

(Pre-Weld Heat Treatment)

As discussed above, Type IV damage occurs as heat from welding is conveyed such that carbides are heated for a short period of time to a temperature directly above the $Ac_3$ point and only peripheral portions of carbide particles are dissolved and, at the same time, fine carbides (with essential particle sizes not more than 100 nm) are completely dissolved to supply the base material with carbon; the subsequent post-weld heat treatment causes this carbon and carbide-forming transition elements to precipitate again on the retained undissolved carbides to coarsen carbides. To prevent this, the present invention performs heat treatment to prevent Type IV damage before welding. Specifically, directly before welding, carbides that have precipitated in portions that are to form the weld heat-affected zone of the welded joint (portions corresponding to the HAZ) are heated to a temperature not lower than the $Ac_3$ point and is held at this temperature for 10 minutes or longer to cause complete re-solution, thereby preventing the coarsening itself of carbides caused by weld heat through the undissolved carbides.

This pre-weld heat treatment is characterized in that the edge is heated to temperatures of 950 to 1050° and the portions that will represent the HAZ after welding are held at a target temperature for 10 minutes or longer regardless of the position along the plate thickness. If heating occurs from the outer surface, the holding time is theoretically a function of the plate thickness; however, this is difficult to formulate since the welded portions that are to be joined are not necessarily flat plates. In view of this, thermocouples may be embedded in advance in portions of steel plates of the same shape (with a chemical composition in the ranges of the present invention) that correspond to the outer fringe of the HAZ, and a temperature pattern may be set in the heating equipment such that the entire member is heated such that those portions are at a target temperature for 10 minutes or longer.

The heat treatment for preventing Type IV damage performed directly before welding will be hereinafter referred to as "pre-weld heat treatment".

Figure 3:
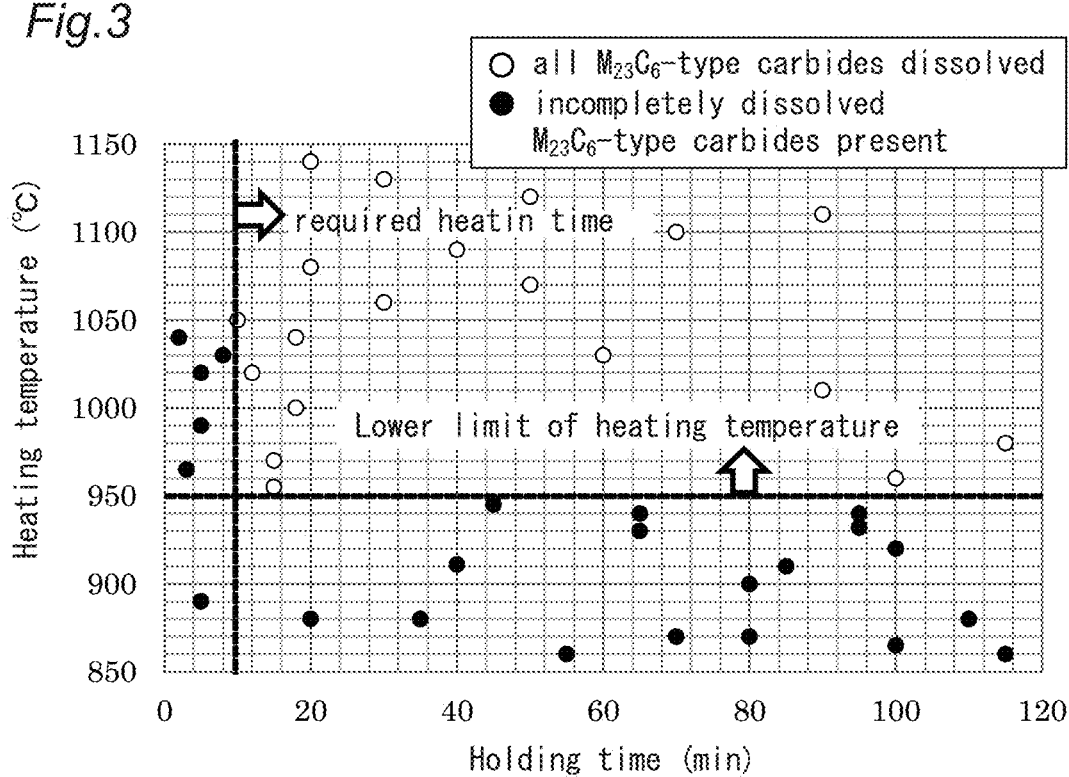
FIG. 3 is a graph showing the relationship between conditions of the pre-weld heat treatment and the state of presence of carbides.

FIG. 3 shows how the holding time at the maximum heating temperature and the temperature in the pre-weld heat treatment affect the carbide state. These tests were conducted by preparing a plurality of pieces with a square of 30×30 mm and a thickness of 10 mm cut out from steel-plate test specimens, performing heat treatment at various temperatures for various periods of time, then cutting the pieces to produce cross sections and observing the microstructure by transmission electron microscopy to determine whether there were carbide precipitates. In the graph, "●" represents an example where, in the test specimen that was left to cool after heat treatment, undissolved $M_{23}C_6$-type carbides that was in the process of decomposition and remained were found, and "○" represents an example where all carbides dissolved and no carbides were found. If small amounts of undissolved carbides remain, these carbides reduce the creep strength of the weld heat-affected zone; as such, a range including only results with ○ in the graph is preferred.

FIG. 3 suggests that, if the holding time is shorter than 10 minutes, undissolved carbides may remain in portions of the microstructure or in the entire microstructure regardless of heating temperature and may coarsen in the subsequent post-weld heat treatment. On the other hand, if the specimen was reheated to a temperature not lower than 950° C., no undissolved carbides remained at all and complete solid solution occurred if the holding time was 10 minutes or longer, regardless of heating temperature.

On the other hand, if the heat temperature is lower than 950° C., the steel of Table 1 essentially is under a condition of dual-phase heating, where the state of carbides in the portions in which the transformation point is not exceeded is represented by a somewhat higher coarsening than at room temperature but exhibits no decomposition/dissolution. On the other hand, in the portions where partial transformation to γ phase has occurred, the temperature slightly exceeds the $Ac_3$ point, and carbides are thought to remain undissolved. That is, during dual-phase heating, some of the microstructure retains incompletely dissolved (undissolved) carbides though in some regions no incompletely dissolved carbides are present, and these incompletely dissolved carbides can easily coarsen during the subsequent post-weld heat treatment.

This shows that the temperature of the pre-weld heat treatment required to completely prevent Type IV damage according to the present invention is not lower than 950° C. for a holding time of 10 minutes or longer. If the pre-weld heat treatment is performed at a temperature not lower than 1050° C., even for a short period of time, γ grains after α-to-γ transformation may coarsen in size and reduce the toughness of the steel; in view of this, the maximum heating temperature is 1050° C. For high-Cr ferritic heat-resistant steel (with an amount of Cr of 8% or more), $M_{23}C_6$-type carbides are stable at relatively high temperatures, and the tolerable upper limit of the temperature is higher. However, for low-alloy Cr-ferritic heat-resistant steel, such carbides are relatively unstable, and the upper limit of the temperature of this process must be low.

According to the present invention, the above-discussed pre-weld heat treatment is only performed on the edge and its surrounding portions. Specifically, the region located between the surface of the edge (hereinafter referred to as "edge surface") and a position distant from the edge surface by a predetermined depth (hereinafter referred to as "pre-weld heat treatment depth") is 950 to 1050° C.

Figure 4:
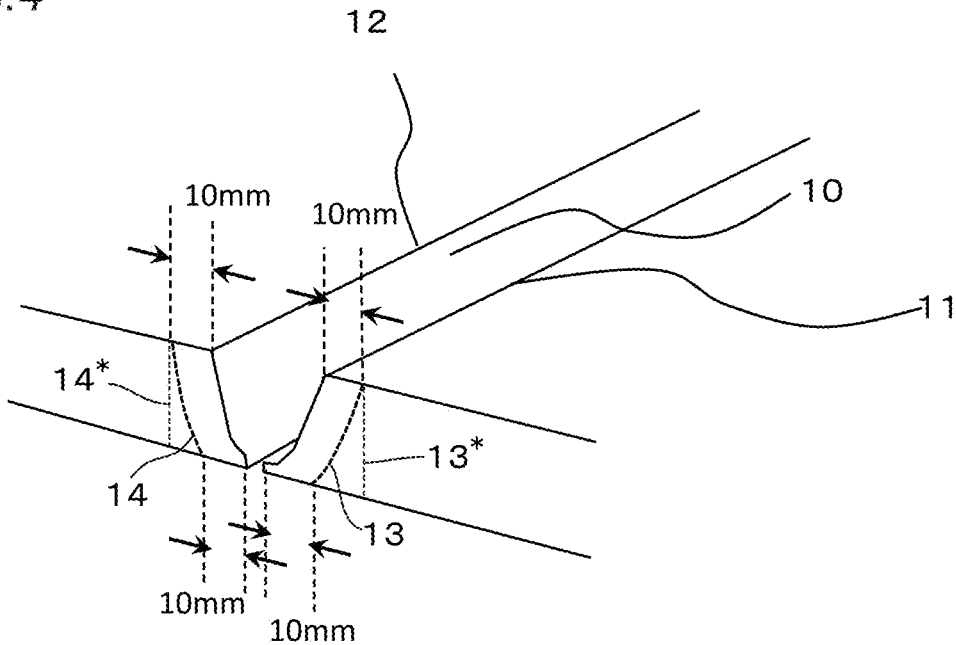
FIG. 4 shows a pre-weld butt condition of the welded joint and the names of various portions and the ranges to which the pre-weld heat treatment is applied.

To decide the pre-weld heat treatment depth, the melting of the base material caused by welding and the width of the HAZ that spreads depending on the weld heat input need to be considered. FIG. 4 schematically shows the weld edges of steel plates butting each other to form a V edge, and schematically shows a cross section of the welded portions showing the dimension, in the depth direction, of the portion of each steel plate that is subjected to the pre-weld heat treatment, beginning at the edge surface 10. Type IV damage occurs in the outer fringe of the HAZ. Thus, a temperature of 950° C. or higher must be held for 10 minutes or longer, which is suitable for the pre-weld heat treatment, into a position deeper than the portions in which the outer fringe of the HAZ is expected to be positioned.

A point to be noted here is that, during welding, there are necessarily portions of the base material that are melted. The original edge surface recedes inward in the base material and forms a fusion line that separates the weld metal (weld metal that has solidified from the molten condition or mixture of weld metal and base material) and the HAZ. This border line is also referred to as bond, from which the HAZ is produced toward the interior of the base material. High-temperature pressure containers or power-generation piping equipment to which the present invention is to be applied have high strengths and thus high residual stresses retained in the joint portion; thus, concerns include weld cracking and reheating cracking during the post-weld heat treatment; in view of this, welding with a relatively small heat input is mostly used. In such cases, the transformation point of the base material is higher than that of carbon steel, and thus the width of the HAZ is not very large. For a plate thickness of about 30 mm, the width of the HAZ is not more than 3 mm, and even for a plate with a very large thickness of over 100 mm, a HAZ width of over 10 mm is usually impossible. In practice, the weld heat input is 5 kJ/mm, and a higher heat input for welding is not used. It was verified by testing 10 test weld joints that the maximum HAZ width in this case in the steel type associated with the present invention is 5 mm. That is, Type IV damage can be prevented if the pre-weld heat treatment holds the joint at a temperature of 1050° C. or higher into a depth of at least 5 mm for a required period of time.

On the other hand, the measurements using the test weld-joint tests showed that the amount of melting of the base material due to the weld metal is similarly up to 3 mm. This amount of melting depends on the type of steel, and these result values are specific to the steel types associated with the present invention.

In view of all this, the pre-weld heat treatment is suitably performed into a total depth up to 8 mm from the edge surface at 950 to 1050° C. for 10 minutes or longer.

Another point to be noted is that, after the last weld pass, i.e. after the weld pass level reaches the steel surface, so-called "cosmetic heaping" may be performed, in which a small thickness of weld metal is positioned on the end portions of the weld metal to eliminate shape irregularities of these portions. A cosmetic heap is also referred to as "umbrella", referring to its cross-sectional shape. The position of a bond produced by the melting of the base material of weld metal may have insufficient fusion, or the supply of weld metal may be insufficient, which may result in a small groove; an umbrella may be provided, for example, to prevent stresses from being concentrated on such a groove or the border between the heaped weld metal and base-material surface, which would represent an initiation point for a fracture. The weld metal width at the outer layer is such that the HAZ may reach 10 mm from the contact line between the edge surface before welding and the surface of the steel outer layer, when all the passes including the last weld pass for preventing failure or stress concentration are considered.

When all these points are considered, the pre-weld heat treatment depth needs to be 10 mm or more. To perform such a deep heat treatment, particularly when heating occurs from the outer surface, the following measures need to be taken: For example, to achieve this by high-frequency induction heating, it is effective to reduce frequency to 3 kHz or lower, and as low as possible, to increase the depth of penetration of induction current. In the case of direct electrical heating, it is effective to optimize, by experiment, the contact positions for the electrodes for electrical heating. In the case of furnace heating, it is effective to increase the capacity of the furnace and heat the edge from all directions, thereby increasing the energy density for increasing the temperature at the depth of 10 mm. In any of these methods, an appropriate method for achieving a pre-weld heat treatment depth of 10 mm may be decided on and may be used.

That is, the essential requirement is to hold the temperature of the region beginning at the edge surface and ending at each of the borderlines 13 and 14, which are always distant from the edge surfaces by 10 mm or more, at 1050 to 1200° C. for 10 minutes or longer.

An edge rarely has a vertical weld surface and practically is a V edge, X edge or K edge. Thus, to ensure that the HAZ is covered with a region that has been subjected to the pre-weld heat treatment, it is preferable to perform the pre-weld heat treatment into the lines 13*  and 14*, each of which is at the depth position of 30 mm from that edge position on the base-material outer layer (including both the front and back) which may be most distant from the edge center. This will provide a thoroughgoing Type-IV-damage prevention process even when a deep melt portion is produced in a central portion along the plate thickness due to weld passes or gouging. At least, it is preferable to hold the entire region defined by 13* and 14* in the range of 950 to 1050° C. for ten minutes or longer.

That is, it is preferable to hold the region located between the surface of the edge and the position distant by the pre-weld heat treatment depth from the position on the surface of the edge that is most distant from the very end of the edge, at a temperature of 950 to 1050° C. for 10 minutes or longer.

If the pre-weld heat treatment depth is larger than 50 mm, a large area of the base material is heated such that the holding time at the desired temperature range may not be sufficient (the reasons for this will be discussed in detail in Features of Partial Pre-weld Heat Treatment). In view of this, the maximum pre-weld heat treatment depth is 50 mm.

This range is a value specific to the inventive steel since physical constants such as coefficient of heat transfer varies depending on the steel type.

On the other hand, the steel becomes γ phase at these temperatures, and thus holding it for a certain period of time or longer causes γ particles to coarsen in size. Grains coarsened in size increase hardenability and increase creep strength; thus, there is no problem in terms of high-temperature properties. However, tests in which this was actually performed revealed that, after heating for 30 minutes or longer, the crystals coarsened such that the grain size exceeded about 200 μm, reducing the toughness of the joint.

Figure 5:
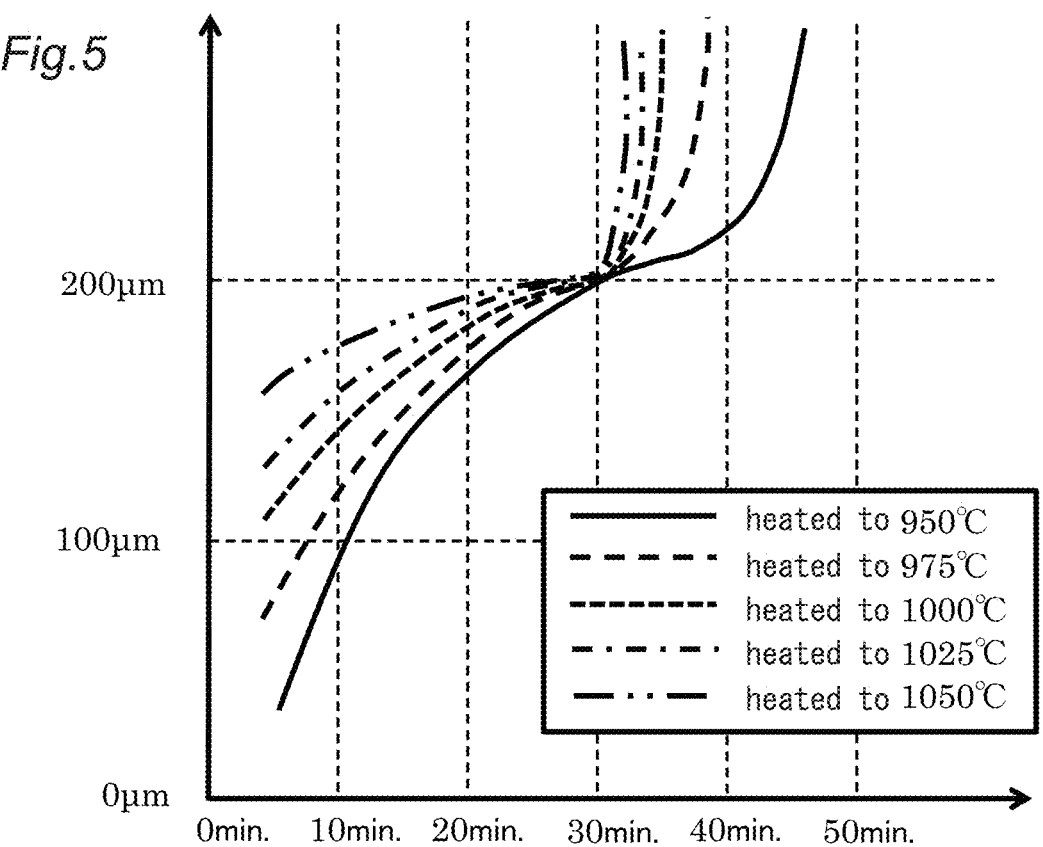
FIG. 5 is a graph showing the relationship between the tendency of coarsening of priory grains of the steel associated with the present invention, holding temperature and time.

FIG. 5 shows the relationship between holding time and prior γ grain size found when the inventive steel was heated to and held at temperatures in the range of 950 to 1050° C. There are no major differences in particle growth rate until 30 minutes. However, when the holding time is 30 minutes or longer, the prior γ particle size is clearly not smaller than 200 μm. This phenomenon can be explained by assuming that high-temperature stable particles, which work to prevent grain growth in this temperature range, such as precipitate particles of NbC, TiN and $Al_2O_3$, for example, are present in a certain density and, in the time range in which their pinning effect is effective, the grain size essentially depends on the distance between particles, and the time at which the thermal activation process becomes significant and this pinning effect is removed is 30 minutes. The same effect can be expected if $M_{23}C_6$-type carbides are stable at high temperature; however, this effect cannot be expected for the present invention, which uses a steel type with a relatively low Cr content.

Figure 6:
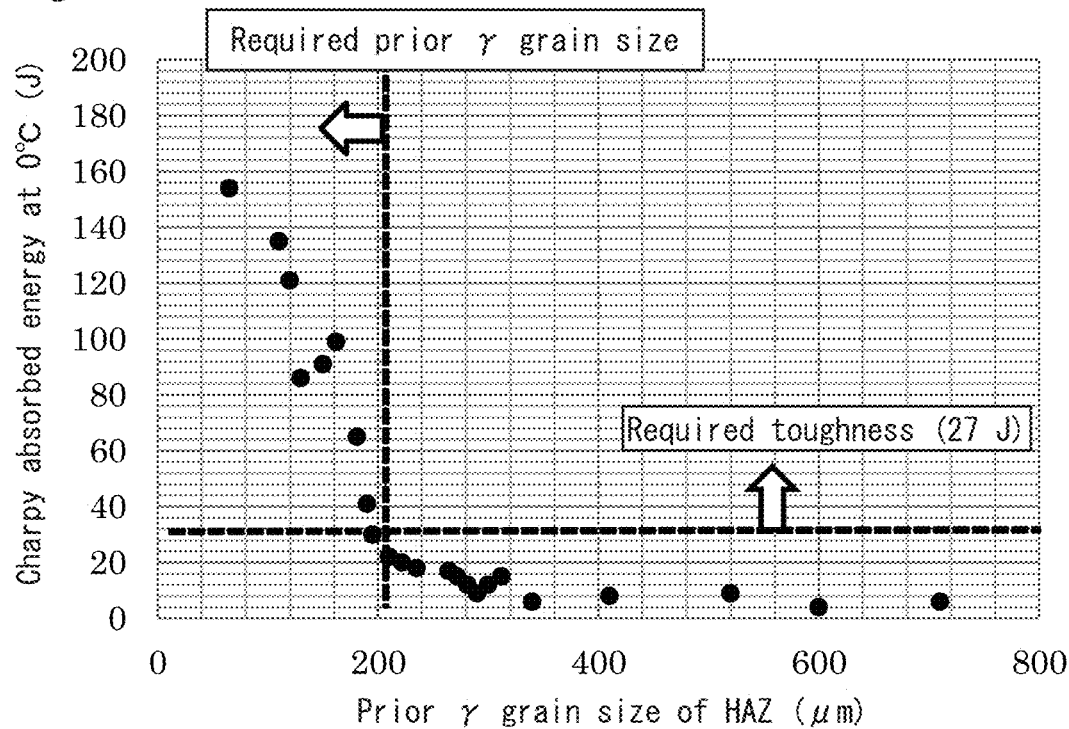
FIG. 6 shows the relationship between the prior γ grain size of the steel associated with the present invention and the Charpy-impact absorbed energy.

FIG. 6 shows the relationship between the prior γ particle size of the inventive steel and 2 mm V-notch Charpy impact test results. It shows that, if the prior γ particle size is not smaller than 200 μm, the Charpy impact absorbed energy value at 0° C. of 27 J, which is generally required during machining or welding of a pressure container, is not achieved. That is, FIGS. 5 and 6 show that the holding time of the pre-weld heat treatment must be 30 minutes or shorter in order to provide a joint with a target toughness for the present invention.

Thus, in the pre-weld heat treatment of the present invention, the region located between the surface of the edge and the position distant from the surface of the edge by a pre-weld heat treatment depth of 10 to 50 mm is heated to a temperature of 950 to 1050° C., and is held at that temperature for 10 to 30 minutes. The pre-weld heat treatment may be divided into two or more runs; residual heat from the first run may be used to keep that region hot for a total of 10 to 30 minutes. For the cooling after the heat treatment, the joint may be left to cool, for example.

(Post-Weld Heat Treatment Conditions and State of Presence of Precipitates)

Now, the post-weld heat treatment, which forms a part of the method of manufacturing a weld structure of a ferritic heat-resistant steel according to the present invention and the state of precipitates in the resulting microstructure will be described.

The post-weld heat treatment of the present invention involves, after the welding of the edge, heating the portion beginning with the edge surface and ending with a position in the range between the pre-weld heat treatment depth and 100 mm toward the base material at a temperature of 680 to 750° C. (hereinafter referred to as "post-weld heat treatment temperature"), and holding the portion at that temperature for a period of time of 30 minutes or longer and satisfying Formula (1).

Typically, the post-weld heat treatment is applied at a temperature of (transformation point of base material −20)° C. or longer for a period of time dependent on the plate thickness. However, to achieve the same creep rupture strength as the base material, the precipitation state of $M_{23}C_6$-type carbides needs to be controlled to be substantially the same as that of the base material. At the same time, the post-weld heat treatment has the effect of essentially tempering bainite of relatively high hardness produced as the weld metal is quenched, and is effective in preventing brittle fracture of the weld metal or brittle fracture of the bond.

According to the present invention, the base material is heated to the γ range as the pre-weld heat treatment; as such, the heated region of the base material is also as-quenched bainite, which has a higher hardness than ferrite phase. Thus, quench cracking, brittle fracture or toughness decrease need to be prevented. The post-weld heat treatment is a necessary heat treatment to achieve this. That is, according to the present invention, the post-weld heat treatment, which is typically performed to soften the weld metal and bond of the weld joint and sometimes a high-hardness microstructure in the HAZ, is performed to temper also the portions of the base material that was heated to the γ range in the pre-weld heat treatment. As such, the heated region during the post-weld heat treatment in the depth direction at that temperature (hereinafter referred to as "post-weld heat treatment depth") needs to be not smaller than the pre-weld heat treatment depth.

Generally, co-metal-based weld metal, to which the present invention is directed, is designed presupposing that the temperature of the pre-weld heat treatment is not higher than the tempering temperature of the base material minus 20° C. That is, the alloy of weld metal is designed to achieve a high-temperature strength and a creep strength that are equal to or larger than those of the base material when tempered at a temperature lower than that for the base material. If tempering occurs at high temperature, microstructure recovery proceeds, which leads to softening, and thus high-temperature strength decreases and creep strength also tends to decrease. As such, in the post-weld heat treatment, the state of presence of precipitates, which represent a creep-strengthening factor, needs to be precisely controlled such that the creep strength is equal to or higher than that of the base material, while maintaining high-temperature strength. That is, the creep strength of the joint is not equal to or larger than that of the base material if the post-weld heat treatment temperature is too high, which would cause coarsening of precipitates, or if the post-weld heat treatment temperature is too low, which would cause insufficient precipitation.

The present invention solves this problem by controlling the state of presence of precipitates, particularly precipitates on grain boundaries that consistently support the creep strength of ferritic heat-resistant steel for a prolonged period of time. As discussed above, type IV damage is caused by a reduction in the precipitation density of precipitates on grain boundaries, i.e. grain-boundary occupancy. This suggests that, in the base material and weld metal, the grain-boundary occupancy decreases for different reasons to reduce creep strength. To improve the creep rupture strength of the weld joint, the present inventors did research on the precipitation state of $M_{23}C_6$-type carbides in a HAZ. From this research, they found it necessary that the average grain size of $M_{23}C_6$-type carbides is not larger than 200 nm, the coverage of large-angle grain boundaries with these $M_{23}C_6$-type carbides (hereinafter referred to as "grain-boundary coverage") is not smaller than 50%, and the average distance between particle surfaces of $M_{23}C_6$-type carbides that have precipitated on large-angle grain boundaries (hereinafter referred to as "inter-particle distance") is not larger than 150 nm in the HAZ after the post-weld heat treatment.

Figure 7:
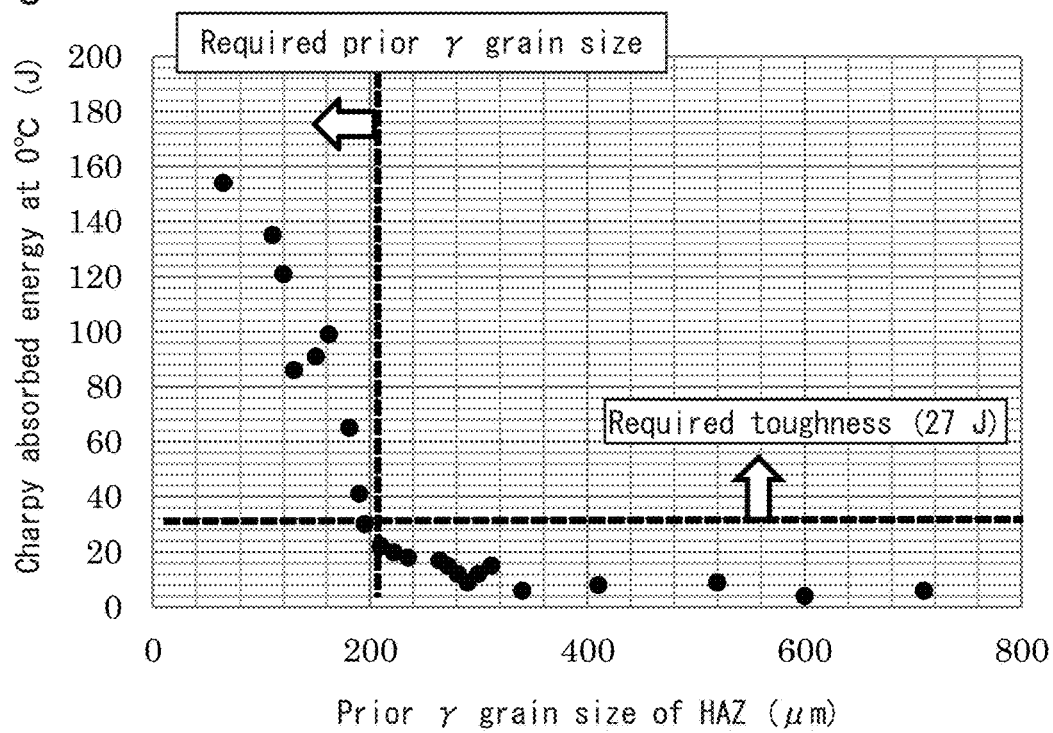
FIG. 7 shows the relationship between the average particle size of $M_{23}C_6$-type carbides in the HAZ and Charpy impact absorbed energy at 0° C.

FIG. 7 shows the relationship between the average grain size of $M_{23}C_6$-type carbides in the HAZ and the toughness of this portion at 0° C. It is apparent that, if the average grain size of $M_{23}C_6$-type carbides is larger than 200 nm, the toughness at 0° C. is below the target of 27 J, which means that a practical welded joint cannot be realized even though Type IV damage is prevented.

Figure 8:
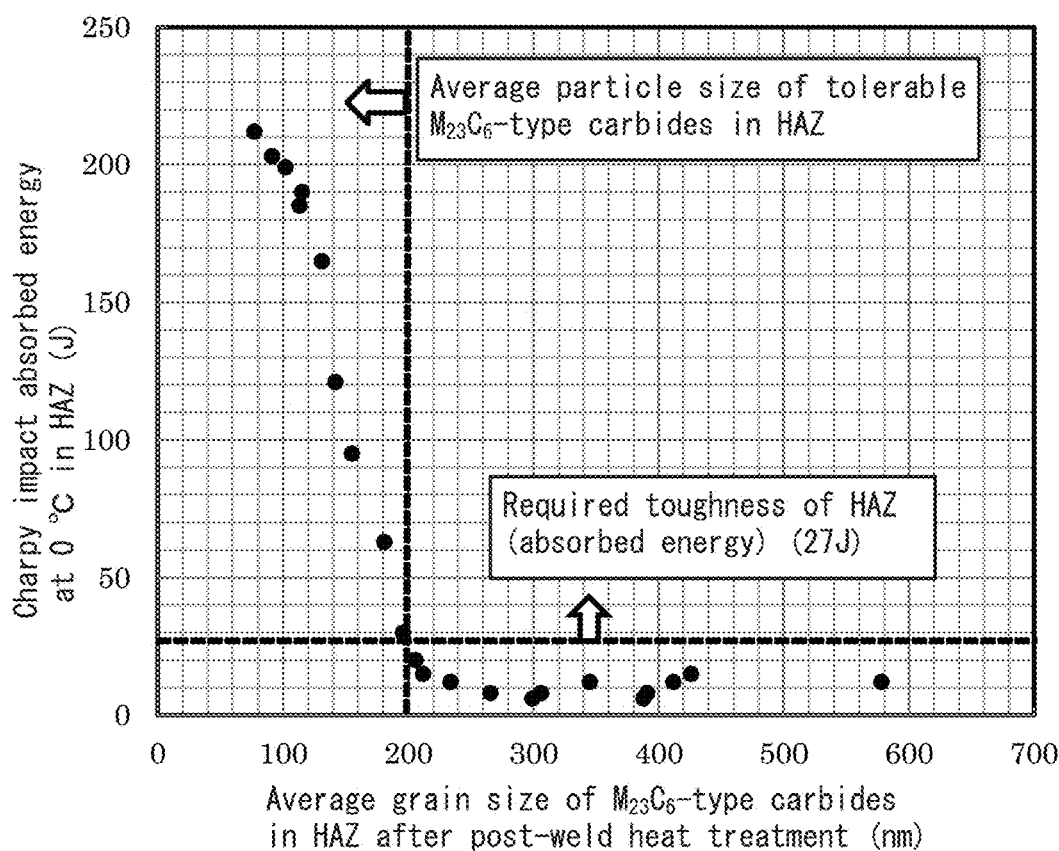
FIG. 8 is a graph showing the relationship between the inter-particle distance of $M_{23}C_6$ in the HAZ and the estimated creep rupture strength of the welded joint for 550° C. and 100,000 hours.

FIG. 8 shows the relationship between the inter-particle distance of particles (mainly $M_{23}C_6$-type carbides in the present invention) on large-angle grain boundaries and the estimated creep rupture strength for 550° C. and 100,000 hours. It shows that, if the inter-particle distance is larger than 150 nm, the estimated creep rupture strength is not larger than the target of 100 MPa.

That is, the post-weld heat treatment conditions must be decided appropriately taking account of such changes in the state of precipitates.

An essential requirement of the present invention is to add a post-weld heat treatment in which the structure is held in the temperature range of 680 to 750° C. for 30 minutes or longer. This provides the above-discussed desired state of precipitates in portions including the HAZ and joint.

The growth of precipitates is a function of temperature and time, and the higher the temperature within the precipitation temperature range and the longer the time, the quicker the precipitation and growth become. In view of this, the post-weld heat treatment conditions of the inventive steel are further limited by introducing a parameter that considers temperature and time to be equivalent in terms of diffusion. Based on experiment results, within the range of the post-weld heat treatment of the present invention, the following formula, (1), is effective in preventing precipitates from coarsening to an unnecessary degree. In formula (1), T is the temperature (° C.), t is the holding time (hour), and Log is the common logarithm.

$$(\mathrm{Log}(t)+10)\cdot(T+273)<10539 \tag{1}$$

Figure 9:
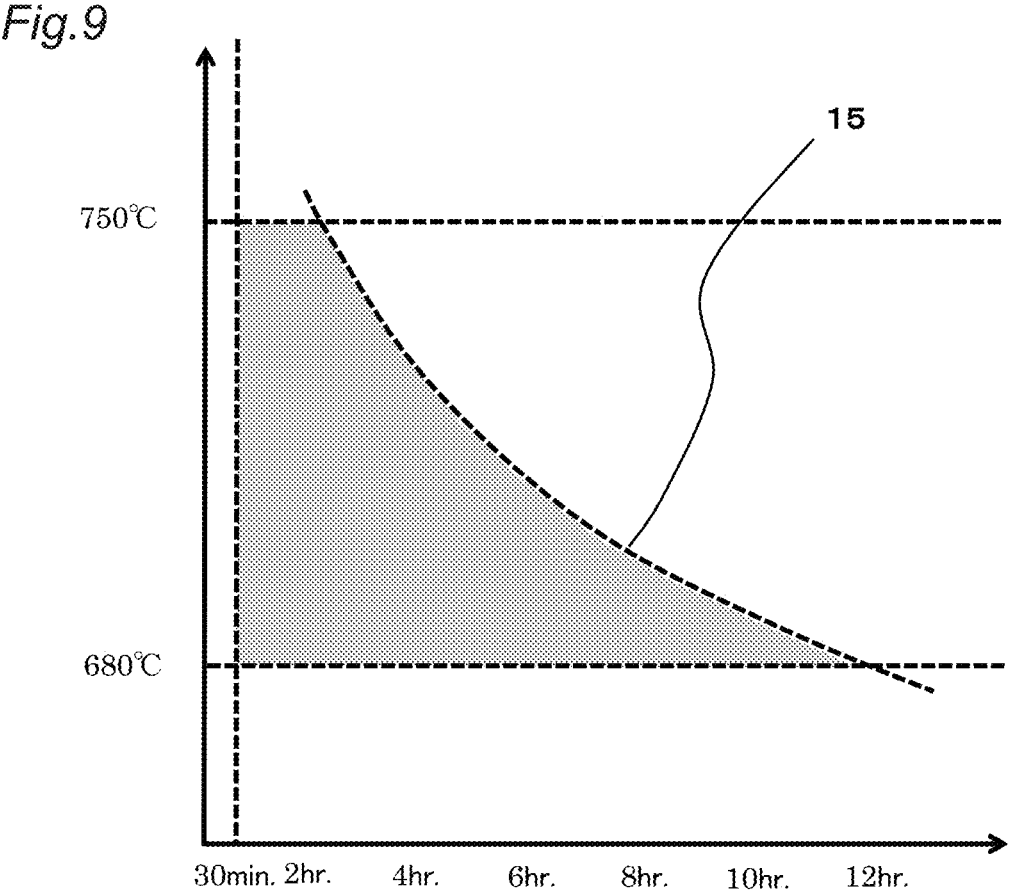
FIG. 9 is a graph illustrating post-weld heat treatment conditions.

To illustrate the condition range of the post-weld heat treatment, FIG. 9 represents formula (1) on a relationship graph between the temperature and time of the post-weld heat treatment to show the range of temperature and time that is effective according to the present invention. A post-weld heat treatment for 30 minutes or longer is necessary; in reality, it is necessary to perform it within a finite period of time since a post-weld heat treatment for an extremely long period of time causes coarsening of precipitates. Formula (1) is a special precipitate growth estimation formula of the present invention that has been obtained by assuming a body diffusion control growth law of precipitates and deforming a Larson-Miller formula that assumes a constant permeability of time and temperature during diffusion of matter. The constants in formula (1) have been decided by observing the state of precipitates in steel held at a given temperature and time condition by transmission electron microscopy, and statistically analyzing the result.

Creep tests at 550° C., 600° C. and 650° C. for up to 10,000 hours, which used the Larson-Miller method and estimated the creep rupture strength for 100,000 hours, verified that, outside the hatched range of FIG. 9, the average grain size of precipitates exceeds 200 nm or the inter-particle distance of precipitates exceeds 150 nm or both of these situations occur at the same time such that the creep strength of the weld joint decreases.

Figure 10:
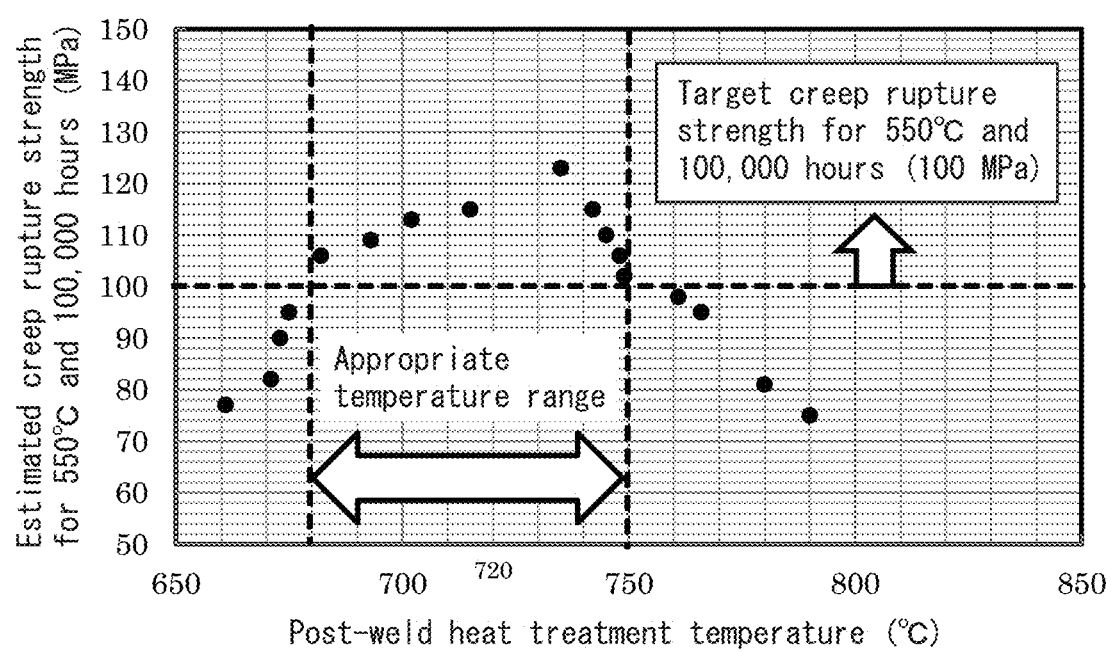
FIG. 10 shows the relationship between the post-weld heat treatment time and the estimated creep rupture strength for 550° C. and 100,000 hours.

FIG. 10 shows the relationship between post-weld heat treatment temperature and the estimated creep rupture strength at 550° C. and after 100,000 hours.

Figure 11:
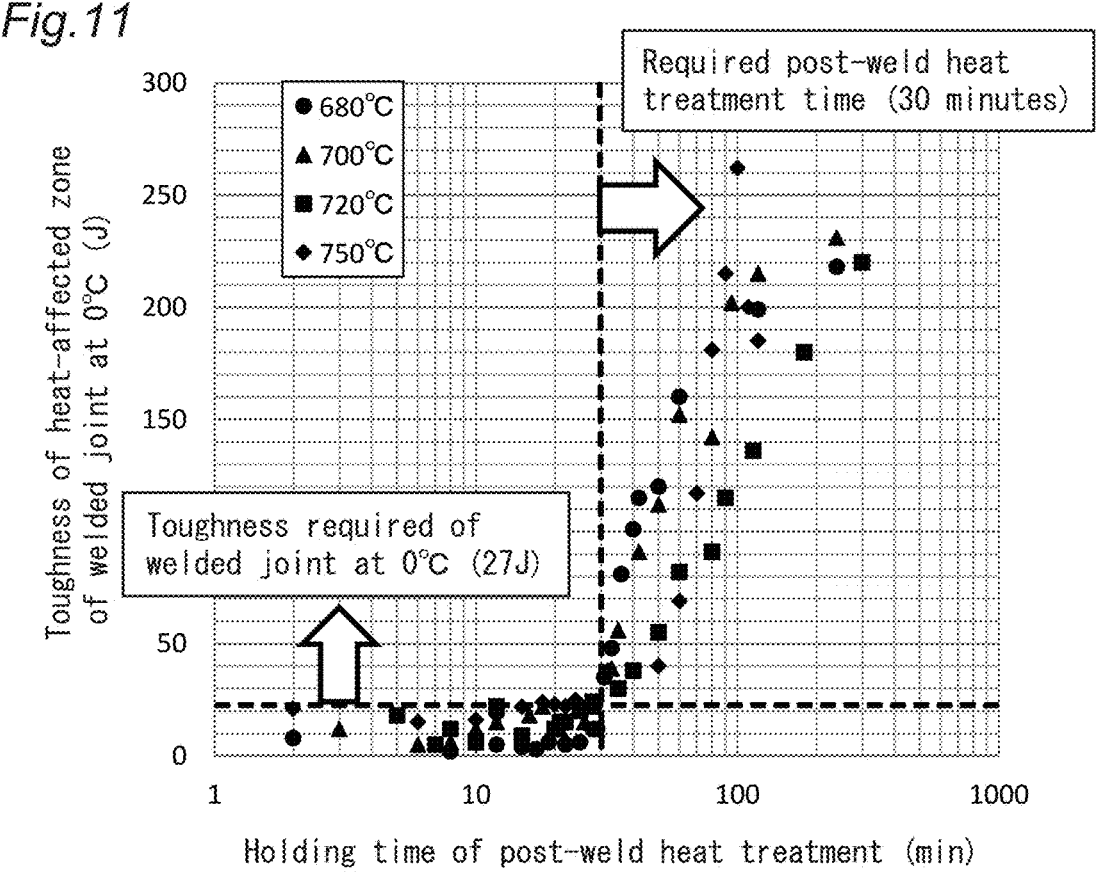
FIG. 11 is a graph showing the relationship between the toughness of the welded joint and the holding time of the post-weld heat treatment.

It can be seen that, when the post-weld heat treatment temperature is lower than 680° C. or higher than 750° C., the creep rupture strength decreases and does not reach 100 MPa for 550° C., which is the target value of the present invention. The comparison was made with the process time fixed to 2 hours; the time dependency is as shown in FIG. 9. Further, FIG. 11 shows the relationship between post-weld heat treatment time and Charpy impact absorbed energy for 0° C., obtained when the post-weld heat treatment was performed at various temperatures in the range of 680 to 750° C. It can be seen that the necessary toughness cannot be obtained unless the post-weld heat treatment is performed for 30 minutes or longer, regardless of temperature. The portion of the weld joint where the toughness can most easily decrease is the bond, in which the crystal grain size can easily increase; in view of this, in the following description, the toughness of the weld joint is represented by the Charpy absorbed energy measured on an impact test specimen with a notch of 2 mm at the bond. This does not apply when the toughness of other portions is discussed.

Figure 12:
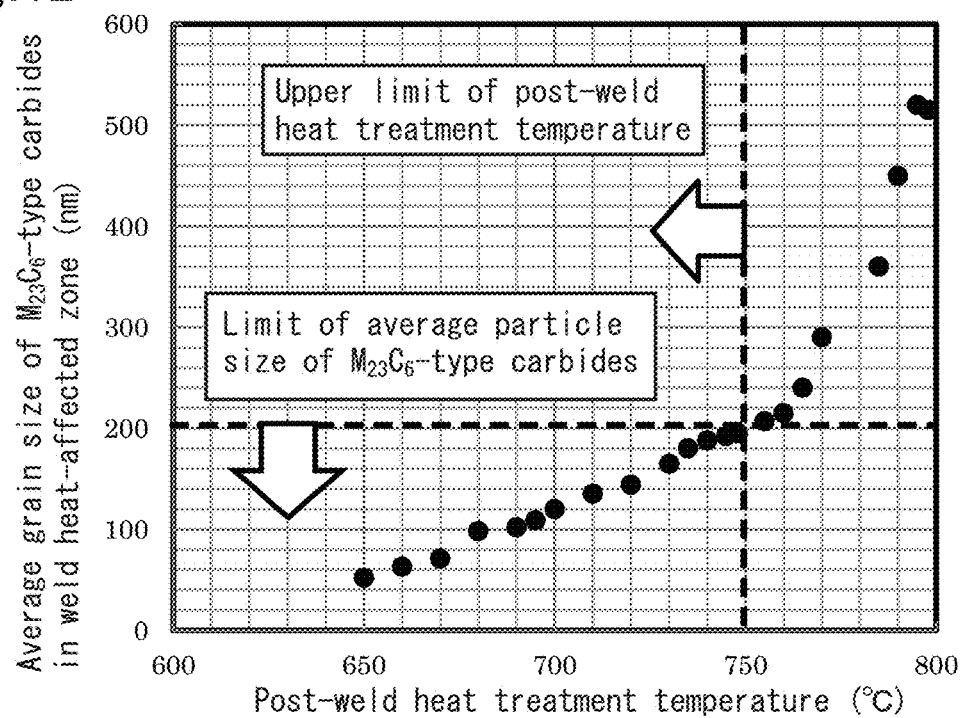
FIG. 12 is a graph showing the relationship between the post-weld heat treatment temperature and the average grain size of $M_{23}C_6$-type carbides.

FIG. 12 is a graph showing the relationship between the average grain size of $M_{23}C_6$-type carbides in the HAZ (average value of the diameters of circles that correspond to particles) and the post-weld heat treatment temperature. The experiments were made where the holding time at the post-weld heat treatment temperature was up to 10 hours. In these experiments, changes in the holding time hardly affected the average grain size of $M_{23}C_6$-type carbides regardless of temperature, and the grain size was effectively a function of temperature.

FIG. 12 clearly shows that, if the post-weld heat treatment temperature exceeds 750° C., $M_{23}C_6$-type carbides coarsen such that its average grain size exceeds 200 nm.

Figure 13:
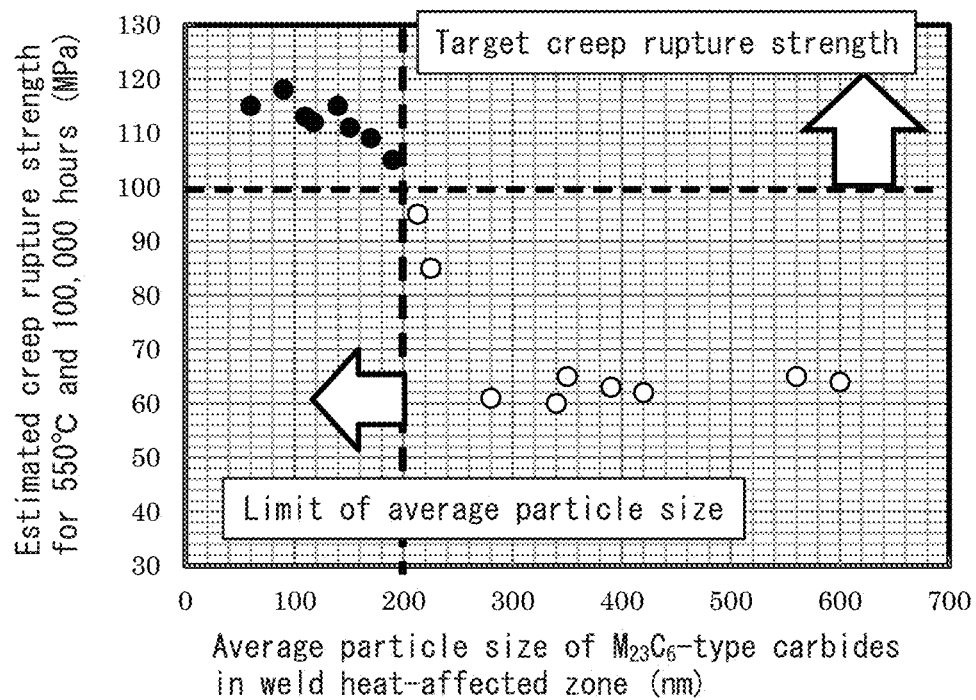
FIG. 13 is a graph showing the relationship between the average grain size of $M_{23}C_6$-type carbides and the estimated creep rupture strength for 550° C. and 100,000 hours.

FIG. 13 shows the relationship between the average grain size of $M_{23}C_6$-type carbides and the estimated creep rupture strength for 550° C. and 100,000 hours. It can be seen that, if the average grain size exceeds 200 nm, Type IV damage occurs such that the estimated creep rupture strength does not reach the target value of 100 MPa. In the graph, ● represents an example with a normal creep rupture with ductility, and, separately, ○ represents an example with a low-ductility fracture due to Type IV damage where the result of an observation of the microstructure by electron microscopy enabled clearly identifying such damage.

Figure 14:
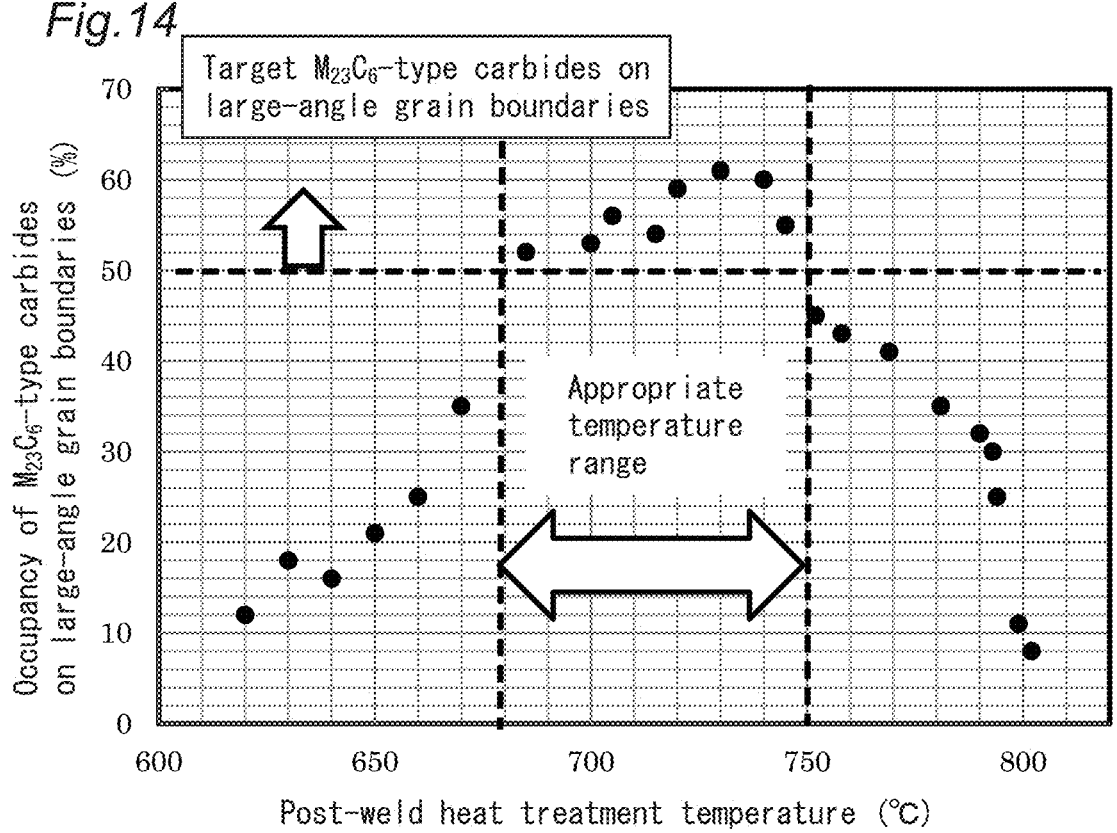
FIG. 14 is a graph showing the relationship between the post-weld heat treatment temperature and the coverage of large-angle grain boundaries with $M_{23}C_6$-type carbides.

FIG. 14 shows the relationship between the post-weld heat treatment temperature and the occupancy of large-angle grain boundaries of the HAZ with $M_{23}C_6$-type carbides (grain-boundary coverage). These tests were also conducted with holding times of 30 minutes to 12 hours; however, the graph does not show data groups separated depending on time because time dependency of precipitate size was not significant and, as a result, there were no significant differences in grain-boundary coverage. Temperature significantly affected grain-boundary coverage.

As shown in FIG. 12, precipitates coarsen when the post-weld heat treatment temperature exceeds 780° C. On the other hand, after the post-weld heat treatment for 30 minutes, an amount of $M_{23}C_6$-type carbides at that temperature close to the thermodynamic equilibrium value (particularly, amount determined by C concentration) has already precipitated, and thus a higher post-weld heat treatment temperature increases the average grain size and, at the same time, causes Ostwald ripening and reduces the number of particles (small particles are dissolved and large particles grow to reduce interface energy, thereby stabilizing the microstructure). That is, an increase of the size of particles causes smaller particles to disappear, and thus reduces the occupancy of $M_{23}C_6$-type carbides on large-angle grain boundaries. On the other hand, at a temperature below 680° C., $M_{23}C_6$-type carbides do not precipitate sufficiently to reach the amount of thermodynamic equilibrium; thus, even though the particle size is small, the average inter-particle-surface distance is large, in which case, too, 50%, which is a sufficient grain-boundary coverage, is not reached. That is, if only the pre-weld heat treatment is properly performed, this achieves complete solid solution of carbides but achieves only a precipitate state in which the creep strength of the material cannot be achieved in a stable manner.

The reason why the target creep strength cannot be achieved unless the grain-boundary coverage is not lower than 50% is specific to the low-alloy ferritic heat-resistant steel that is the steel type associated with the present invention. That is, if the amount of Cr is not larger than 7%, i.e. relatively small, then, the total length of large-angle grain boundaries formed in the ferrite or ferrite-pearlite or bainite or bainite-ferrite formed by "complete annealing" is smaller than that in high-strength steels such as high-Cr ferritic heat-resistant steel. This is because internal stresses generated during transformation are low such that the size of block grains, which provide the minimum microstructure constituent unit, or crystal grains of ferrite is small compared with the borders or grain boundaries containing high-density dislocations such as martensite, that is, overwhelmingly small as viewed in a microstructure cross section. Of course, the borders and grain boundaries formed to mitigate stresses depends on the magnitude of internal stresses generated during lattice transformation and, if this is small, it is unnecessary to form borders or grain boundaries. A typical example is complete ferrite: newly formed ferrite grain boundaries are generated and grow using prior γ grain boundaries as nuclei, and no borders are formed within them.

This also suggests that, to improve the high-temperature strength, especially creep strength of the material by maintaining a small inter-particle distance required to ensure that grain-boundary precipitates, after being held in a creep environment for a prolonged period of time, are left in the form of a series of particles due to grain-boundary migration and, as if they were a series of precipitate particles within grains, reduce the mobility of dislocations, it is essentially necessary to provide a precipitate density higher than that of martensite-based heat-resistant steel (i.e. high-Cr ferritic heat-resistant steel) in a stable manner.

Figure 15:
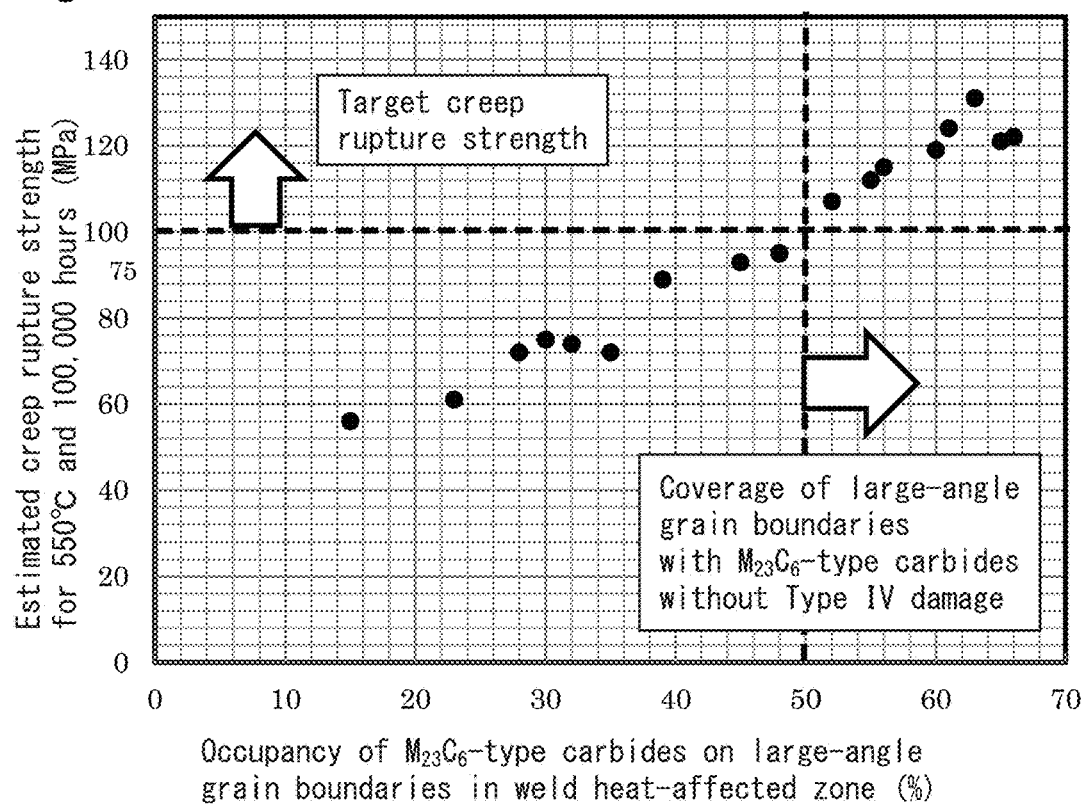
FIG. 15 is a graph showing the relationship between the coverage of large-angle grain boundaries with $M_{23}C_6$-type carbides and the estimated creep rupture strength for 550° C. and 100,000 hours.

Thus, experiments demonstrated that an appropriate pre-weld heat treatment and an appropriate post-weld heat treatment can achieve a grain-boundary coverage with $M_{23}C_6$-type carbides of 50% or more. Further, as shown in FIG. 15, a HAZ with a grain-boundary coverage with $M_{23}C_6$-type carbides of 50% or more provides an estimated creep rupture strength for 100,000 hours that is substantially equal to that of the base material, and causes no reduction in strength. Since there is no microstructure factor that would cause Type IV damage, complete prevention of this phenomenon is possible.

The post-weld heat treatment depth should be not smaller than the pre-weld heat treatment depth and not larger than 100 mm. The purpose of the post-weld heat treatment is to remove stresses in the microstructure of the HAZ by means of annealing; thus, the same depth as that for the local pre-weld heat treatment that produces a microstructure similar to an HAZ must be subjected to the post-weld heat treatment. The maximum depth is limited to 100 mm because performing the post-weld heat treatment on the HAZ as well as portions that have not been affected by the pre-weld heat treatment would have the same effect as continuously tempering the base material for a long time and heating large portions that have not been affected by heat from the weld operation of the present invention would reduce the high-temperature strength (i.e. soften the portions excessively). This is to prevent promotion of SR softening, which is generally known. If the post-weld heat treatment range is not larger than 100 mm, the high-temperature strength of the joint of the steel type associated with the present invention does not decrease below the tolerable level of stresses. Although this phenomenon is also found in normal welded joints, the range limits are specific to the present invention.

In the above-discussed experiments, the average grain size of precipitates (diameter of circles that correspond to particles) on large-angle grain boundaries was calculated in the following manner: first, a test specimen was subjected to the post-weld heat treatment and a microstructure cross section thereof was observed by SEM; subsequently, the grain-boundary microstructure forming ferrite was observed by EBSD in more detail. During this, grain boundaries for which the difference between the orientations of adjacent crystals was 15° or more and the angle between the orientations of adjacent crystals about the common rotational axis was a diffraction angle specific to block grain boundaries selected during martensite transformation, i.e. 54°, 60° and 16°, were drawn with EBSD-based SEM, and were treated as "block grain boundaries (large-angle grain boundaries)". A picture of precipitates of carbides precipitated on such large-angle grain boundaries (in the inventive steel, only $M_{23}C_6$-type carbides are precipitated upon completion of heat treatment) is taken by electron microscopy with a magnifying power of 10,000, and the diameter of particles on the cross section was determined based on this picture.

In such image pictures with a magnifying power of 10,000, five or more fields of view were observed for the heat-affected zone of one joint, and the cross-sectional areas of all these precipitate particles were measured; then, assuming that all of them were circular, backward calculation was performed from the areas to determine the diameters of the corresponding circles.

(Features of Partial Pre-Weld Heat Treatment)

One feature of the present invention is to prevent incomplete solid solution of carbides in the HAZ by means of a pre-weld heat treatment.

Performing a pre-weld heat treatment on the entire material achieves the same effects as the present invention; however, performing a pre-weld heat treatment on an entire large pressure container is not practical from viewpoints of furnace capacity or heating capability and requires very high costs, and thus does not provide a realistic solution.

On the other hand, if a partial heat treatment is performed to enable complete solid solution of carbides in portions, as in the present invention, at least with some heating methods of the heat treatment equipment, the process is completed in a simple manner and in a short period of time if high-frequency heating equipment or electrical heating equipment, for example, is used, which significantly reduces costs and provides a realistic solution.

In all instances, a heat treatment by local heating has the problem of intermediate-temperature heating. That is, if only a target portion is heated to a target temperature, an intermediate-temperature region heated to a temperature range lower than the target temperature is present in adjacent portions. Thus, the possibility of there being portions in which the intended microstructure or effect is not achieved and the possibility of lower-temperature portions experiencing special microstructure changes must always be considered. However, it was verified by experiment that the present invention does not entail these problems.

If the pre-weld heat treatment is performed at 950 to 1050° C., adjacent portions are reheated to a temperature range up to 950° C., and there are portions that are heated to temperatures directly above the $Ac_3$ point that cause Type IV damage. In these portions, carbides may also coarsen due to incomplete solid solution.

However, Type IV damage is caused as a portion is exposed to a temperature directly above the α-to-γ transformation point for a short period of time and is transformed to γ phase to cause some carbides to be dissolved in the matrix in a short time and, before they are completely dissolved, they are cooled to produce undissolved carbides. Undissolved carbides are coarsened by the subsequent post-weld heat treatment. Further, since the positions of grain boundaries of recrystallized γ grains that are produced during this process are different from the positions of prior γ grain boundaries, coarsening of incompletely dissolved carbides occurs at positions that are completely different from those of the newly produced prior γ grain boundaries. Thus, the precipitation density on grain boundaries decreases such that a series of carbide precipitate particles for a long time is not achieved, resulting in relatively random coarse carbides, which leads to a relatively high mobility of dislocations.

The holding time for the portions heated to a temperature directly above the transformation point when heating occurs once, or the total holding time when heating occurs a plurality of times, is at most about 10 seconds. Thus, undissolved (incompletely dissolved) carbides remain, leading to coarsening during reprecipitation, and carbides that precipitated on the original prior γ grain boundaries cannot precipitate on the new prior γ grain boundaries that have been created by re-transformation in the weld heat-affected portion, and are left in grains.

In view of these phenomena, conversely, applying a sufficient holding time prevents production of undissolved carbides that would cause Type IV damage, i.e. incomplete solid solution of carbides even when the temperature is directly above the transformation point. This was proven by the present inventors by experiment. They discovered that the time required for solid solution of carbides at a temperature directly above the transformation point is about 10 minutes as shown in FIG. 3 in low-alloy ferritic heat-resistant steels such as that of the inventive steel, though with some variations depending on the maximum heating temperature, a conclusion obtained by heating test specimens to a temperature directly above the transformation point for different holding times, observing them in microstructure pictures by TEM and treating the time at which most $M_{23}C_6$-type carbides disappear in the field of view as the required time. That is, if heating occurs directly above the $Ac_3$ point for 10 minutes or longer for the pre-weld heat treatment for preventing incomplete solid solution of carbides in the weld heat-affected zone, carbides are completely dissolved in these portions and no Type IV damage occurs.

On the other hand, since the steel is heated from the edge surface, the heat-affected width expands from the edge surface to the interior of the steel over time such that the portion exposed to a temperature directly above the transformation point successively moves into the interior of the steel, which always leaves the possibility of there being portions that are heated for a short period of time.

Thus, if simply partial heating is applied to the edge surface, this movement of the heat-affected zone must be considered. If the heat-affected zone constantly moves toward the interior of the steel, the pre-weld heat treatment may create a new microstructure that may cause Type IV damage on the heating frontier.

Figure 16:
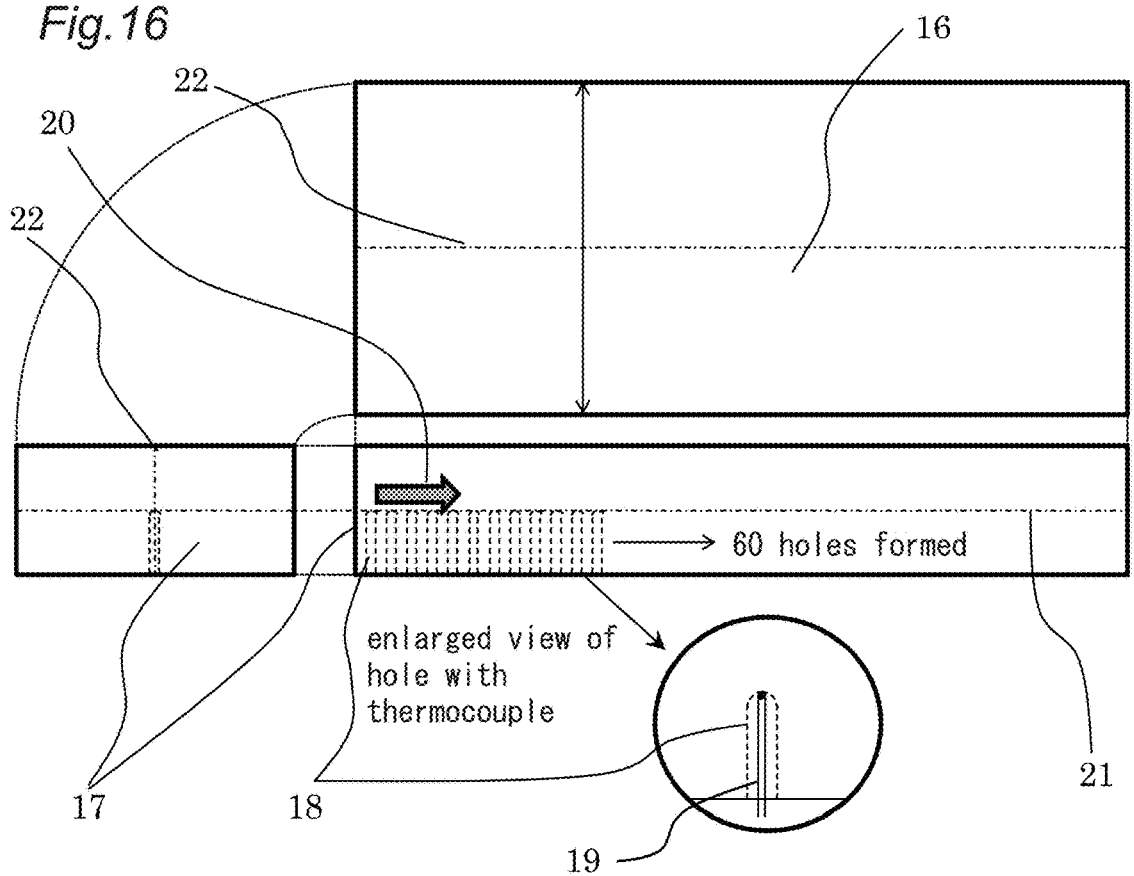
FIG. 16 is a schematic view (trihedral figure) of a steel-plate test specimen for measurement of temperature propagation in a thickness of 30 mm.

In view of this, the inventors did research to determine the movement behavior of the position of the portion where the temperature reaches the transformation point for α-to-γ transformation, using a steel plate with a thickness of 150 mm. FIG. 16 shows a schematic view of a test specimen used to measure how temperature propagates. First, holes with a pitch of 1 mm were formed on the surface of the steel plate beginning at the heated end surface 17 of the steel plate, each hole being 0.5 mm long and reaching the middle along the plate thickness of the steel plate, and a thermocouple was joined to the bottom of each hole. Then, the holes created for temperature measurement are filled with $Al_2O_3$ powder to prevent dissipation of heat from the holes for measurement. Then, the end is heated by high-frequency induction-heating equipment such that the outer-layer surface constantly remains at 950° C. (lower limit of the temperature of the pre-weld heat treatment of the present invention), and the propagation behavior of temperature was examined using the thermocouples.

Figure 17:
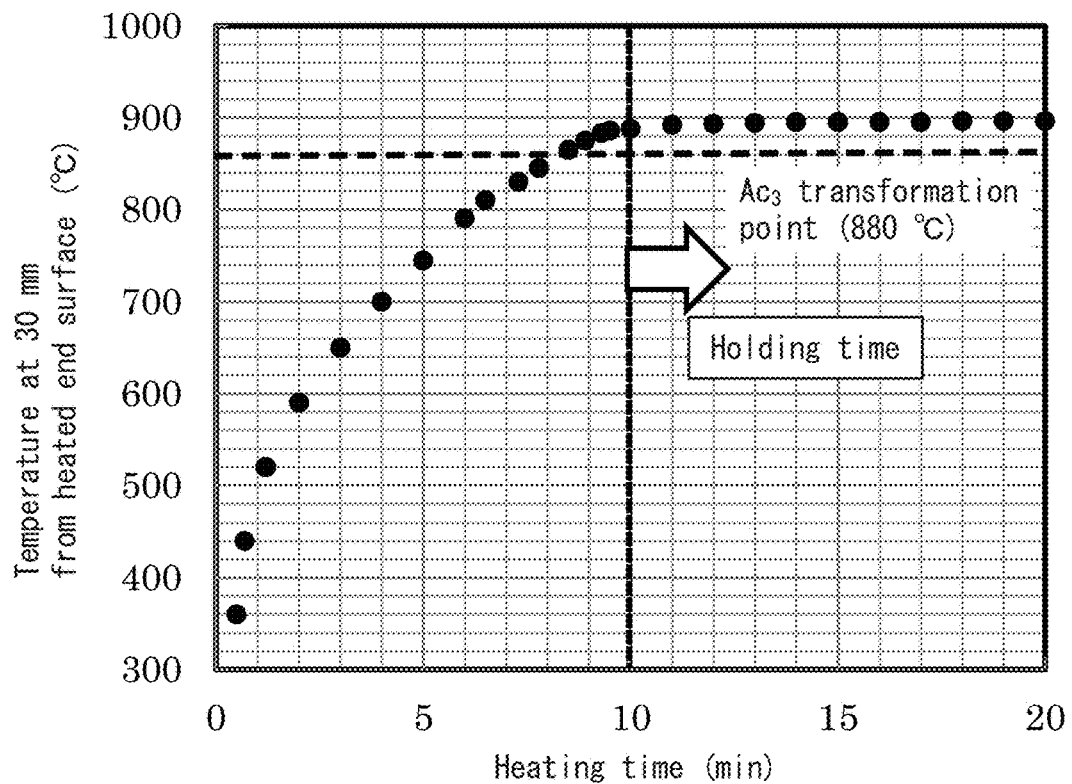
FIG. 17 is a graph showing the relationship between the temperature at 30 mm along the depth direction when the weld edge surface is heated to 950° C., and the elapsed time.

In the test specimen 16 shown in FIG. 16, the holes 18 reaching the middle 21 along the plate thickness in which the temperature-measurement thermocouples 19 are to be positioned are arranged, beginning at the heated end surface 17, along the length 20 of the plate right at the middle 22 along the positional width. FIG. 17 shows how temperature changes with time at the distance of 30 mm from the heated end surface 17 (selected as a representative depth position in the pre-weld heat treatment range). The horizontal axis of FIG. 17 indicates heating time, i.e. the elapsed time from the time point at which temperature increase begins, and is different from holding time (i.e. elapsed time from the time point at which the target portion reached the set temperature). It is shown that, when the specimen is heated to 950° C., the temperature at the position of 30 mm as a result of the heating by heat transfer from the heated end surface becomes substantially constant at about 10 minutes and, thereafter, the temperature gradually increases to temperatures higher than 880° C., which is the $Ac_3$ transformation point of the steel of Table 1, by about 20° C., although the increase is so small that almost no changes are recognizable.

This suggests that, if heat is supplied by heat transfer from only one end surface of the steel plate, the temperature gradient determined by the coefficient of heat transfer of the material is generally fixed after 10 minutes and, if the steel is sufficiently long with respect to heat input, the temperature distribution becomes similar to the one consistent with the temperature curve that assumes 0° C. in the infinite direction. That is, in portions distant by 30 mm or more, the maximum heating temperature gradually decreases from around 900° C. and the temperature does not increase from that level.

Since portions exposed to temperatures not higher than the $Ac_1$ point in a certain temperature gradient for ten minutes or longer are not heated to temperatures not lower than the $Ac_1$ point, decomposition/solution of carbides for a short period of time does not occur, and thus undissolved carbides do not remain, that is, incomplete solid solution, which is partial solid solution of carbides, does not occur at all, leaving no possibility of Type IV damage occurring, even though softening due to a reduction of the dislocation density in the matrix may occur. In the portions that are retained at an intermediate temperature between the $Ac_1$ point and $Ac_3$ point, the microstructure simply becomes dual-phase, where the proportion is changing as a function of the maximum heating temperature; in the portions that have become γ phase, decomposition/solution of carbides occurs, and, if there is no change in the temperature distribution, complete decomposition/solution of carbides in the γ phase occurs and incomplete solid solution is not observed. That is, even in a temperature range where two phases coexist, there is no microstructure with incomplete solid solution of carbides, which would cause Type IV damage.

Figure 18:
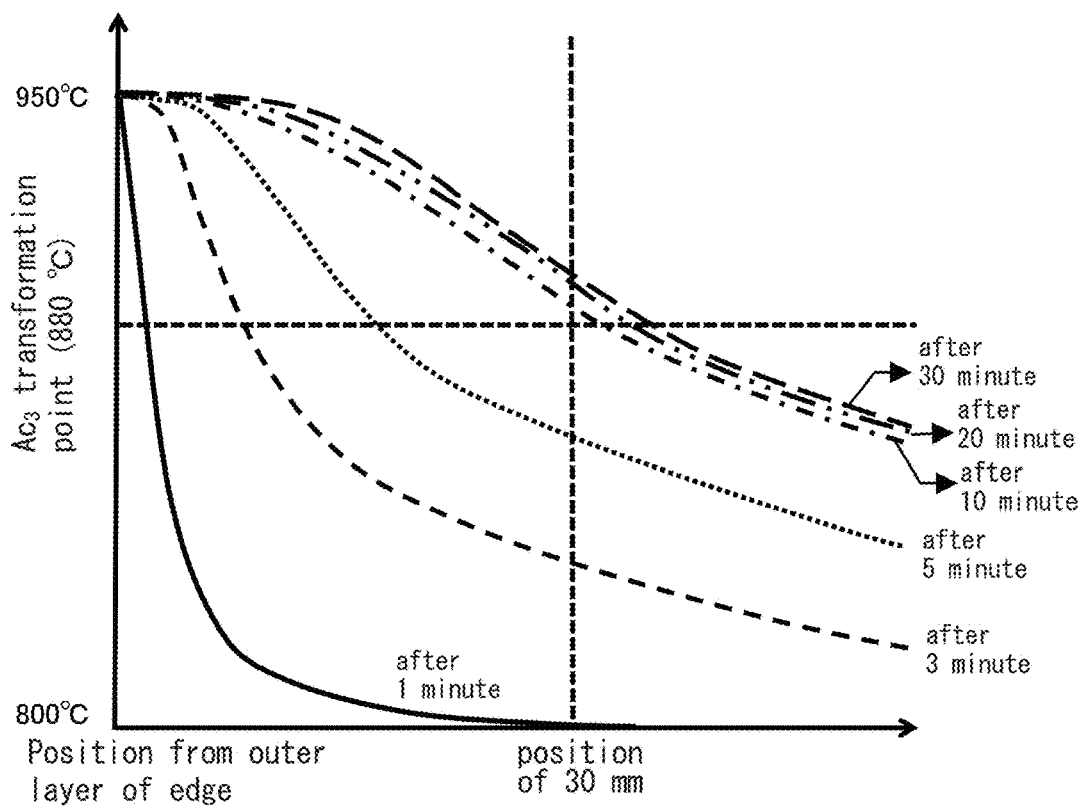
FIG. 18 is a graph showing how the temperature distribution along the depth direction changes depending on time when the weld edge surface is heated to 950° C.

To verify these phenomena, the edge end surface of the steel-plate test specimen shown in FIG. 16 was heated to 950° C., and the temperatures indicated by the thermocouples at various positions were recorded when the specimen was held for the six different periods of time of 1 minute, 5 minutes, 10 minutes, 20 minutes and 30 minutes, and these temperatures were treated as indicating the temperature distribution at positions along the depth direction beginning with the edge surface to determine how temperature varied. The results are shown in FIG. 18. FIG. 18 also shows the position of 30 mm from the edge surface and the $Ac_3$ transformation point temperature.

The temperature distributions for 10 minutes and longer of heating are not very different, because the heat release in the depth direction and the heat input from the edge surface, as represented as values per unit area, are generally balanced at 10 minutes and longer, resulting in no variation in this time range.

This verifies that, essentially, Type IV damage does not occur in the steel components presented by the present invention when the edge end surface is heated to a temperature of 950 to 1050° C. and the region from the surface to the depth of 30 mm is held at this temperature for 10 minutes or longer, even considering changes in the widths of the melting of the base material and the HAZ during welding. Even when the temperature of the heated edge surface was 1050° C. (upper limit of the temperature of the pre-weld heat treatment of the present invention), the same effect was obtained in a broader heated region, which means even higher effectiveness.

This constant temperature distribution is obtained only when the volume of the steel is sufficiently large and the distance of diffusion of heat from the heated end surface is considered sufficiently large. If not only the edge surface, but also a larger region including other surfaces, or the entire steel is heated, the temperature distribution of the steel is not constant; instead, the portion at a temperature near the α-to-γ transformation point constantly moves such that continuous heating of a certain location to the same temperature for 10 minutes or longer, as discussed above, is not necessarily guaranteed. To ensure such a constant temperature distribution, the surface area being heated is preferably 30% or smaller of the entire member being heated to apply a constant temperature distribution to the base material, which works as a heat sink. This minimizes the inability to hold a constant temperature distribution caused by heating positions distant from the edge.

Test results that show that, when the temperature distribution is controlled to be constant, the temperature of a position distant from the heated surface is kept constant for a certain period of time were only revealed by the present invention. To take this effect into consideration, the maximum pre-weld heat treatment depth is limited as provided above.

Further, since the steel practically has a finite size, even when only the edge surface is subjected to the pre-weld heat treatment, an ideal model environment with 0° C. in the infinite direction cannot be maintained such that heat transfer causes heat to be reflected from a side of the steel or the end surface opposite to the edge, resulting in a temperature distribution that is not constant. That is, FIG. 17 is not reproduced. To achieve constant temperature distribution, the length of the base material (dimension in the direction perpendicular to the end surface being heated) is preferably three times or more the pre-weld heat treatment depth.

Even if a sufficient region that serves as a heat sink is provided, it is possible that a constant temperature distribution cannot be maintained after continuous heating for a prolonged period of time due to a finite size. To ensure that the temperature distribution is constant, the upper limit of holding time should be 30 minutes. More preferably, the upper limit of heating time is 25 minutes, and still more preferably 20 minutes.

This constant heat transfer can be calculated three-dimensionally by one-dimensional difference calculus or FEM analysis by assuming the volume of a heat sink. This is preferable since it ensures that the present invention is effective, and also increases the effect of the present invention.

A technique using such a constant temperature distribution to prevent Type IV damage has no precedent. In the context of high-B steel, chemical components that do not produce a fine-grain region are used to prevent Type IV damage derived from local heat treatment, which means that there is no necessity of ensuring a constant temperature distribution, neither is there a necessity of using such a constant temperature distribution. Further, in such cases, 80 ppm or more B needs to be added, and a microstructure memory effect is used that uses retained γ present on lath boundaries, which are significant in B-added steel; on the other hand, a small amount of retained γ may remain in the base material or portions subjected to the pre-weld heat treatment such that toughness tends to decrease (see JP 2016-14178 A and JP 2016-130339 A). According to the present invention, the upper limit of added B is 50 ppm, which means a different steel type, and the memory effect using retained γ is not used. Therefore, as verified by the present inventors by separate experiments, in the microstructure, a fine-grain region is produced on the outer fringe of the HAZ, but the crystal grain size does not affect the creep properties of a ferritic heat-resistant steel at all. Thus, the present invention has a different HAZ microstructure and only controls the condition of precipitated carbides, and thus is a different technique.

Since the present invention eliminates the possibility of the presence of retained γ, the present invention advantageously has a better toughness than techniques that add 80 ppm or more B.

For the welded structure of the ferritic heat-resistant steel according to the present invention, the width or length on which the pre-weld heat treatment is performed is preferably 50% or less of the width or length of the structure (as discussed above, when the constant temperature distribution is also considered, they are more preferably ⅓ or less). The portions on which the pre-weld heat treatment has been performed can be identified in the following manner.

If the "width or length on which the post-weld heat treatment has been performed" is smaller than the "width or length on which the pre-weld heat treatment has been performed", the resulting structure includes regions where no $M_{23}C_6$-type carbides have precipitated. Thus, if regions without precipitated $M_{23}C_6$-type carbides are present, these regions enable determining whether the pre-weld heat treatment has been performed on a given portion.

On the other hand, if the portions on which the pre-weld heat treatment has not been performed are subjected to the post-weld heat treatment, it is not possible to increase the grain-boundary coverage with $M_{23}C_6$-type carbides to 50% or higher. Thus, if the "width or length on which the post-weld heat treatment has been performed" is larger than the "width or length on which the pre-weld heat treatment has been performed", whether or not the pre-weld heat treatment has been performed can be determined based on whether or not the grain-boundary coverage with $M_{23}C_6$-type carbides is not lower than 50%.

The presence/absence of $M_{23}C_6$-type carbides and the grain-boundary coverage with $M_{23}C_6$-type carbides can be determined by an observation by electron microscopy or a transmission electron-beam diffraction pattern analysis by TEM analysis, as discussed above.

Further, the portions on which the post-weld heat treatment has been performed can be identified by determining whether there is a lath structure of bainite. That is, the portions on which the pre-weld heat treatment has been performed and nearby portions are quenched beginning at a temperature lower than that for the base material, which means lower hardenability. Thus, in the portions on which the pre-weld heat treatment has been performed and nearby portions, lath development is so weak that performing the post-weld heat treatment on these portions causes the lath structure to disappear. Whether there is a lath structure can be easily determined by TEM or EBSD.

Figure 19:
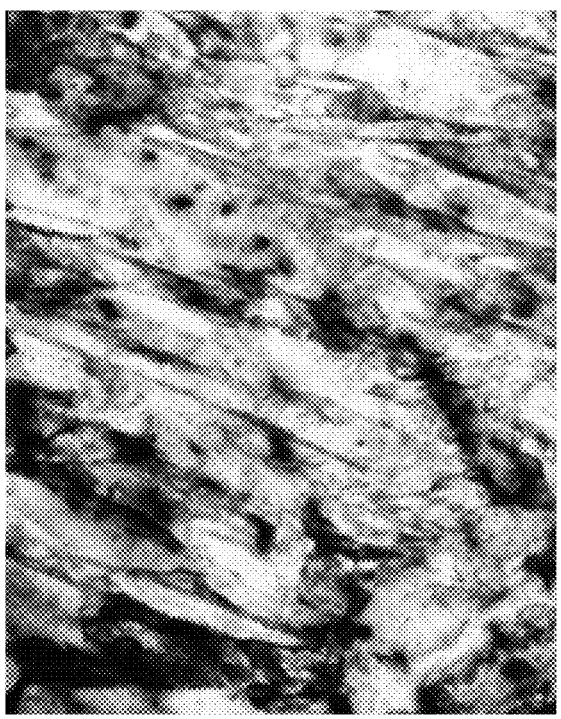
FIG. 19 is an image of electron microscopy of a microstructure having a lath structure.
Figure 20:
FIG. 20 is an image of electron microscopy of a microstructure where a lath structure has disappeared.

FIG. 19 is an image of electron microscopy of a microstructure having a lath structure. FIG. 20 is an image of electron microscopy of a microstructure where a lath structure has disappeared. In FIG. 19, the microstructure has been subjected to the same heat history as the HAZ, and lath borders can been seen that extend parallel from the top left to the bottom right in the picture. In FIG. 20, performing the post-weld heat treatment on the microstructure of FIG. 19 has caused lath borders to disappear and to change to a microstructure called subgrains, which provide generally isotropic grains.

In the welded structure of the ferritic heat-resistant steel according to the present embodiment, the post-weld heat treatment is only performed on a portion of the structure. Thus, the welded structure of the ferritic heat-resistant steel according to the present embodiment includes a portion having a lath structure and a portion having no lath structure. According to the present embodiment, costs can be reduced and on-site operability can be increased over cases where the post-weld heat treatment is performed on the entire structure. Further, softening of the microstructure can be reduced compared with cases where the post-weld heat treatment is performed on the entire structure, thereby improving high-temperature strength and initial creep strength.

The chemical components of the heat-resistant steel of the present invention will now be described. "%" in the content of each element means "mass %".

C: 0.08 to 0.15%

C increases the strength of material by means of solute strengthening, and can form carbide $M_{23}C_6$, which is an important precipitation in the present invention. According to the present invention, 0.08% or more C is added to improve the creep rupture strength derived from such carbides. To increase precipitation strengthening property, it is preferable to add 0.09% or more C. On the other hand, if the amount of C is too large, this produces coarse precipitates, which reduces the grain-boundary coverage with precipitates in the HAZ; in view of this, the amount of C should be not larger than 0.15%. Further, if the amount of C is large, coarsening of carbides produced on grain boundaries can be accelerated, which may reduce creep rupture strength; in view of this, the amount of C is more preferably not larger than 0.14%.

Si: 0.02 to 0.45%

Si is a deoxidizing element, and 0.02% or more Si should be added. To increase the effect of deoxidation, it is preferable to add 0.10% or more Si. Further, Si is effective to improve oxidation resistance, and it is more preferable to add 0.20% or more Si. On the other hand, if more than 0.45% Si is added, oxides including Si provide initiation points of brittle fracture, which may impair the toughness. Further, an excessive amount of Si added may occupy positions in lattices to be occupied by Mo or W that has been dissolved and facilitate precipitation of $Fe_2Mo$ or $Fe_2W$, which may reduce creep rupture strength. In view of this, the amount of Si should be not larger than 0.45%. To increase toughness, the amount of Si is preferably not larger than 0.40%, and more preferably not larger than 0.35%.

Mn: 0.40 to 0.80%

Mn is a deoxidizer, and 0.40% or more Mn is added according to the present invention. Insufficient deoxidization may reduce toughness; in view of this, it is preferable to add 0.45% or more Mn. On the other hand, Mn is an austenite-forming element, and increases the mobility of dislocations to accelerate local microstructure recovery; thus, adding an excessive amount deteriorates creep properties. According to the present invention, the amount of Mn is not larger than 0.80% to ensure creep strength. To further increase creep rupture strength, the amount of Mn is preferably not larger than 0.70%, and more preferably smaller than 0.60%.

Cr: 1.0 to 7.0%

Cr is an important element that increases the hardenability of steel and, in the form of carbides, causes precipitation strengthening of steel. To increase creep rupture strength at temperatures not lower than 500° C., it is necessary to provide a certain amount of $M_{23}C_6$-type carbides mainly composed of Cr to quickly increase grain-boundary coverage; in view of this, according to the present invention, 1.0% or more Cr is added. When steam oxidation resistance is considered, it is preferable to add 2.0% or more Cr. On the other hand, adding an excessive amount of Cr accelerates coarsening of $M_{23}C_6$-type carbides at high temperatures of 550° C. and higher, which deteriorates creep properties; in view of this, the amount of Cr should be not larger than 7.0%. Because Cr forms martensite when the steel is left to cool and reduces workability, the amount of Cr is preferably not larger than 6.0%; more preferably, the amount added is not larger than 6.50%.

Mo: 0.20 to 1.10%

In a creep environment for a short time, Mo precipitates within grains in the form of carbide $Mo_2C$ and in the shape of needles, and strengthens the interior of grains (i.e. effects an apparent reduction of the mobility of dislocations) to increase creep strength. $Mo_2C$ itself hardly precipitates on large-angle grain boundaries and has small strengthening interaction with $M_{23}C_6$-type carbides. To improve creep rupture strength, 0.20% Mo is added; preferably, to further increase the improvement in in-grain strengthening property (this strengthening mechanism works very significantly in an environment at 500° C. or lower, and is sometimes more significant than grain-boundary strengthening), 0.40% or more Mo is added. On the other hand, if an excessive amount of Mo is added, Mo precipitates on grain boundaries in the form of $Mo_6C$-type carbides in the shape of film to effect significant grain-boundary embrittlement; absorbs all the other carbides present on grain boundaries to reduce grain-boundary coverage; and increases the inter-particle distance on grain boundaries to reduce creep strength; in view of all this, the amount of Mo should be not larger than 1.10%. To further improve the long-time creep strength, it is more preferable to strictly control the added amount to be not larger than 1.05%.

N: 0.003 to 0.020%

N forms nitrides, and mainly increases the creep deformation resistance within grains (synonymous with reducing the apparent mobility of dislocations within grains) by means of precipitation of VN. To produce this effect, to give the minimum amount, the N content should be 0.003% or higher. Further, Al that has entered from refractories, for example, may bond with N, which may prevent provision of a sufficient amount of N to form VN. In view of such circumstances, it is preferable to add 0.050% or more N. However, an amount of N above 0.020% may coarsen VN or causes precipitation of coarse AlN such that the effect of added N is lost; in view of this, the upper limit should be 0.020%. Further, N, when illuminated with neutrons, may become radioactive and cause embrittlement of the steel; in view of this, when the heat-resistant steel is used in nuclear power plants or the like, the amount of N is preferably not larger than 0.010%.

Nb: 0.005 to 0.08%

Nb precipitates in the form of NbC-type carbides within grains to contribute to precipitation strengthening within grains. If Nb precipitates in a complex manner with VN, it can prevent the movement of dislocations more effectively. When 0.005% Nb is added, the effect is present. To allow the use of more stable NbC carbides to achieve high-temperature strength, for example, it is preferable to add 0.010% or more Nb. More preferably, the lower limit of the added amount of 0.020%. To prevent the reduction of creep strength caused by early coarsening, and in view of the reduction of toughness by these carbides, the upper limit of the added amount should be 0.08%.

In petrochemical plants or other facilities where toughness is important, the added amount is preferably limited so as to be not larger than 0.07% to reduce promotion of brittle-crack propagation due to NbC. Further, when fine NbC is to be dispersed evenly to produce a large complex precipitation effect with VN, discussed above, the amount of Nb is more preferably not larger than 0.06%.

V: 0.005 to 0.40%

In a low-Cr ferritic heat-resistant steel, V bonds with N to form nitrides, and precipitates in the form of VC, which mainly precipitates on grain boundaries to prevent grain-boundary migration and delay microstructure recovery to contribute to improvement of creep strength. When 0.005% V is added, precipitation of VN is observed at or higher than 500° C. and in 5000 hours or longer, where VC is present on grain boundaries from early on and contributes to improvement of creep strength. To also produce the complex precipitation strengthening with NbC effectively, it is preferable to add 0.010% or more V, and more preferable to add 0.015% or more V. The ferritic heat-resistant steel associated with the present invention is mainly strengthened by precipitation strengthening on large-angle grain boundaries, and the effect of in-grain strengthening is not large for longer hours. Thus, to evaluate the effects of added V, the strengthening by precipitation of VC on grain boundaries is more significant. However, if more than 0.40% V is added, in a long-time creep environment, V may transform to a Z phase that grows rapidly such as $(V, Nb)_2N$ within grains, which may reduce creep strength; in view of this, the upper limit of the added amount should be 0.40%. Further, VC, when coarsened, reduces toughness. Thus, when reduction of toughness is to be prevented, it is desirable to add not more than 0.38% V, if V is to be added at all. More preferably, the amount of V is not larger than 0.35%.

According to the present invention, the contents of Al and B that have entered from cold iron sources, such as scrap, or refractories in the form of impurities are limited to the ranges provided below.

Al: less than 0.025%

In the context of the present invention, Al may work as a deoxidizer, but mainly bonds with N to precipitate in the form of AlN; however, AlN precipitates within grains as coarse and needle-shaped particles, and does not contribute to strengthening. When its nature as coarse particles is considered, the amount of Al should be limited so as to be smaller than 0.025% to provide toughness. As mentioned above, Al is effective as a deoxidizer and works to reduce the oxygen concentration in the steel; however, in the context of the present invention, which is directed to steel to which V is added, Al prevents precipitation of VN and is very effective in improving creep strengthening; in view of this, the smaller the amount of Al, the better, and is more suitably not larger than 0.020%. In pressure containers for environments with stricter toughness requirements, it is yet more preferably not larger than 0.015%.

B: less than 0.005%

Typically, when the steel associated with the present invention is produced in the same steel-making process after production of a B-containing steel, B may enter the steel mainly from refractories. B itself increases the hardenability of steel; however, in a steel with added nitrogen as in the present invention, B forms BN, which may deteriorate toughness; in view of this, the B content should be limited so as to be lower than 0.005%. Adding B may result in an excessively high hardenability of Cr steel, and promotes the production of retained $\gamma$, which is stable in room temperature, on lath boundaries and is concentrated in the retained $\gamma$ to stabilize it such that the retained $\gamma$ may not be easily decomposed even with high-temperature tempering. During an impact test of steel, retained $\gamma$ experiences strain-induced transformation at stress-concentration sites at the tip of a crack and, though as fine particles, transforms to martensite and may cause embrittlement of these portions; in view of this, the amount of B is preferably not larger than 0.004%. In environments with stricter toughness requirements, it is more preferably not larger than 0.003%.

Further, according to the present invention, P, S and O are impurities, and thus their contents are limited as follows.

P: less than 0.020%

P segregates on grain boundaries, promoting grain-boundary fracture and reducing toughness; in view of this, the P content should be limited so as to be lower than 0.020%.

S: less than 0.010%

S bonds with Mn to form coarse MnS; to prevent the resulting reduction of toughness, the S content should be limited so as to be lower than 0.010%

O: lower than 0.010%

O forms clusters of oxides, which represent initiation points of brittle fracture, reducing toughness; in view of this, the O content should be limited so as to be lower than 0.010%.

W: not less than 0% and less than 1.5%

Ti: 0 to 0.12%

According to the present invention, W and Ti, which may form carbides, may be added as necessary, and preferred in the present invention. In steel, W and Ti can each constitute M of the MC-type carbides and precipitate within grains. As such, they do not produce as strong a creep-strength improvement effect as in-grain precipitation, but has the effect of reducing the apparent mobility of dislocations. W, when in the form of the simple substance of WC, does not have a high affinity with C and cannot easily precipitate, and replaces some of the transition elements of NbC or VC and precipitates. Ti precipitates in the form of the single substance of TiC and contributes to the same in-grain precipitation strengthening. W has a high atomic weight and thus produces its effects when 0.5% or more W is added. If 1.5% or more W is added, it precipitates in the form of $\chi$ phase, which reduces hot workability; especially when it precipitates in segregation positions during hot working, it may cause hot cracking; in view of this, the amount added should be limited so as to be less than 1.5%. When applied to pressure containers that specify strict toughness requirements, the amount needs to be strictly controlled so as to be not more than 1.40%, and more preferable.

When Ti precipitates in the form of TiC, in the steel type associated with the present invention, it does not have as high an affinity with carbon as Nb or V but produces its effects when 0.05% or more Ti is added. On the other hand, if more than 0.12% Ti is added, it becomes coarse TiC and represents initiation points of brittle fracture and may reduce toughness; in view of this, the upper limit should be 0.12%. When applied to pressure containers that specify strict toughness requirements, the amount added should be not more than 0.10%, and is preferable to improve toughness. More preferably, the upper limit is 0.08%.

Further, according to the present invention, to control the status of inclusions such as oxides or sulfides, it is preferable to add one or more of Ca, Mg, Y, Ce and La.

Ca, Mg: 0 to 0.0050%

Y, Ce, La: 0 to 0.0500%

Ca, Mg, Y, Ce and Le are elements used to control the status of sulfides; to reduce the reduction of hot workability or toughness due to MnS, it is preferable to add one or more of them. Particularly, to prevent production of MnS extending in the roll direction in central portions along the plate thickness, it is preferable to add Ca and Mg in 0.0003% or more and Y, Ce and La in 0.010% or more. On the other hand, Ca, Mg, Y, Ce and La are powerful deoxidizing elements, and adding excessive amounts leads to production of clusters of oxides, potentially reducing toughness; in view of this, the amounts of Ca and Mg each should be not larger than 0.0050%, and the amounts of Y, Ce and La each should be not larger than 0.0500%. To increase toughness, preferably, each of the amounts of Ca and Mg is not larger than 0.0040% and each of the amounts of Y, Ce and La is not larger than 0.0300%; more preferably, each of the amounts of Y, Ce and La is not larger than 0.0200%

In the present embodiment described above and other embodiments, essentially, the balance is made of Fe, and small amounts of elements that do not impair the effects of the present invention, such as unavoidable impurities, may be present.

Now, a method of hot working in the method of manufacturing the welded structure of the ferritic heat-resistant steel of the present invention will be described.

Specifically, a billet having the above-described chemical composition is heated to a temperature between the $Ac_3$ point and 1200° C. to perform hot rolling to produce a steel plate with a plate thickness of 5 mm or larger, for example. Thereafter, under the above-described conditions, edge machining, the pre-weld heat treatment, welding and the post-weld heat treatment are performed to produce the welded structure of the ferritic heat-resistant steel of the present invention. In the case of a steel pipe, too, a billet is heated to a temperature between the $Ac_3$ point and 1200° C. and is subjected to hot forging or hot extrusion or hot forming/rolling (seamless rolling) to produce a tubular formed product. Ends of such steel pipes are made to butt each other and are subjected to the pre-weld heat treatment of the present invention to produce a welded joint without causing Type IV damage, thus forming a welded structure of a ferritic heat-resistant steel. In a similar manner, steel plates may be used to produce a pressure container.

While the welded structure of the ferritic heat-resistant steel according to the present embodiment and the method of manufacturing the same have been described, the edge of the present invention is not limited to any particular shape to sufficiently produce the effect of the present invention. That is, other than a V edge as described in the present embodiment, an X edge, an I edge, or a K edge may be selected appropriately depending on the use and size.

Further, as to the weld method, the "pre-weld heat treatment" of the present invention is effective when arc welding, inert-gas atmosphere arc welding, electron-beam welding, laser welding, resistance welding, friction-diffusion welding, spot welding, liquid-phase diffusion welding, or any other welding or joining method that involves a weld heat-affected zone and may develop Type IV damage is selected or two or more of them are combined as appropriate, thereby prevent Type IV damage in a reliable manner.

EXAMPLES

The present invention will now be described in more detail with reference to examples. The conditions of the examples described below are exemplary conditions adopted to verify the possibility of carrying out the present invention and its effects, and the present invention is not limited to these exemplary conditions. Further, in connection with the present invention, various conditions may be adopted without departing from the spirit of the present invention as long they achieve the objectives of the present invention.

The steels having the chemical compositions shown in Tables 3 and 4 were melted by an electric furnace or melted and cast by a manufacturing process having a consistent pig-iron/steel step in scales of 50 kg to 150 t to produce ingots or cast slabs. Subsequently, these ingots or slabs were hot worked by subjecting them to hot rolling or hot forging to produce steel pipes or steel plates with the desired shape. Thereafter, they were heated to the temperature range of 950 to 1050° C. and some of them were subsequently cooled in the furnace to be "completely annealed" to produce ferrite or ferrite-pearlite. Some other of them were kept at the same temperature for 10 minutes or longer and left to cool, which is known as "normalizing", to form bainite in the steel, and then tempered in the temperature range of 680 to 770° C. for 30 minutes or longer to change the microstructure to "tempered bainite" or dual-phase steel of bainite+ferrite (which is often the case when Cr<2.0). Further, as necessary, the steel pipes or steel plates were subjected to a hot working or cold working process in which they were reheated to a temperature equal to or lower than the tempering temperature, thereby producing the desired final shape. Table 6 shows final shapes of the resulting structures ("steel pipe" or "steel plate for pressure container").

TABLE 3

(to be continued in TABLE 4)

Chemical components (in mass %, balance Fe and impurities)

| Steel No. | C | Si | Mn | Cr | P | S | Mo | Nb | V | N |
|---|---|---|---|---|---|---|---|---|---|---|
| 1 | 0.125 | 0.03 | 0.51 | 4.31 | 0.0138 | 0.0041 | 0.26 | 0.052 | 0.249 | 0.0091 |
| 2 | 0.116 | 0.03 | 0.49 | 6.80 | 0.0137 | 0.0045 | 0.48 | 0.064 | 0.347 | 0.0170 |
| 3 | 0.088 | 0.03 | 0.46 | 5.50 | 0.0139 | 0.0032 | 0.34 | 0.065 | 0.127 | 0.0146 |
| 4 | 0.095 | 0.03 | 0.59 | 3.91 | 0.0151 | 0.0013 | 0.86 | 0.072 | 0.199 | 0.0106 |
| 5 | 0.140 | 0.04 | 0.50 | 6.41 | 0.0076 | 0.0045 | 0.85 | 0.063 | 0.179 | 0.0121 |
| 6 | 0.129 | 0.03 | 0.53 | 3.69 | 0.0083 | 0.0029 | 0.29 | 0.008 | 0.150 | 0.0155 |
| 7 | 0.114 | 0.03 | 0.61 | 5.02 | 0.0012 | 0.0078 | 0.84 | 0.069 | 0.251 | 0.0170 |
| 8 | 0.091 | 0.03 | 0.58 | 5.84 | 0.0152 | 0.0082 | 0.64 | 0.010 | 0.315 | 0.0076 |
| 9 | 0.106 | 0.03 | 0.58 | 6.45 | 0.0111 | 0.0034 | 0.40 | 0.059 | 0.304 | 0.0186 |
| 10 | 0.082 | 0.02 | 0.58 | 5.63 | 0.0017 | 0.0032 | 0.62 | 0.046 | 0.321 | 0.0099 |
| 11 | 0.117 | 0.03 | 0.58 | 4.63 | 0.0014 | 0.0068 | 0.84 | 0.007 | 0.036 | 0.0166 |
| 12 | 0.121 | 0.03 | 0.71 | 2.32 | 0.0071 | 0.0051 | 0.82 | 0.072 | 0.231 | 0.0175 |
| 13 | 0.117 | 0.03 | 0.46 | 4.05 | 0.0064 | 0.0047 | 0.93 | 0.059 | 0.377 | 0.0035 |
| 14 | 0.105 | 0.03 | 0.41 | 6.48 | 0.0159 | 0.0063 | 0.33 | 0.050 | 0.106 | 0.0200 |
| 15 | 0.080 | 0.04 | 0.54 | 6.45 | 0.0038 | 0.0049 | 0.76 | 0.014 | 0.285 | 0.0189 |
| 16 | 0.083 | 0.03 | 0.50 | 6.16 | 0.0079 | 0.0021 | 0.61 | 0.065 | 0.326 | 0.0058 |
| 17 | 0.127 | 0.04 | 0.67 | 4.88 | 0.0143 | 0.0023 | 0.89 | 0.070 | 0.195 | 0.0062 |
| 18 | 0.096 | 0.02 | 0.73 | 5.04 | 0.0082 | 0.0041 | 0.76 | 0.063 | 0.349 | 0.0106 |
| 19 | 0.096 | 0.02 | 0.57 | 6.78 | 0.0086 | 0.0035 | 0.92 | 0.043 | 0.292 | 0.0067 |
| 20 | 0.143 | 0.04 | 0.45 | 5.53 | 0.0041 | 0.0040 | 0.50 | 0.072 | 0.106 | 0.0183 |
| 21 | 0.089 | 0.03 | 0.75 | 3.71 | 0.0042 | 0.0085 | 0.98 | 0.042 | 0.077 | 0.0036 |
| 22 | 0.121 | 0.03 | 0.58 | 5.94 | 0.0046 | 0.0027 | 0.43 | 0.043 | 0.189 | 0.0072 |
| 23 | 0.126 | 0.02 | 0.69 | 1.45 | 0.0099 | 0.0039 | 0.26 | 0.066 | 0.058 | 0.0134 |
| 24 | 0.131 | 0.04 | 0.49 | 5.34 | 0.0063 | 0.0012 | 0.82 | 0.044 | 0.294 | 0.0147 |
| 25 | 0.095 | 0.03 | 0.55 | 5.65 | 0.0023 | 0.0059 | 0.65 | 0.022 | 0.342 | 0.0150 |
| 26 | 0.140 | 0.02 | 0.52 | 4.08 | 0.0081 | 0.0044 | 0.33 | 0.029 | 0.209 | 0.0096 |
| 27 | 0.096 | 0.02 | 0.52 | 2.70 | 0.0106 | 0.0057 | 0.95 | 0.037 | 0.088 | 0.0152 |
| 28 | 0.139 | 0.03 | 0.62 | 1.75 | 0.0059 | 0.0011 | 0.93 | 0.006 | 0.302 | 0.0174 |
| 29 | 0.141 | 0.04 | 0.53 | 1.14 | 0.0136 | 0.0088 | 0.43 | 0.074 | 0.136 | 0.0171 |
| 30 | 0.102 | 0.03 | 0.66 | 4.58 | 0.0097 | 0.0061 | 0.83 | 0.015 | 0.085 | 0.0152 |
| 31 | 0.105 | 0.03 | 0.67 | 2.23 | 0.0103 | 0.0081 | 0.55 | 0.028 | 0.291 | 0.0033 |
| 32 | 0.116 | 0.02 | 0.44 | 5.80 | 0.0026 | 0.0037 | 0.70 | 0.034 | 0.088 | 0.0064 |

TABLE 3-continued (to be continued in TABLE 4)

Chemical components (in mass %, balance Fe and impurities)

| Steel No. | C | Si | Mn | Cr | P | S | Mo | Nb | V | N |
|---|---|---|---|---|---|---|---|---|---|---|
| 33 | 0.129 | 0.04 | 0.75 | 5.61 | 0.0084 | 0.0074 | 0.76 | 0.030 | 0.044 | 0.0114 |
| 34 | 0.116 | 0.03 | 0.63 | 6.16 | 0.0020 | 0.0025 | 0.50 | 0.029 | 0.061 | 0.0155 |
| 35 | 0.103 | 0.02 | 0.46 | 2.46 | 0.0109 | 0.0031 | 0.49 | 0.006 | 0.306 | 0.0051 |
| 36 | 0.135 | 0.03 | 0.71 | 2.41 | 0.0090 | 0.0086 | 0.21 | 0.007 | 0.323 | 0.0034 |
| 37 | 0.095 | 0.03 | 0.73 | 6.24 | 0.0131 | 0.0073 | 0.86 | 0.056 | 0.189 | 0.0118 |
| 38 | 0.119 | 0.04 | 0.51 | 4.81 | 0.0037 | 0.0021 | 0.42 | 0.072 | 0.243 | 0.0160 |
| 39 | 0.131 | 0.04 | 0.53 | 1.82 | 0.0108 | 0.0051 | 0.64 | 0.053 | 0.121 | 0.0041 |
| 40 | 0.101 | 0.02 | 0.53 | 3.33 | 0.0037 | 0.0040 | 1.04 | 0.034 | 0.244 | 0.0153 |
| 41 | 0.119 | 0.03 | 0.66 | 1.27 | 0.0075 | 0.0014 | 0.23 | 0.054 | 0.187 | 0.0155 |
| 42 | 0.137 | 0.02 | 0.56 | 3.05 | 0.0084 | 0.0019 | 1.02 | 0.007 | 0.106 | 0.0052 |
| 43 | 0.101 | 0.02 | 0.51 | 5.18 | 0.0077 | 0.0062 | 0.98 | 0.009 | 0.140 | 0.0091 |
| 44 | 0.142 | 0.04 | 0.59 | 3.47 | 0.0156 | 0.0071 | 0.47 | 0.007 | 0.294 | 0.0183 |
| 45 | 0.108 | 0.03 | 0.64 | 5.47 | 0.0109 | 0.0080 | 0.85 | 0.048 | 0.167 | 0.0129 |
| 46 | 0.084 | 0.03 | 0.59 | 1.11 | 0.0089 | 0.0077 | 0.36 | 0.019 | 0.169 | 0.0118 |
| 47 | 0.100 | 0.03 | 0.50 | 3.53 | 0.0138 | 0.0085 | 0.43 | 0.026 | 0.072 | 0.0143 |
| 48 | 0.100 | 0.03 | 0.73 | 3.95 | 0.0075 | 0.0062 | 0.85 | 0.023 | 0.125 | 0.0199 |
| 49 | 0.098 | 0.03 | 0.43 | 6.11 | 0.0050 | 0.0037 | 0.53 | 0.071 | 0.029 | 0.0183 |
| 50 | 0.145 | 0.03 | 0.51 | 4.43 | 0.0117 | 0.0066 | 0.81 | 0.012 | 0.185 | 0.0163 |

TABLE 4

TABLE 4 (continued from TABLE 3)

Chemical components (in mass %, balance Fe and impurities)

| Steel No. | W | Ti | Ca | Mg | Y | Ce | La | Al | B | O |
|---|---|---|---|---|---|---|---|---|---|---|
| 1 | | | | | | | | 0.019 | 0.0032 | 0.0055 |
| 2 | | | | | | | | 0.010 | 0.0035 | 0.0068 |
| 3 | | | | | | | | 0.019 | 0.0037 | 0.0075 |
| 4 | | | | | | | | 0.006 | 0.0001 | 0.0030 |
| 5 | | | | | | | | 0.014 | 0.0018 | 0.0060 |
| 6 | | | | | | | | 0.001 | 0.0024 | 0.0059 |
| 7 | | | | | | | | 0.004 | 0.0016 | 0.0064 |
| 8 | | | | | | | | 0.020 | 0.0016 | 0.0082 |
| 9 | | | | | | | | 0.018 | 0.0047 | 0.0046 |
| 10 | | | | | | | | 0.001 | 0.0030 | 0.0033 |
| 11 | | | | | | | | 0.014 | 0.0007 | 0.0022 |
| 12 | | | | | | | | 0.015 | 0.0021 | 0.0036 |
| 13 | | | | | | | | 0.006 | 0.0019 | 0.0069 |
| 14 | | | | | | | | 0.019 | 0.0023 | 0.0027 |
| 15 | | | | | | | | 0.007 | 0.0011 | 0.0030 |
| 16 | | | | | | | | 0.014 | 0.0041 | 0.0086 |
| 17 | | | | | | | | 0.005 | 0.0003 | 0.0034 |
| 18 | 1.41 | | | | | | | 0.010 | 0.0002 | 0.0097 |
| 19 | 1.33 | 0.060 | 0.0014 | | | | | 0.015 | 0.0018 | 0.0063 |
| 20 | | 0.053 | | 0.0020 | | | | 0.010 | 0.0045 | 0.0086 |
| 21 | 1.22 | 0.068 | | | 0.0196 | | | 0.006 | 0.0010 | 0.0078 |
| 22 | | | | | | 0.0229 | | 0.022 | 0.0040 | 0.0065 |
| 23 | | | | | | | 0.0264 | 0.003 | 0.0021 | 0.0032 |
| 24 | | 0.065 | 0.0043 | 0.0004 | | | | 0.004 | 0.0009 | 0.0040 |
| 25 | 1.18 | 0.083 | | 0.0008 | 0.0213 | | | 0.011 | 0.0024 | 0.0076 |
| 26 | | | | | | 0.0389 | 0.0109 | 0.016 | 0.0015 | 0.0067 |
| 27 | 1.14 | | 0.0035 | | | | 0.0427 | 0.015 | 0.0047 | 0.0098 |
| 28 | 1.11 | 0.046 | 0.0013 | | | 0.0223 | | 0.014 | 0.0047 | 0.0041 |
| 29 | | | 0.0008 | | 0.0399 | | | 0.010 | 0.0012 | 0.0030 |
| 30 | 1.03 | 0.107 | 0.0028 | 0.0022 | | | 0.0192 | 0.014 | 0.0036 | 0.0081 |
| 31 | | 0.021 | | 0.0031 | | 0.0433 | | 0.002 | 0.0029 | 0.0004 |
| 32 | 1.06 | | 0.0021 | | 0.0119 | | | 0.015 | 0.0016 | 0.0094 |
| 33 | 1.16 | 0.021 | | | 0.0121 | | 0.0354 | 0.003 | 0.0044 | 0.0034 |
| 34 | | 0.083 | | 0.0036 | | | 0.0350 | 0.005 | 0.0003 | 0.0012 |
| 35 | 1.11 | | 0.0047 | | | 0.0232 | | 0.006 | 0.0047 | 0.0062 |
| 36 | | 0.079 | | 0.0017 | 0.0334 | 0.0166 | | 0.009 | 0.0019 | 0.0063 |
| 37 | 1.29 | 0.047 | 0.0027 | 0.0009 | 0.0421 | | | 0.005 | 0.0031 | 0.0031 |
| 38 | 1.21 | | 0.0024 | 0.0037 | | | 0.0276 | 0.008 | 0.0040 | 0.0008 |
| 39 | | 0.056 | 0.0042 | | | 0.0203 | 0.0390 | 0.021 | 0.0001 | 0.0062 |
| 40 | 1.44 | 0.048 | | | 0.0373 | 0.0411 | 0.0320 | 0.007 | 0.0015 | 0.0024 |
| 41 | | | 0.0026 | 0.0021 | 0.0334 | 0.0429 | 0.0373 | 0.018 | 0.0004 | 0.0039 |
| 42 | 1.32 | 0.112 | | | | | | 0.006 | 0.0029 | 0.0042 |
| 43 | | 0.047 | 0.0012 | 0.0035 | 0.0307 | | 0.0442 | 0.009 | 0.0013 | 0.0028 |
| 44 | 1.14 | | | | | 0.0247 | 0.0261 | 0.019 | 0.0001 | 0.0060 |

TABLE 4-continued

TABLE 4 (continued from TABLE 3)

Chemical components (in mass %, balance Fe and impurities)

| Steel No. | W | Ti | Ca | Mg | Y | Ce | La | Al | B | O |
|---|---|---|---|---|---|---|---|---|---|---|
| 45 |  | 0.057 | 0.0020 |  | 0.0167 |  | 0.0378 | 0.013 | 0.0016 | 0.0005 |
| 46 | 1.28 |  |  |  |  | 0.0170 |  | 0.006 | 0.0005 | 0.0056 |
| 47 | 1.22 | 0.021 | 0.0024 |  |  |  | 0.0386 | 0.010 | 0.0007 | 0.0066 |
| 48 |  | 0.096 | 0.0023 | 0.0042 | 0.0114 |  | 0.0309 | 0.018 | 0.0031 | 0.0097 |
| 49 |  |  | 0.0042 |  | 0.0140 |  |  | 0.018 | 0.0018 | 0.0054 |
| 50 | 1.16 | 0.031 | 0.0015 | 0.0038 |  | 0.0434 | 0.0352 | 0.004 | 0.0043 | 0.0014 |

TABLE 5

(to be continued in TABLE 6)

| | | Pre-weld heat treatment | | | | Post-weld heat treatment | | |
|---|---|---|---|---|---|---|---|---|
| Steel No. | Weld method | Holding time (min) | Temp. (° C.) | Depth (width) (mm) | Operation area ratio (%) | Temp. (° C.) | Holding time (min) | TTP |
| 1 | GTAW | 15 | 950 | 33 | 18 | 690 | 30 | 9340 |
| 2 | GTAW | 15 | 955 | 33 | 18 | 690 | 60 | 9630 |
| 3 | GTAW | 15 | 955 | 35 | 13 | 690 | 60 | 9630 |
| 4 | GTAW | 15 | 955 | 35 | 13 | 690 | 60 | 9630 |
| 5 | GTAW | 15 | 980 | 35 | 12 | 690 | 60 | 9630 |
| 6 | GTAW | 15 | 980 | 35 | 18 | 700 | 60 | 9730 |
| 7 | GTAW | 20 | 980 | 35 | 19 | 700 | 60 | 9730 |
| 8 | GTAW | 20 | 980 | 35 | 15 | 700 | 120 | 10023 |
| 9 | GTAW | 20 | 980 | 35 | 15 | 700 | 120 | 10023 |
| 10 | GTAW | 20 | 980 | 35 | 15 | 740 | 120 | 10435 |
| 11 | GTAW | 12 | 1020 | 32 | 15 | 740 | 120 | 10435 |
| 12 | GTAW | 12 | 1020 | 32 | 15 | 740 | 120 | 10435 |
| 13 | GTAW | 12 | 1020 | 32 | 15 | 710 | 90 | 10003 |
| 14 | SAW | 12 | 1020 | 32 | 15 | 720 | 90 | 10105 |
| 15 | SAW | 12 | 1020 | 35 | 15 | 720 | 90 | 10105 |
| 16 | SAW | 11 | 1020 | 35 | 15 | 720 | 90 | 10105 |
| 17 | GTAW | 13 | 1020 | 35 | 15 | 723 | 120 | 10260 |
| 18 | GTAW | 15 | 1020 | 35 | 15 | 725 | 60 | 9980 |
| 19 | GTAW | 16 | 1020 | 32 | 20 | 720 | 60 | 9930 |
| 20 | GTAW | 18 | 1020 | 32 | 20 | 720 | 110 | 10191 |
| 21 | GTAW | 25 | 980 | 32 | 20 | 715 | 150 | 10273 |
| 22 | GTAW | 25 | 980 | 32 | 20 | 715 | 130 | 10212 |
| 23 | SMAW | 25 | 980 | 30 | 20 | 715 | 115 | 10159 |
| 24 | SMAW | 25 | 980 | 30 | 20 | 700 | 120 | 10023 |
| 25 | GTAW | 30 | 980 | 31 | 20 | 700 | 115 | 10005 |
| 26 | GTAW | 30 | 980 | 31 | 20 | 700 | 118 | 10016 |
| 27 | GTAW | 30 | 980 | 31 | 20 | 700 | 190 | 10217 |
| 28 | GTAW | 30 | 980 | 35 | 25 | 700 | 120 | 10023 |
| 29 | GTAW | 25 | 950 | 35 | 25 | 685 | 90 | 9749 |
| 30 | GTAW | 25 | 953 | 35 | 25 | 685 | 90 | 9749 |
| 31 | GTAW | 25 | 997 | 35 | 25 | 685 | 90 | 9749 |
| 32 | GTAW | 12 | 1113 | 31 | 25 | 685 | 90 | 9749 |
| 33 | GTAW | 12 | 1119 | 31 | 25 | 685 | 90 | 9749 |
| 34 | GTAW | 10 | 1138 | 30 | 25 | 685 | 90 | 9749 |
| 35 | GTAW | 12 | 1139 | 30 | 25 | 685 | 120 | 9868 |
| 36 | GTAW | 10 | 1142 | 30 | 25 | 685 | 120 | 9868 |
| 37 | GTAW | 12 | 980 | 30 | 25 | 685 | 120 | 9868 |
| 38 | GTAW | 15 | 980 | 32 | 25 | 685 | 120 | 9868 |
| 39 | GTAW | 15 | 1020 | 32 | 20 | 685 | 120 | 9868 |
| 40 | GTAW | 20 | 1050 | 35 | 20 | 700 | 150 | 10117 |
| 41 | GTAW | 20 | 1020 | 35 | 25 | 720 | 60 | 9930 |
| 42 | GTAW | 20 | 1020 | 35 | 25 | 740 | 60 | 10130 |
| 43 | GTAW | 20 | 950 | 40 | 25 | 745 | 60 | 10180 |
| 44 | GTAW | 20 | 960 | 50 | 30 | 745 | 60 | 10180 |
| 45 | GTAW | 20 | 980 | 40 | 25 | 750 | 60 | 10230 |
| 46 | EB | 20 | 990 | 40 | 25 | 750 | 60 | 10230 |
| 47 | EB | 20 | 1000 | 30 | 25 | 700 | 60 | 9730 |
| 48 | LASER | 20 | 1000 | 32 | 12 | 700 | 60 | 9730 |

TABLE 5-continued (to be continued in TABLE 6)

| | | Pre-weld heat treatment | | | | Post-weld heat treatment | | |
|---|---|---|---|---|---|---|---|---|
| Steel No. | Weld method | Holding time (min) | Temp. (° C.) | Depth (width) (mm) | Operation area ratio (%) | Temp. (° C.) | Holding time (min) | TTP |
| 49 | GTAW | 20 | 1000 | 32 | 12 | 720 | 60 | 9930 |
| 50 | GTAW | 20 | 1000 | 32 | 10 | 720 | 60 | 9930 |

GTAW: gas-coated arc welding
SAW: coated arc welding
SMAW: hand-rod-type coated arc welding
EB: elctronic beam welding
LASER: laser welding
Operation area ratio of pre-weld heat treatment: ratio between total area of steel outer-layer surfaces except edge surface and total area of outer-layer portions subjected to pre-weld heat treatment
TTP: temperature/time equivalent parameter calculated based on formula (1)

TABLE 6

TABLE 6 (continued from TABLE 5)

| Steel No. | BCR (MPa) | WCR (MPa) | ΔCR (MPa) | BCH (J) | WCH (J) | P (%) | R (nm) | DP (nm) | Shape of welded object |
|---|---|---|---|---|---|---|---|---|---|
| 1 | 115 | 106 | 9 | 108 | 95 | 52 | 185 | 91 | steel pipe |
| 2 | 115 | 105 | 10 | 66 | 43 | 54 | 186 | 121 | steel pipe |
| 3 | 121 | 103 | 18 | 51 | 50 | 55 | 166 | 135 | steel pipe |
| 4 | 118 | 107 | 11 | 126 | 99 | 53 | 135 | 144 | steel pipe |
| 5 | 119 | 105 | 14 | 107 | 98 | 56 | 154 | 132 | steel pipe |
| 6 | 113 | 111 | 2 | 56 | 50 | 52 | 155 | 111 | steel pipe |
| 7 | 124 | 102 | 22 | 80 | 70 | 51 | 159 | 131 | steel pipe |
| 8 | 125 | 107 | 18 | 129 | 100 | 55 | 173 | 121 | steel pipe |
| 9 | 126 | 109 | 17 | 88 | 83 | 54 | 141 | 120 | steel pipe |
| 10 | 121 | 111 | 10 | 92 | 90 | 52 | 135 | 115 | steel pipe |
| 11 | 122 | 113 | 9 | 148 | 135 | 53 | 122 | 113 | steel pipe |
| 12 | 123 | 115 | 8 | 168 | 121 | 58 | 156 | 126 | steel pipe |
| 13 | 122 | 114 | 8 | 38 | 36 | 51 | 160 | 117 | steel plate for pressure container |
| 14 | 124 | 112 | 12 | 54 | 41 | 52 | 185 | 95 | steel plate for pressure container |
| 15 | 122 | 111 | 11 | 86 | 85 | 55 | 199 | 85 | steel plate for pressure container |
| 16 | 119 | 109 | 10 | 131 | 121 | 56 | 123 | 85 | steel plate for pressure container |
| 17 | 115 | 110 | 5 | 174 | 155 | 61 | 118 | 86 | steel plate for pressure container |
| 18 | 112 | 110 | 2 | 111 | 122 | 66 | 93 | 95 | steel plate for pressure container |
| 19 | 111 | 109 | 2 | 139 | 136 | 60 | 98 | 114 | steel plate for pressure container |
| 20 | 113 | 108 | 5 | 161 | 150 | 58 | 94 | 86 | steel plate for pressure container |
| 21 | 115 | 107 | 8 | 118 | 111 | 55 | 112 | 115 | steel plate for pressure container |
| 22 | 116 | 108 | 8 | 91 | 99 | 54 | 119 | 91 | steel plate for pressure container |
| 23 | 106 | 106 | 0 | 101 | 115 | 52 | 125 | 110 | steel plate for pressure container |
| 24 | 119 | 115 | 4 | 68 | 100 | 51 | 126 | 98 | steel plate for pressure container |
| 25 | 115 | 111 | 4 | 167 | 98 | 60 | 121 | 99 | steel plate for pressure container |
| 26 | 113 | 112 | 1 | 57 | 89 | 61 | 120 | 102 | steel plate for pressure container |
| 27 | 119 | 109 | 10 | 65 | 88 | 63 | 115 | 105 | steel plate for pressure container |
| 28 | 115 | 105 | 10 | 142 | 78 | 62 | 114 | 103 | steel plate for pressure container |
| 29 | 114 | 108 | 6 | 164 | 93 | 52 | 110 | 102 | steel pipe |
| 30 | 117 | 107 | 10 | 52 | 41 | 58 | 90 | 106 | steel pipe |
| 31 | 121 | 103 | 18 | 41 | 40 | 55 | 85 | 98 | steel pipe |
| 32 | 121 | 102 | 19 | 149 | 135 | 54 | 84 | 125 | steel pipe |
| 33 | 126 | 118 | 8 | 137 | 132 | 52 | 83 | 128 | steel pipe |
| 34 | 128 | 115 | 13 | 63 | 60 | 50 | 88 | 135 | steel plate for pressure container |
| 35 | 131 | 112 | 19 | 77 | 70 | 55 | 89 | 141 | steel plate for pressure container |
| 36 | 125 | 114 | 11 | 129 | 120 | 58 | 54 | 130 | steel plate for pressure container |
| 37 | 126 | 112 | 14 | 137 | 135 | 59 | 32 | 120 | steel plate for pressure container |
| 38 | 124 | 111 | 13 | 147 | 145 | 61 | 69 | 115 | steel plate for pressure container |
| 39 | 125 | 109 | 16 | 157 | 151 | 60 | 79 | 112 | steel plate for pressure container |
| 40 | 124 | 115 | 9 | 132 | 132 | 58 | 161 | 98 | steel plate for pressure container |
| 41 | 122 | 113 | 9 | 150 | 145 | 59 | 190 | 96 | steel plate for pressure container |
| 42 | 126 | 112 | 14 | 116 | 115 | 60 | 185 | 85 | steel plate for pressure container |
| 43 | 123 | 114 | 9 | 173 | 170 | 61 | 135 | 93 | steel plate for pressure container |
| 44 | 121 | 115 | 6 | 91 | 90 | 66 | 125 | 115 | steel plate for pressure container |
| 45 | 119 | 113 | 6 | 169 | 130 | 60 | 121 | 116 | steel pipe |
| 46 | 118 | 111 | 7 | 49 | 51 | 58 | 106 | 144 | steel pipe |
| 47 | 115 | 109 | 6 | 53 | 50 | 55 | 104 | 58 | steel pipe |
| 48 | 112 | 105 | 7 | 124 | 120 | 52 | 106 | 132 | steel pipe |

TABLE 6-continued

TABLE 6 (continued from TABLE 5)

| Steel No. | BCR (MPa) | WCR (MPa) | ΔCR (MPa) | BCH (J) | WCH (J) | P (%) | R (nm) | DP (nm) | Shape of welded object |
|---|---|---|---|---|---|---|---|---|---|
| 49 | 115 | 106 | 9 | 140 | 135 | 55 | 105 | 60 | steel pipe |
| 50 | 122 | 116 | 6 | 135 | 130 | 53 | 103 | 135 | steel plate for pressure container |

WCH: impact energy absorbed by welded-joint bond
BCH: impact energy absorbed by base material at 0° C.
R: average precipitate grain size on HAZ large-angle grain boundaries
DP: inter-particle-surface distance on HAZ large-angle grain boundaries
P: grain-boundary coverage on HAZ large-angle grain boundaries with precipitates The steel pipes or steel plates thus worked were machined to form a weld edge, and the "pre-weld heat treatment" was performed in the manner shown in Table 5. The edge used was a V edge, where each edge surface had an angle of 15°, and each root had a butted portion with a thickness of 1 mm.

Thereafter, welding was performed with an amount of weld heat input of about 0.5 to 5.0 kJ/mm and using GTAW (gas-shield type coated arc welding using tungsten electrodes), SMAW (hand-rod-type coated arc welding), SAW (coated arc welding), EB (electron-beam welding) or LASER (laser welding). Subsequently, the post-weld heat treatment was performed on the joint in the temperature range of 680 to 750° C. for 30 minutes or longer, depending on the thickness and shape of the parts or formed products. The weld metal used was Alloy 625 Ni-based alloy shown in Table 2, and care was taken to prevent creep rupture from the weld metal.

In the present examples, the cooling rate in the HAZ was faster than in the base material such that the entire HAZ became a completely bainitic single phase. In this bainite, the prior γ grain boundaries can easily be identified and, within γ grains, block structures of bainite develop that are produced to mitigate stresses during transformation. This structural feature made it easy to identify the microstructure type of the HAZ and its position.

To measure the creep properties of the welded joint, a brimmed round-bar test specimen with a parallel-portion diameter of 6 mm and a parallel-portion length of 30 mm extending in the direction perpendicular to the direction of welding and perpendicular to the plate-thickness direction of the steel pipe or steel plate was extracted such that a portion of the heat-affected zone of the welded joint was present in the parallel portion; then, creep tests at 550° C., 600° C. and 650° C. were performed for about 10,000 hours, and a cubic regression curve using the Larson-Miller method was used to calculate the estimated creep rupture strength for 100,000 hours at 550° C. To increase accuracy and represent the curve shape as correctly as possible, data scores were taken until the standard deviation was 0.10 or less, the optimized constant C was calculated, and the representative curve was obtained using the following approximation equation.

$$(\text{test temperature}+273.15) \times (\log(t_r)+C) = \alpha \log(\sigma) + b[\log(\sigma)]^2 + c[\log(\sigma)]^3 \quad \text{[Formula 1]}$$

This is the so-called Larson-Miller parameter method. Other than this method, any approximation equation using the time-temperature parameter method, such as Orr-Shrby-Dorn method or Manson-Hafeld method may be used to produce substantially equal estimate values. Thus, the Larson-Miller parameter method was used since it is widely used in standards.

Similarly, the 2 mmV-notch Charpy impact testing described in JIS Z2242 was conducted on base materials with a V notch with 45° in the middle portion of a test specimen with a square of 10×10 mm and a length of 55 mm at 0° C. Since the base material, as a structure to be worked, requires an amount of absorbed energy of 27 J or more at 0° C., a threshold of 27 J was set. The results are shown in Table 6 in the BCH column (J). The values were obtained for comparison with the toughness of the welded joint described below and are not essential requirements of the present invention; they were used to determine whether the toughness of the joint of the present invention decreased due to the low base-material toughness.

To evaluate the toughness of HAZ grain boundaries of the welded joint, a test specimen was extracted from central portions along the plate thickness, again in accordance with the method described in JIS Z2242 and depending on the shape of the test specimen, and absorbed energy was measured at 0° C. The notch was provided based on the point at which the interface between the welded-joint metal and HAZ crosses the central line as determined along the plate-thickness direction (i.e. central position along the plate thickness with respect to the border surface), and was machined to be parallel to the plate-thickness direction. The direction in which the notch was machined was parallel to the direction of the weld line. The threshold was 27 J at 0° C., which is said to be the lowest absorbed energy at which no crack occurs during the processing of members for thermal power plants. The results are shown in Table 6 in the WCH column (J).

Further, the properties of the base material were evaluated by extracting a creep test specimen with the same shape as the welded joint from unwelded steel at a position where no weld edge was formed such that the entire parallel portion was made of the microstructure of the base material, and performing creep tests under the same test conditions as the welded joint. The threshold for the base material was 100 MPa because long-time creep tests using the TTP method as with the welded joint had shown that the base material had a creep strength of 100 MPa or higher at 550° C. for 100,000 hours. The differences between this result and the creep rupture strength of the welded joint must not be 30 MPa or larger, because the most important object of the present invention is to prevent a reduction in the local creep strength of the welded joint, and to prevent Type IV damage, which is the most harmful phenomenon in this respect. In Table 6, the creep rupture strength of the base material is shown in the BCR column (MPa), the creep rupture strength of the welded joint in the WCR column (MPa) and the difference therebetween in the ΔCR column (MPa). ΔCR is a value defined by the following formula, (3), and the maximum value tolerable in connection with the present invention is 30 MPa.

$$\Delta CR = (\text{creep rupture strength of base material}) - (\text{creep rupture strength of welded joint}) \quad (3).$$

Creep rupture strength as used herein means an estimated value calculated by the TTP method at 550° C. and for 100,000 hours.

After the post-weld heat treatment, the test specimen was cut along a cross section perpendicular to the weld line, and was subjected to corrosion (using an etching agent mainly composed of picric acid alcohol according to the present invention) to cause grain boundaries to appear, thereby causing an HAZ to appear. After a sample for electron microscopy was machined and extracted from the HAZ, SEM was used to measure the grain-boundary coverage with $M_{23}C_6$-type carbides. $M_{23}C_6$-type carbides in this case were identified by EDX and a pattern analysis of reflection peaks by X-ray diffraction of residual dross from electrolytic extraction. This method is effective because, with the component ranges of the inventive steel, most of precipitates are $M_{23}C_6$-type carbides at the stage of the post-weld heat treatment. However, before the SEM observation, the angles of adjacent concentrated grains on grain boundaries were measured in advance by EBSD to determine that the grain boundaries for which the grain-boundary coverage with $M_{23}C_6$-type carbides was measured were large-angle grain boundaries, that is, the angles about the shared rotational axis were 60° and 54°. Grain boundaries with 16°, which is another large angle, were hardly observed in the experiments.

An approximation of the inter-particle distance on the large-angle grain boundaries was made by using the method shown in FIG. 2 to measure the inter-particle distance on the image from the observation results of $M_{23}C_6$-type carbides obtained by the microscopic observation, assuming that these particles are in a square distribution on boundary surfaces, and using formula (2) to make an approximation.

Table 6 shows main parameters of the present invention, i.e. the average grain size R (nm) of $M_{23}C_6$-type carbides that precipitated on the large-angle grain boundaries in the weld heat-affected zone, the grain-boundary coverage P (%) with these precipitates, and the average inter-particle-surface distance DP (nm) of these precipitates on the large-angle grain boundaries.

Actually, the fracture surface of the creep rupture test specimen was observed at the same time and it was determined at the same time whether there was Type IV damage, where it was determined that there was no Type IV damage if the difference between the creep-rupture strength of the welded joint and the creep-rupture strength of the base material, as represented as estimated creep-rupture strengths for 100,000 hours, was below 30 MPa, which meets the above criterion. That is, it was determined that no low-ductility fracture surface with connected creep voids was present along the outer fringe of the HAZ.

Table 5 shows the conditions of the pre-weld heat treatment performed on the welded joint (the depth or width relative to the created weld edge surface that were heated to the $Ac_3$ point or higher (both meaning the same thing, where the dimension of the heated region measured from the edge surface in the direction of heating are represented as the depth or width in the plate-width direction; in a preliminary experiment, the heated region was actually measured by a measurement method using embedded thermocouples, and the depth or width was estimated based on the correspondence between these measurements and the associated heating conditions), temperature and holding time) and the post-weld heat treatment conditions (temperature and holding time). The worked area ratio of the pre-weld heat treatment is the ratio between the total area of the steel outer-layer surfaces except the edge surface and the total area of the outer-layer portions subjected to the pre-weld heat treatment. The TTP column of Table 5 shows actual calculation results that show whether the post-weld heat treatment condition requirement formula shown in formula (1) was satisfied. It can be seen that the present invention falls within formula (1).

Tables 7 and 8 show the chemical compositions comparative example steels, and Tables 9 and 10 show the associated welded-joint manufacture conditions, pre-weld heat treatment conditions, post-weld heat treatment conditions, toughness values, creep test results and analysis results of precipitate state, in a manner similar to that for Tables 5 and 6.

TABLE 7

(to be continued in TABLE 8)

Chemical components (in mass %, balance Fe and impurities)

| Steel No. | C | Si | Mn | Cr | P | S | Mo | Nb | V | N |
|---|---|---|---|---|---|---|---|---|---|---|
| 61 | 0.045 | 0.12 | 0.63 | 6.75 | 0.0031 | 0.0049 | 1.01 | 0.040 | 0.292 | 0.0120 |
| 62 | 0.188 | 0.14 | 0.64 | 5.47 | 0.0080 | 0.0011 | 0.55 | 0.070 | 0.160 | 0.0040 |
| 63 | 0.109 | 0.01 | 0.67 | 4.65 | 0.0059 | 0.0048 | 0.68 | 0.034 | 0.132 | 0.0067 |
| 64 | 0.132 | 0.87 | 0.66 | 5.72 | 0.0099 | 0.0051 | 0.36 | 0.030 | 0.119 | 0.0105 |
| 65 | 0.126 | 0.08 | 0.12 | 3.69 | 0.0051 | 0.0024 | 0.51 | 0.067 | 0.010 | 0.0162 |
| 66 | 0.128 | 0.13 | 1.56 | 5.56 | 0.0106 | 0.0045 | 0.53 | 0.048 | 0.316 | 0.0181 |
| 67 | 0.106 | 0.04 | 0.62 | 0.24 | 0.0038 | 0.0045 | 0.39 | 0.065 | 0.265 | 0.0200 |
| 68 | 0.144 | 0.20 | 0.58 | 7.53 | 0.0064 | 0.0030 | 0.57 | 0.020 | 0.062 | 0.0056 |
| 69 | 0.090 | 0.03 | 0.52 | 4.22 | 0.0414 | 0.0060 | 0.24 | 0.034 | 0.054 | 0.0120 |
| 70 | 0.125 | 0.12 | 0.66 | 4.75 | 0.0058 | 0.0178 | 0.64 | 0.024 | 0.185 | 0.0171 |
| 71 | 0.101 | 0.06 | 0.55 | 3.72 | 0.0125 | 0.0016 | 0.11 | 0.044 | 0.104 | 0.0175 |
| 72 | 0.112 | 0.05 | 0.45 | 5.61 | 0.0031 | 0.0064 | 1.56 | 0.068 | 0.026 | 0.0051 |
| 73 | 0.141 | 0.07 | 0.64 | 1.99 | 0.0097 | 0.0055 | 0.54 | 0.002 | 0.258 | 0.0163 |
| 74 | 0.118 | 0.16 | 0.64 | 3.55 | 0.0073 | 0.0050 | 0.52 | 0.113 | 0.061 | 0.0175 |
| 75 | 0.117 | 0.02 | 0.56 | 3.08 | 0.0127 | 0.0026 | 0.40 | 0.049 | 0.003 | 0.0041 |
| 76 | 0.120 | 0.04 | 0.60 | 2.73 | 0.0090 | 0.0021 | 0.26 | 0.055 | 0.676 | 0.0170 |
| 77 | 0.087 | 0.17 | 0.50 | 1.21 | 0.0051 | 0.0063 | 0.51 | 0.066 | 0.191 | 0.0014 |
| 78 | 0.126 | 0.06 | 0.56 | 5.06 | 0.0108 | 0.0035 | 0.95 | 0.043 | 0.362 | 0.0563 |
| 79 | 0.126 | 0.13 | 0.55 | 5.29 | 0.0020 | 0.0078 | 1.07 | 0.016 | 0.367 | 0.0189 |
| 80 | 0.139 | 0.04 | 0.58 | 6.57 | 0.0065 | 0.0024 | 0.94 | 0.051 | 0.136 | 0.0145 |
| 81 | 0.108 | 0.03 | 0.43 | 6.80 | 0.0042 | 0.0070 | 1.01 | 0.061 | 0.146 | 0.0127 |
| 82 | 0.143 | 0.15 | 0.57 | 3.84 | 0.0088 | 0.0038 | 0.60 | 0.072 | 0.076 | 0.0159 |
| 83 | 0.086 | 0.16 | 0.56 | 4.70 | 0.0057 | 0.0045 | 0.33 | 0.038 | 0.361 | 0.0192 |

TABLE 7-continued (to be continued in TABLE 8)

Chemical components (in mass %, balance Fe and impurities)

| Steel No. | C | Si | Mn | Cr | P | S | Mo | Nb | V | N |
|---|---|---|---|---|---|---|---|---|---|---|
| 84 | 0.084 | 0.18 | 0.64 | 2.11 | 0.0111 | 0.0019 | 0.85 | 0.038 | 0.338 | 0.0177 |
| 85 | 0.131 | 0.13 | 0.73 | 2.26 | 0.0154 | 0.0041 | 1.01 | 0.074 | 0.256 | 0.0109 |
| 86 | 0.102 | 0.21 | 0.72 | 3.46 | 0.0160 | 0.0010 | 0.63 | 0.015 | 0.059 | 0.0116 |
| 87 | 0.107 | 0.13 | 0.76 | 4.23 | 0.0130 | 0.0054 | 0.24 | 0.072 | 0.311 | 0.0191 |
| 88 | 0.132 | 0.21 | 0.50 | 1.40 | 0.0142 | 0.0048 | 0.27 | 0.055 | 0.072 | 0.0063 |
| 89 | 0.097 | 0.15 | 0.62 | 1.10 | 0.0144 | 0.0046 | 0.52 | 0.061 | 0.071 | 0.0158 |
| 90 | 0.133 | 0.20 | 0.48 | 5.17 | 0.0139 | 0.0045 | 0.29 | 0.072 | 0.126 | 0.0180 |
| 91 | 0.119 | 0.10 | 0.66 | 5.85 | 0.0046 | 0.0025 | 0.42 | 0.030 | 0.312 | 0.0178 |
| 92 | 0.122 | 0.16 | 0.60 | 6.45 | 0.0023 | 0.0083 | 0.26 | 0.036 | 0.299 | 0.0084 |
| 93 | 0.126 | 0.11 | 0.61 | 2.33 | 0.0105 | 0.0044 | 0.76 | 0.039 | 0.135 | 0.0043 |
| 94 | 0.138 | 0.14 | 0.73 | 4.67 | 0.0072 | 0.0010 | 0.45 | 0.057 | 0.220 | 0.0081 |
| 95 | 0.084 | 0.08 | 0.74 | 6.02 | 0.0143 | 0.0027 | 0.51 | 0.025 | 0.086 | 0.0137 |
| 96 | 0.119 | 0.08 | 0.51 | 2.85 | 0.0115 | 0.0016 | 0.48 | 0.050 | 0.331 | 0.0158 |
| 97 | 0.091 | 0.17 | 0.49 | 3.91 | 0.0134 | 0.0024 | 0.30 | 0.074 | 0.117 | 0.0066 |
| 98 | 0.141 | 0.09 | 0.50 | 6.01 | 0.0115 | 0.0052 | 0.52 | 0.027 | 0.234 | 0.0064 |

TABLE 8

TABLE 8 (continued from TABLE 7)

Chemical components (in mass %, balance Fe and impurities)

| Steel No. | W | Ti | Ca | Mg | Y | Ce | La | Al | B | O |
|---|---|---|---|---|---|---|---|---|---|---|
| 61 | | | | | | | | 0.019 | 0.0023 | 0.0027 |
| 62 | | | | | | | | 0.015 | 0.0013 | 0.0076 |
| 63 | | | | | | | | 0.007 | 0.0026 | 0.0046 |
| 64 | | | | | | | | 0.014 | 0.0041 | 0.0156 |
| 65 | | | | | | | | 0.005 | 0.0029 | 0.1220 |
| 66 | | | | | | | | 0.001 | 0.0010 | 0.0050 |
| 67 | | | | | | | | 0.020 | 0.0017 | 0.0033 |
| 68 | | | | | | | | 0.021 | 0.0040 | 0.0067 |
| 69 | | | | | | | | 0.012 | 0.0046 | 0.0033 |
| 70 | | | | | | | | 0.020 | 0.0039 | 0.0095 |
| 71 | | | | | | | | 0.007 | 0.0014 | 0.0021 |
| 72 | | | | | | | | 0.004 | 0.0029 | 0.0022 |
| 73 | | | | | | | | 0.018 | 0.0023 | 0.0029 |
| 74 | | | | | | | | 0.003 | 0.0014 | 0.0058 |
| 75 | 1.33 | 0.067 | 0.0043 | 0.0045 | 0.0436 | 0.0179 | 0.0337 | 0.014 | 0.0046 | 0.0005 |
| 76 | | | 0.0045 | | 0.0297 | | | 0.009 | 0.0025 | 0.0009 |
| 77 | 1.29 | 0.037 | 0.0036 | | 0.0246 | 0.0211 | 0.0356 | 0.019 | 0.0046 | 0.0007 |
| 78 | | | 0.0015 | 0.0030 | | 0.0106 | | 0.011 | 0.0026 | 0.0006 |
| 79 | 2.11 | | | 0.0027 | 0.0426 | | 0.0188 | 0.003 | 0.0036 | 0.0025 |
| 80 | 1.18 | 0.192 | 0.0029 | | | | | 0.019 | 0.0028 | 0.0028 |
| 81 | 1.34 | 0.078 | 0.0084 | 0.0040 | 0.0427 | | 0.0353 | 0.015 | 0.0017 | 0.0016 |
| 82 | 1.19 | 0.101 | 0.0035 | 0.0096 | 0.0279 | 0.0183 | | 0.015 | 0.0006 | 0.0028 |
| 83 | 1.13 | 0.046 | | 0.0025 | 0.0987 | 0.0150 | | 0.010 | 0.0040 | 0.0089 |
| 84 | | | 0.0010 | | 0.0235 | 0.1120 | 0.0285 | 0.011 | 0.0014 | 0.0010 |
| 85 | 1.15 | 0.083 | | 0.0047 | 0.0286 | 0.0399 | 0.0864 | 0.006 | 0.0018 | 0.0047 |
| 86 | | 0.046 | 0.0008 | | | 0.0186 | 0.0386 | 0.038 | 0.0006 | 0.0090 |
| 87 | 1.10 | 0.022 | | 0.0014 | 0.0413 | 0.0158 | 0.0412 | 0.018 | 0.0007 | 0.0033 |
| 88 | | | 0.0021 | 0.0013 | 0.0371 | 0.0164 | 0.0238 | 0.007 | 0.0041 | 0.0145 |
| 89 | 1.21 | 0.063 | 0.0043 | 0.0017 | 0.0342 | 0.0382 | 0.0423 | 0.017 | 0.0031 | 0.0035 |
| 90 | 1.35 | 0.023 | 0.0033 | 0.0037 | 0.0117 | 0.0331 | 0.0363 | 0.008 | 0.0022 | 0.0060 |
| 91 | | 0.080 | | 0.0012 | 0.0204 | | | 0.012 | 0.0029 | 0.0046 |
| 92 | 1.09 | 0.108 | 0.0031 | 0.0008 | 0.0236 | 0.0280 | 0.0205 | 0.020 | 0.0034 | 0.0062 |
| 93 | 1.43 | | 0.0007 | | 0.0339 | | 0.0372 | 0.019 | 0.0004 | 0.0006 |
| 94 | 1.09 | 0.027 | | 0.0014 | 0.0389 | 0.0413 | 0.0309 | 0.015 | 0.0045 | 0.0023 |
| 95 | 1.32 | | 0.0011 | | | 0.0301 | | 0.009 | 0.0008 | 0.0078 |
| 96 | 1.06 | | 0.0024 | | 0.0197 | 0.0267 | 0.0396 | 0.008 | 0.0008 | 0.0045 |
| 97 | | 0.088 | | | | 0.0371 | 0.0344 | 0.002 | 0.0037 | 0.0031 |
| 98 | 1.03 | 0.047 | 0.0027 | 0.0040 | 0.0316 | 0.0325 | 0.0354 | 0.001 | 0.0026 | 0.0073 |

TABLE 9

(to be continued in TABLE 10)

| | | Pre-weld heat treatment | | | | Post-weld heat treatment | | |
|---|---|---|---|---|---|---|---|---|
| Steel No. | Weld method | Holding time (min) | Temp. (° C.) | Depth (width) (mm) | Operation area ratio (%) | Temp. (° C.) | Holding time (min) | TTP |
| 61 | GTAW | 15 | 980 | 35 | 25 | 690 | 60 | 9630 |
| 62 | GTAW | 15 | 980 | 35 | 25 | 690 | 60 | 9630 |
| 63 | GTAW | 15 | 980 | 35 | 25 | 710 | 60 | 9830 |
| 64 | GTAW | 15 | 980 | 35 | 25 | 710 | 60 | 9830 |
| 65 | GTAW | 15 | 980 | 35 | 25 | 710 | 60 | 9830 |
| 66 | GTAW | 15 | 980 | 35 | 25 | 710 | 60 | 9830 |
| 67 | GTAW | 15 | 980 | 32 | 25 | 710 | 60 | 9830 |
| 68 | GTAW | 15 | 980 | 32 | 25 | 710 | 60 | 9830 |
| 69 | GTAW | 15 | 980 | 32 | 28 | 710 | 60 | 9830 |
| 70 | GTAW | 15 | 980 | 32 | 28 | 710 | 60 | 9830 |
| 71 | GTAW | 15 | 980 | 32 | 27 | 710 | 60 | 9830 |
| 72 | GTAW | 15 | 980 | 32 | 24 | 710 | 60 | 9830 |
| 73 | GTAW | 15 | 1020 | 35 | 23 | 710 | 60 | 9830 |
| 74 | GTAW | 15 | 1020 | 35 | 22 | 710 | 60 | 9830 |
| 75 | GTAW | 15 | 1020 | 35 | 25 | 720 | 60 | 9930 |
| 76 | GTAW | 15 | 1020 | 35 | 25 | 720 | 60 | 9930 |
| 77 | GTAW | 15 | 1020 | 35 | 27 | 720 | 60 | 9930 |
| 78 | GTAW | 15 | 1020 | 33 | 26 | 720 | 60 | 9930 |
| 79 | Welding impossible | — | — | — | — | — | — | — |
| 80 | GTAW | 12 | 1020 | 33 | 25 | 720 | 120 | 10229 |
| 81 | GTAW | 12 | 1020 | 33 | 23 | 720 | 120 | 10229 |
| 82 | GTAW | 12 | 1020 | 33 | 22 | 720 | 120 | 10229 |
| 83 | GTAW | 12 | 1020 | 33 | 25 | 720 | 120 | 10229 |
| 84 | GTAW | 12 | 1020 | 30 | 23 | 720 | 120 | 10229 |
| 85 | GTAW | 12 | 1020 | 31 | 28 | 720 | 120 | 10229 |
| 86 | GTAW | 12 | 1020 | 32 | 22 | 740 | 120 | 10435 |
| 87 | GTAW | 20 | 990 | 33 | 18 | 740 | 120 | 10435 |
| 88 | GTAW | 20 | 990 | 35 | 15 | 750 | 120 | 10538 |
| 89 | GTAW | 5 | 990 | 36 | 23 | 750 | 120 | 10538 |
| 90 | GTAW | 150 | 990 | 38 | 26 | 745 | 120 | 10486 |
| 91 | GTAW | 20 | 875 | 39 | 22 | 745 | 120 | 10486 |
| 92 | GTAW | 20 | 1210 | 40 | 24 | 745 | 55 | 10142 |
| 93 | GTAW | 20 | 990 | 8 | 25 | 715 | 45 | 9757 |
| 94 | GTAW | 20 | 990 | 40 | 45 | 715 | 35 | 9649 |
| 95 | GTAW | 20 | 990 | 40 | 25 | 600 | 80 | 8839 |
| 96 | GTAW | 25 | 990 | 30 | 24 | 812 | 90 | 11041 |
| 97 | GTAW | 25 | 990 | 35 | 23 | 710 | 10 | 9065 |
| 98 | GTAW | 25 | 1040 | 35 | 22 | 710 | 1800 | 11282 |

GTAW: gas-coated arc welding
SAW: coated arc welding
SMAW: hand-rod-type coated arc welding
EB: elctronic beam welding
LASER: laser welding
Operation area ratio of pre-weld heat treatment: ratio between total area of steel outer-layer surfaces except edge surface and total area of outer-layer portions subjected to pre-weld heat treatment
TTP: temperature/time equivalent parameter calculated based on formula (1)

TABLE 10

TABLE 10 (continued from TABLE 9)

| Steel No. | BCR (MPa) | WCR (MPa) | ΔCR (MPa) | BCH (J) | WCH (J) | P (%) | R (nm) | DP (nm) | Shape of welded object |
|---|---|---|---|---|---|---|---|---|---|
| 61 | 74 | 72 | 2 | 81 | 30 | 31 | 198 | 185 | steel plate for pressure container |
| 62 | 68 | 66 | 2 | 15 | 28 | 42 | 456 | 282 | steel plate for pressure container |
| 63 | 113 | 113 | 0 | 18 | 21 | 55 | 182 | 45 | steel plate for pressure container |
| 64 | 108 | 106 | 2 | 25 | 21 | 56 | 153 | 121 | steel plate for pressure container |
| 65 | 100 | 98 | 2 | 13 | 11 | 54 | 135 | 86 | steel plate for pressure container |
| 66 | 59 | 55 | 4 | 114 | 47 | 42 | 235 | 199 | steel plate for pressure container |
| 67 | 70 | 68 | 2 | 85 | 46 | 36 | 121 | 303 | steel plate for pressure container |
| 68 | 64 | 60 | 4 | 18 | 21 | 39 | 266 | 125 | steel plate for pressure container |
| 69 | 114 | 110 | 4 | 12 | 9 | 60 | 179 | 84 | steel plate for pressure container |
| 70 | 106 | 101 | 5 | 15 | 8 | 61 | 127 | 33 | steel plate for pressure container |
| 71 | 81 | 80 | 1 | 110 | 35 | 40 | 38 | 206 | steel plate for pressure container |
| 72 | 93 | 90 | 3 | 12 | 12 | 50 | 255 | 128 | steel plate for pressure container |
| 73 | 81 | 80 | 1 | 87 | 36 | 65 | 146 | 133 | steel plate for pressure container |
| 74 | 85 | 80 | 5 | 18 | 15 | 66 | 152 | 106 | steel plate for pressure container |

TABLE 10-continued

TABLE 10 (continued from TABLE 9)

| Steel No. | BCR (MPa) | WCR (MPa) | ΔCR (MPa) | BCH (J) | WCH (J) | P (%) | R (nm) | DP (nm) | Shape of welded object |
|---|---|---|---|---|---|---|---|---|---|
| 75 | 71 | 70 | 1 | 115 | 52 | 55 | 166 | 160 | steel plate for pressure container |
| 76 | 73 | 72 | 1 | 19 | 6 | 52 | 160 | 163 | steel plate for pressure container |
| 77 | 93 | 93 | 0 | 78 | 102 | 52 | 124 | 177 | steel plate for pressure container |
| 78 | 89 | 87 | 2 | 31 | 38 | 52 | 183 | 62 | steel pipe |
| 79 | — | — | — | — | — | — | — | — | — |
| 80 | 89 | 86 | 3 | 29 | 30 | 44 | 366 | 202 | steel pipe |
| 81 | 112 | 106 | 6 | 12 | 6 | 58 | 155 | 78 | steel pipe |
| 82 | 111 | 110 | 1 | 9 | 6 | 55 | 136 | 89 | steel pipe |
| 83 | 121 | 117 | 4 | 5 | 3 | 57 | 146 | 103 | steel pipe |
| 84 | 113 | 110 | 3 | 12 | 4 | 55 | 152 | 99 | steel pipe |
| 85 | 110 | 110 | 0 | 15 | 9 | 56 | 155 | 87 | steel pipe |
| 86 | 85 | 81 | 4 | 13 | 7 | 52 | 158 | 71 | steel pipe |
| 87 | 101 | 100 | 1 | 18 | 8 | 51 | 166 | 90 | steel pipe |
| 88 | 115 | 112 | 3 | 5 | 2 | 55 | 190 | 32 | steel pipe |
| 89 | 105 | 61 | 44 | 45 | 31 | 36 | 411 | 314 | steel plate for pressure container |
| 90 | 106 | 53 | 53 | 52 | 45 | 41 | 311 | 285 | steel plate for pressure container |
| 91 | 101 | 70 | 31 | 28 | 29 | 43 | 255 | 181 | steel pipe |
| 92 | 105 | 101 | 4 | 9 | 28 | 53 | 181 | 146 | steel plate for pressure container |
| 93 | 105 | 67 | 38 | 38 | 35 | 40 | 235 | 191 | steel pipe |
| 94 | 103 | 66 | 37 | 45 | 52 | 43 | 266 | 197 | steel plate for pressure container |
| 95 | 107 | 76 | 31 | 91 | 63 | 48 | 125 | 303 | steel pipe |
| 96 | 105 | 74 | 31 | 38 | 62 | 42 | 285 | 221 | steel plate for pressure container |
| 97 | 113 | 112 | 1 | 40 | 7 | 55 | 160 | 138 | steel pipe |
| 98 | 113 | 80 | 33 | 105 | 44 | 50 | 195 | 144 | steel plate for pressure container |

WCH: impact energy absorbed by welded-joint bond
BCH: impact energy absorbed by base material at 0° C.
R: average precipitate grain size on HAZ large-angle grain boundaries
DP: inter-particle-surface distance on HAZ large-angle grain boundaries
P: grain-boundary coverage of HAZ large-angle grain boundaries with precipitates Out of the chemical composition of $M_{23}C_6$-type carbides observed on the large-angle grain boundaries in the fine-grain HAZ of each of the inventive steels having the chemical compositions shown in Tables 3 and 4, M was determined to be made of essentially 70 atom % or more Cr, Fe, Mo or W, by separately extracting a test specimen for observation by transmission electron microscopy when preparing a creep test specimen for evaluation of the welded joint and performing an EDX analysis with a magnifying power of 10,000. A deviation may occur from this composition when the post-weld heat treatment conditions of the present invention are not satisfied; particularly, when $M_{23}C_6$-type carbides mainly composed of Mn are produced, degeneration may occur due to diffusion control of the component elements of M such that the grain-boundary coverage may change in creep-test environments for a long time. In some cases, the creep rupture strength of the welded joint may decrease, which requires attention.

The comparative examples will be evaluated. For 61, the amount of C added was small and thus precipitation of $M_{23}C_6$-type carbides was insufficient such that the grain-boundary coverage with these carbides did not reach 50% even though the pre-weld heat treatment conditions and the post-weld heat treatment conditions of the present invention were properly met; also, the inter-particle distance was larger than 150 nm, and the creep strengths of both the base material and welded joint decreased. Many locations showed a microstructure similar to a Type-IV-damage developing microstructure. For 62, the amount of C added was excessively large, and coarsening of carbides was promoted and the creep strength of the base material decreased, while, in the welded joint, coarsening of carbides also occurred and the creep strength and toughness decreased at the same time. At this time, the inter-particle distance became larger due to coarsening, above 150 nm. This shows that changes in the state of precipitates of $M_{23}C_6$-type carbides on grain boundaries significantly affect creep strength.

For 63, the amount of Si added was insufficient and deoxidization was insufficient such that the O concentration was high and oxides were produced, reducing the toughness in both the base material and welded joint. For 64, the amount of Si added was excessively large and, at the same time, clusters of oxides of Si were produced, which reduced toughness in both the base material and HAZ.

For 65, the amount of Mn added was insufficient and the O concentration was high, which produced large numbers of oxide particles, reducing the toughness in both the base material and welded joint. For 66, the amount of Mn added was excessively large, resulting in an increase in the mobility of dislocations and a decrease in the creep strength in both the base material and welded joint. Coarsening of carbides was promoted by accelerated diffusion of dislocation cores such that the average grain size of $M_{23}C_6$-type carbides exceeded 200 nm. As a result, the inter-particle distance exceeded 150 nm and the grain-boundary coverage with $M_{23}C_6$-type carbide particles did not reach 50%.

For 67, the amount of Cr added was small, and thus the amount of produced $M_{23}C_6$-type carbides, required by the present invention, was small and the inter-particle distance on large-angle grain boundaries was above 150 nm; at the same time, the grain-boundary coverage with precipitates decreased and the creep strength in both the base material and weld heat-affected zone decreased. For 68, the amount of Cr added was excessively large, causing coarsening of $M_{23}C_6$-type carbides above 200 nm, resulting in a reduction in the number density of precipitates and an increase in the inter-particle distance, which reduced the grain-boundary coverage with precipitates, reducing the creep strength in both the base material and HAZ. The coarsening of precipitates also resulted in a decrease in toughness at the same time.

For 69, the content of P, which is an impurity, exceeded the upper limit of the present invention, promoting grain-boundary segregation, which reduced the toughness in both the base material and welded joint. Similarly, for 70, the amount of S, which is an impurity, exceeded the upper limit, producing a large number of MnS particles, each extended in the longitudinal direction during hot working, which provided crack initiation points during impact tests, reducing the toughness in the base material; at the same time, the same phenomena occurred in the welded joint, reducing the toughness.

For 71, the amount of Mo added was insufficient and thus a sufficient amount of $Mo_2C$, which provides a phase for strengthening for short periods of time, did not precipitate such that the mobility of dislocations within grains increased in appearance and creep strength decreased; the $M_{23}C_6$-type carbides at the stage of the post-weld heat treatment had smaller particle sizes because of the insufficient amount of Mo accounting for M of these precipitates, which increased the average inter-particle distance beyond the range of the present invention, resulting in a reduction in the grain-boundary coverage with particles. For 72, the amount of Mo added was excessively large such that, from early on, $Mo_2C$ coarsened and was changed to $Mo_6C$ to coarsen on grain boundaries and exceed the range of the present invention, while the inter-particle distance decreased and the grain-boundary coverage exceeded 50%; however, coarsening accelerated during the long-time creep test, which reduced the creep strength in both the base material and weld heat-affected zone. Coarse precipitation of $Mo_6C$ decreased the toughness in both the base material and HAZ.

For 73, the amount of Nb added was small, and thus the precipitation strengthening property within grains dramatically decreased, increasing the apparent mobility of dislocations and reducing the creep strength in both the base material and weld heat-affected zone. For 74, the amount of Nb added was excessively large such that NbC precipitated early and coarsened early, reducing creep strength. For 75, the amount of V added was small such that the grain-boundary strengthening by VC precipitation strengthening did not sufficiently occur, which reduced the creep strength in the base material and weld heat-affected zone for longer periods of time. For 76, the amount of V was excessively large such that VC coarsened early, reducing the creep strength. The precipitation of coarse VC and the precipitation of NbC affected the toughness, too: For 74 and 76, the toughness decreased both in the base material and weld heat-affected zone.

For 77, the nitrogen content was insufficient such that precipitation strengthening within grains due to VN precipitation, which, in the context of the present invention, can only be encountered in long-time creep test environments, did not occur, which increased the apparent mobility of dislocations, reducing the creep strength in both the base material and weld heat-affected zone. For 78, the amount of N added was excessively large, which caused precipitation and early coarsening of Vn, NbN or $(Nb, V)_2N$-type Z phase, reducing creep strength.

For 79, the added amount of W, which is an optional element, was excessively large, and W became stable in the form of $\chi$ phase, rather than the intended inter-metallic compound $Fe_2W$-type Laves phase, and precipitated during heating at high temperatures, which reduced hot workability and produced a large number of fine cracks on the steel cross section, significantly reducing toughness, failing to produce the intended shape and making it impossible to perform welding nor creep testing.

For 80, similarly, the added amount of Ti, which is an optional element, was excessively large, and thus $Fe_2Ti$-type Laves phase was not obtained and coarse particles of (Fe—Cr—Ti)-based intermetallic compounds with a $\chi$ phase structure precipitated on long-angle grain boundaries, which reduced the number of precipitate particles and the grain-boundary coverage with precipitates decreased, increasing the inter-particle distance, resulting in a decrease in the creep rupture strength.

For 81, the added amount of Ca, which is an optional element, was excessively large such that oxides mainly composed of CaO formed clusters whose decomposition temperature was above the melting point of the inventive steel, which reduced the toughness in various portions of the base material and welded joint.

Similarly, for 82, the added amount of Mg, which is an optional element, was excessively large such that oxides mainly composed of MgO formed coarse clusters whose decomposition temperature was above the melting point of the inventive steel, which reduced the toughness in various portions of the base material and welded joint.

Similarly, for 83, the added amount of Y, which is an optional element, was excessively large such that oxides mainly composed of $Y_2O_3$ formed coarse clusters whose decomposition temperature was above the melting point of the inventive steel, which reduced the toughness in various portions of the base material and welded joint.

Similarly, for 84, the added amount of Ce, which is an optional element, was excessively large such that oxides mainly composed of $Ce_2O_3$ formed coarse clusters whose decomposition temperature was above the melting point of the inventive steel, which reduced the toughness in various portions of the base material and welded joint.

Similarly, for 85, the added amount of Ce, which is an optional element, was excessively large such that oxides mainly composed of $La_2O_3$ formed coarse clusters whose decomposition temperature was above the melting point of the inventive steel, which reduced the toughness in various portions of the base material and welded joint.

For 86, the added amount of Al, which is categorized as an impurity in the inventive steel, was excessively large, which produced coarse AlN particles and reduced the toughness, and reduced production of nitrides within grains and increased the apparent mobility of dislocations within grains, reducing the creep strength in the base material and weld heat-affected zone.

For 87, B, whose added amount is limited according to the present invention, was added in an amount above its upper limit such that coarse particles of BN precipitated during tempering of the base material and during the post-weld heat treatment of the welded joint, which reduced the toughness in both the base material and welded joint.

For 88, the content of O, which is an impurity, was higher than 100 ppm such that large amounts of oxide clusters, particularly Cr-based and Mn-based clusters were produced, which reduced the toughness in both the base material and weld heat-affected zone.

89 and 90 are comparative examples relating to the pre-weld heat treatment conditions, which are crucial in the present invention.

For 89, the pre-weld heat treatment was performed within the temperature range of the present invention, but the holding time was short such that carbides, which had locally precipitated as coarse particles, remained incompletely dissolved, which reduced the grain-boundary coverage in these portions and increased the average grain size of the particles themselves, increasing the inter-particle distance on grain boundaries and reducing the creep strength in the weld heat-affected zone, i.e. causing Type IV damage. For 90, the heat treatment time exceeded 30 minutes and no incompletely dissolved carbides were present; however, in the heat-affected zone during the pre-weld heat treatment, not only did the heated weld edge heated the interior of the steel, but also other surfaces that reflected heat caused heat accumulation, thus making the temperature distribution inconstant; thus, in the outer fringe of the heat affected zone of the pre-weld heat treatment, $M_{23}C_6$-type carbides coarsened, which reduced the grain-boundary coverage, increased the average grain size and increased the inter-particle distance, causing Type IV damage. In this case, the change in the state of the carbide particles, essentially, did not represent a weld heat-affected zone, but represented a portion of the base material that was subjected to the same heat history as a heat-affected zone; accordingly, the measurement result of the change in this microstructure is shown in the column for weld heat-affected zone.

Similarly, for 91, the heating temperature, which is a limitation relating to the pre-weld heat treatment, was below 950° C., i.e. low, such that γ single phase was not obtained; thus, in the γ phase that had been produced due to partial transformation shown in FIG. 3, carbide particles were not sufficiently dissolved due to the low temperature, resulting in a large number of remaining carbide particles that were not completely dissolved, which reduced grain-boundary coverage, increased the average grain size and increased the inter-particle distance, causing Type IV damage. For 92, the pre-weld heat treatment temperature was excessively high, coarsening the prior γ grains in size and reducing the toughness in the base material.

For 93, the operation width of the pre-weld heat treatment, i.e. the depth into which heat reached as measured in a direction perpendicular to the weld line, did not reach 10 mm, and thus portions of the weld heat-affected zone were located outside the depth (or width) on which the pre-weld heat treatment was performed such that the effect of the pre-weld heat treatment was not obtained; in these portions, incomplete dissolution of carbides, coarsening of grains in size, a reduction in grain-boundary coverage and an increase in inter-particle-surface distance were observed; thus, Type IV damage occurred from these portions, reducing the creep rupture strength of the welded joint.

For 94, if the operation region of the pre-weld heat treatment is defined as a region where the central portion as determined along the plate thickness is heated to the $Ac_3$ point or higher, this region exceeded 30% such that the entire member was heated, as with 90; thus, reflection of heat from the steel end surface to which heat was applied and the accompanying heat accumulation, i.e. factors other than heat transfer from the heated edge surface, made the temperature distribution of the pre-weld heat treatment inconstant such that $M_{23}C_6$-type carbides on the outer fringe of the heat-affected zone of the pre-weld heat treatment coarsened, which reduced the grain-boundary coverage, increased the average grain size and increased the inter-particle distance, causing Type IV damage. In this example, too, the change in the state of carbide particles, essentially, did not represent a weld heat-affected zone, but represented a portion of the base material that was subjected to the same heat history as a heat-affected zone, which means substantially the same heat history; accordingly, the measurement result of the change in this microstructure is shown in the column for weld heat-affected zone.

For 95, the temperature of the post-weld heat treatment was low, and the average particle size of the $M_{23}C_6$-type carbides was small but the amount of precipitation was insufficient, which reduced the area ratio of grain boundaries occupied by such particles and thus increased the inter-particle distance; as a result, although a low-ductility fracture such as Type IV damage did not occur, the creep strength of the welded joint decreased.

For 96, the post-weld heat treatment temperature was excessively high, such that the average particle size of $M_{23}C_6$-type carbides on grain boundaries was large; as a result, the inter-particle-surface distance was large and the occupancy of grain boundaries by particles decreased; thus, although a low-ductility fracture such as Type IV damage did not occur, the creep strength of the welded joint decreased.

For 97, the post-weld heat treatment temperature was appropriate but the heat treatment time was short; thus, the remaining stresses that were produced during welding of the welded joint were not sufficiently removed, which reduced the toughness of the welded joint, i.e. bond. For 98, the post-weld heat treatment time was excessively long, which means a post-weld heat treatment outside the appropriate range of heat treatment expressed by formula (1), and the softening of the weld reduced the initial strength and affected the creep rupture strength of the welded joint, reducing the strength. However, this is not a reduction in strength caused by Type IV damage.

The invention claimed is:

1. A method of manufacturing a welded structure of a ferritic heat-resistant steel including a base material, a weld heat-affected zone and a weld metal, comprising:
   the step of preparing the base material, the base material having a chemical composition including, in mass %:
   0.08 to 0.15% C;
   0.02 to 0.45% Si;
   0.40 to 0.80% Mn;
   1.0 to 7.0% Cr;
   0.003 to 0.020% N;
   0.20 to 1.10% Mo;
   0.005 to 0.08% Nb;
   0.005 to 0.40% V;
   not less than 0% and less than 1.5% W;
   0 to 0.12% Ti;
   0 to 0.0050% Ca;
   0 to 0.0050% Mg;
   0 to 0.0500% Y;
   0 to 0.0500% Ce; and
   0 to 0.0500% La,
   B being limited to below 0.005%,
   Al below 0.025%,
   P below 0.020%,
   S below 0.010%, and
   O below 0.010%,
   the balance being Fe and impurities;
   the step of forming an edge on the base material;
   a pre-weld heat treatment step in which a region located between a surface of the edge and a position distant from the surface of the edge by a pre-weld heat treatment depth of 10 to 50 mm is heated to a temperature of 950 to 1050° C. and is held at this temperature for 10 to 30 minutes;
   a welding step in which, after the pre-weld heat treatment step, the edge is welded to form the weld metal; and
   a post-weld heat treatment step in which, after the welding step, a region located between the surface of the edge and a position distant from the surface of the edge by a distance not smaller than the pre-weld heat treatment depth and not greater than 100 mm is heated to a temperature of 680 to 750° C. and is held at this temperature for a time period not shorter than 30 minutes and satisfying the following formula, (1):

$$(\text{Log}(t)+10)\cdot(T+273)<10539 \qquad (1),$$

where t is the holding time and T is the temperature; the unit of t is hour and the unit of T is ° C.; and Log is the common logarithm.

2. The method of manufacturing a welded structure of a ferritic heat-resistant steel according to claim 1, wherein the pre-weld heat treatment step is performed in two or more divided sub-steps.

3. The method of manufacturing a welded structure of a ferritic heat-resistant steel according to claim 1, wherein an average grain size of $M_{23}C_6$-type carbides precipitated on large-angle grain boundaries of the weld heat-affected zone is not greater than 200 nm, each of the large-angle grain boundaries being a grain boundary with an angle relative to an adjacent crystal grain of 15° or larger, an average inter-particle-surface distance of the $M_{23}C_6$-type carbides on the large-grain boundaries is not greater than 150 nm, and a coverage of the large-angle grain boundaries with the $M_{23}C_6$-type carbides is not smaller than 50%, and wherein M in the $M_{23}C_6$-type carbides is one or more of Cr, Fe, Mo and W in a total of 70 atom % or more.

4. The method of manufacturing a welded structure of a ferritic heat-resistant steel according to claim 1, wherein the base material has a chemical composition including one or two selected from the group consisting of, in mass %:

not less than 0.5% and less than 1.5% W; and 0.05 to 0.12% Ti.

5. The method of manufacturing a welded structure of a ferritic heat-resistant steel according claim 1, wherein the base material has a chemical composition including one or more selected from the group consisting of, in mass %:

0.0003 to 0.0050% Ca;

0.0003 to 0.0050% Mg;

0.0100 to 0.0500% Y;

0.0100 to 0.0500% Ce; and 0.0100 to 0.0500% La.

6. The method of manufacturing a welded structure of a ferritic heat-resistant steel according to claim 1, wherein the temperature of the post-weld heat treatment step is 680 to 715° C.

* * * * *